US009316840B2

(12) United States Patent
Georgiev et al.

(10) Patent No.: US 9,316,840 B2
(45) Date of Patent: Apr. 19, 2016

(54) METHODS AND APPARATUS FOR REDUCING PLENOPTIC CAMERA ARTIFACTS

(75) Inventors: Todor G. Georgiev, Sunnyvale, CA (US); Andrew Lumsdaine, Bloomington, IN (US)

(73) Assignee: Adobe Systems Incorporated, San Jose, CA (US)

( * ) Notice: Subject to any disclaimer, the term of this patent is extended or adjusted under 35 U.S.C. 154(b) by 621 days.

(21) Appl. No.: 13/466,904

(22) Filed: May 8, 2012

(65) Prior Publication Data

US 2013/0128081 A1 May 23, 2013

Related U.S. Application Data

(63) Continuation of application No. 12/690,871, filed on Jan. 20, 2010, now Pat. No. 8,189,089.

(60) Provisional application No. 61/145,923, filed on Jan. 20, 2009.

(51) Int. Cl.
| | |
|---|---|
| *H04N 5/262* | (2006.01) |
| *G02B 27/10* | (2006.01) |
| *H04N 5/225* | (2006.01) |

(52) U.S. Cl.
CPC .......... *G02B 27/1066* (2013.01); *H04N 5/2254* (2013.01)

(58) Field of Classification Search
USPC .................................. 348/240.99–240.3, 335
See application file for complete search history.

(56) References Cited

U.S. PATENT DOCUMENTS

| 725,567 | A | 4/1903 | Ives |
|---|---|---|---|
| 2,039,648 | A | 5/1936 | Ives et al. |
| 3,743,379 | A | 7/1973 | McMahon |
| 3,971,065 | A | 7/1976 | Bayer |
| 3,985,419 | A | 10/1976 | Matsumoto et al. |
| 4,175,844 | A | 11/1979 | Glaser-Inbari |
| 4,180,313 | A | 12/1979 | Inuiya |

(Continued)

FOREIGN PATENT DOCUMENTS

| CN | 101588437 | 11/2009 |
|---|---|---|
| CN | 101610353 | 12/2009 |

(Continued)

OTHER PUBLICATIONS

Ng, "Digital Light Field Photography," Jul. 2006, a Dissertation Submitted to the Dept. of Computer Science and the Committee on Graduate Studies of Stanford Univ in Partial fulfillment of the requirements for the degree of Doctor of Philosophy, 203.

(Continued)

*Primary Examiner* — Anthony J Daniels
(74) *Attorney, Agent, or Firm* — Wolfe-SBMC

(57) ABSTRACT

Methods and apparatus for reducing plenoptic camera artifacts. A first method is based on careful design of the optical system of the focused plenoptic camera to reduce artifacts that result in differences in depth in the microimages. A second method is computational; a focused plenoptic camera rendering algorithm is provided that corrects for artifacts resulting from differences in depth in the microimages. While both the artifact-reducing focused plenoptic camera design and the artifact-reducing rendering algorithm work by themselves to reduce artifacts, the two approaches may be combined.

20 Claims, 32 Drawing Sheets

(56) References Cited

U.S. PATENT DOCUMENTS

| | | |
|---|---|---|
| 4,193,093 A | 3/1980 | St. Clair |
| 4,230,942 A | 10/1980 | Stauffer |
| 4,580,219 A | 4/1986 | Pelc et al. |
| 4,732,453 A | 3/1988 | de montebello et al. |
| 4,849,782 A | 7/1989 | Koyama et al. |
| 5,076,687 A | 12/1991 | Adelson |
| 5,125,750 A | 6/1992 | Corle et al. |
| 5,361,127 A | 11/1994 | Dailey |
| 5,400,093 A | 3/1995 | Timmers |
| 5,579,445 A | 11/1996 | Loce et al. |
| 5,659,420 A | 8/1997 | Wakai et al. |
| 5,724,122 A | 3/1998 | Oskotsky |
| 5,729,011 A | 3/1998 | Sekiguchi |
| 5,946,077 A | 8/1999 | Nemirovskiy |
| 5,987,164 A | 11/1999 | Szeliski et al. |
| 6,009,188 A | 12/1999 | Cohen et al. |
| 6,097,394 A | 8/2000 | Levoy et al. |
| 6,097,541 A | 8/2000 | Davies et al. |
| 6,137,535 A | 10/2000 | Meyers |
| 6,137,937 A | 10/2000 | Okano et al. |
| 6,268,846 B1 | 7/2001 | Georgiev |
| 6,301,416 B1 | 10/2001 | Okano et al. |
| 6,317,192 B1 | 11/2001 | Silverbrook et al. |
| 6,339,506 B1 | 1/2002 | Wakelin et al. |
| 6,341,183 B1 | 1/2002 | Goldberg |
| 6,351,269 B1 | 2/2002 | Georgiev |
| 6,476,805 B1 | 11/2002 | Shum et al. |
| 6,570,613 B1 | 5/2003 | Howell |
| 6,738,533 B1 | 5/2004 | Shum et al. |
| 6,804,062 B2 | 10/2004 | Atwater et al. |
| 6,831,782 B2 | 12/2004 | Patton et al. |
| 6,838,650 B1 | 1/2005 | Toh |
| 6,842,297 B2 | 1/2005 | Dowski, Jr. |
| 6,961,075 B2 | 11/2005 | Mindler et al. |
| 7,019,671 B2 | 3/2006 | Kawai |
| 7,054,067 B2 | 5/2006 | Okano et al. |
| 7,085,062 B2 | 8/2006 | Hauschild |
| 7,113,231 B2 | 9/2006 | Conner et al. |
| 7,119,319 B2 | 10/2006 | Noto et al. |
| 7,164,446 B2 | 1/2007 | Konishi |
| 7,167,203 B1 | 1/2007 | Yukawa et al. |
| 7,367,537 B2 | 5/2008 | Ibe |
| 7,470,032 B2 | 12/2008 | Damera-Venkata et al. |
| 7,620,309 B2 | 11/2009 | Georgiev |
| 7,723,662 B2 | 5/2010 | Levoy et al. |
| 7,732,744 B2 | 6/2010 | Utagawa |
| 7,792,423 B2 | 9/2010 | Raskar et al. |
| 7,838,814 B2 | 11/2010 | Minhas et al. |
| 7,872,796 B2 | 1/2011 | Georgiev |
| 7,880,794 B2 | 2/2011 | Yamagata et al. |
| 7,916,934 B2 | 3/2011 | Vetro et al. |
| 7,936,392 B2 | 5/2011 | Ng et al. |
| 7,949,252 B1 | 5/2011 | Georgiev |
| 7,956,924 B2 | 6/2011 | Georgiev |
| 7,962,033 B2 | 6/2011 | Georgiev et al. |
| 7,965,936 B2 | 6/2011 | Raskar et al. |
| 7,978,234 B2 | 7/2011 | Yano et al. |
| 8,019,215 B2 | 9/2011 | Georgiev et al. |
| 8,106,994 B2 | 1/2012 | Ichimura |
| 8,126,323 B2 | 2/2012 | Georgiev et al. |
| 8,155,456 B2 | 4/2012 | Babacan et al. |
| 8,160,439 B2 | 4/2012 | Georgiev et al. |
| 8,189,065 B2 | 5/2012 | Georgiev et al. |
| 8,189,089 B1 | 5/2012 | Georgiev |
| 8,228,417 B1 | 7/2012 | Georgiev et al. |
| 8,237,843 B2 | 8/2012 | Yamamoto et al. |
| 8,243,157 B2 | 8/2012 | Ng et al. |
| 8,289,440 B2 | 10/2012 | Knight et al. |
| 8,290,358 B1 | 10/2012 | Georgiev |
| 8,315,476 B1 | 11/2012 | Georgiev et al. |
| 8,330,848 B2 | 12/2012 | Yamamoto |
| 8,345,144 B1 | 1/2013 | Georgiev et al. |
| 8,379,105 B2 | 2/2013 | Georgiev et al. |
| 8,380,060 B2 | 2/2013 | Georgiev et al. |
| 8,390,728 B2 | 3/2013 | Lim et al. |
| 8,400,555 B1 | 3/2013 | Georgiev et al. |
| 8,401,316 B2 | 3/2013 | Babacan |
| 8,471,920 B2 | 6/2013 | Georgiev et al. |
| 8,502,911 B2 | 8/2013 | Yamamoto et al. |
| 8,559,756 B2 | 10/2013 | Georgiev et al. |
| 8,570,426 B2 | 10/2013 | Pitts et al. |
| 8,611,693 B2 | 12/2013 | Intwala et al. |
| 8,665,341 B2 | 3/2014 | Georgiev et al. |
| 8,724,000 B2 | 5/2014 | Georgiev et al. |
| 8,749,694 B2 | 6/2014 | Georgiev et al. |
| 8,803,918 B2 | 8/2014 | Georgiev et al. |
| 8,817,015 B2 | 8/2014 | Georgiev et al. |
| 8,860,833 B2 | 10/2014 | Georgiev et al. |
| 2001/0012149 A1 | 8/2001 | Lin et al. |
| 2001/0050813 A1 | 12/2001 | Allio |
| 2002/0140835 A1 | 10/2002 | Silverstein |
| 2002/0159030 A1 | 10/2002 | Frey et al. |
| 2003/0108821 A1 | 6/2003 | Mei et al. |
| 2003/0117511 A1 | 6/2003 | Belz et al. |
| 2003/0156077 A1 | 8/2003 | Balogh |
| 2003/0231255 A1 | 12/2003 | Szajewski et al. |
| 2004/0114807 A1 | 6/2004 | Lelescu et al. |
| 2004/0218830 A1 | 11/2004 | Kang et al. |
| 2004/0223214 A1 | 11/2004 | Atkinson |
| 2005/0080602 A1 | 4/2005 | Snyder et al. |
| 2005/0088714 A1 | 4/2005 | Kremen |
| 2005/0099504 A1 | 5/2005 | Nayar et al. |
| 2005/0122418 A1 | 6/2005 | Okita et al. |
| 2005/0243178 A1 | 11/2005 | McConica |
| 2006/0061845 A1 | 3/2006 | Lin |
| 2006/0072029 A1 | 4/2006 | Miyatake et al. |
| 2006/0104542 A1 | 5/2006 | Blake et al. |
| 2006/0109282 A1 | 5/2006 | Lin et al. |
| 2006/0171032 A1 | 8/2006 | Nishioka |
| 2006/0177150 A1 | 8/2006 | Uyttendaele et al. |
| 2007/0091197 A1 | 4/2007 | Okayama et al. |
| 2007/0183057 A1 | 8/2007 | Terada et al. |
| 2007/0252074 A1 | 11/2007 | Ng et al. |
| 2007/0258096 A1 | 11/2007 | Cui et al. |
| 2007/0285526 A1 | 12/2007 | Mann et al. |
| 2008/0007839 A1 | 1/2008 | Deng et al. |
| 2008/0056549 A1 | 3/2008 | Hamill et al. |
| 2008/0095469 A1 | 4/2008 | Kiser |
| 2008/0107231 A1 | 5/2008 | Miyazaki et al. |
| 2008/0142685 A1 | 6/2008 | Gazeley |
| 2008/0152215 A1 | 6/2008 | Horie et al. |
| 2008/0165270 A1 | 7/2008 | Watanabe et al. |
| 2008/0166063 A1 | 7/2008 | Zeng |
| 2008/0187305 A1 | 8/2008 | Raskar et al. |
| 2008/0193026 A1 | 8/2008 | Horie et al. |
| 2008/0218610 A1 | 9/2008 | Chapman et al. |
| 2008/0247623 A1 | 10/2008 | Delso et al. |
| 2008/0266655 A1 | 10/2008 | Levoy et al. |
| 2009/0002504 A1 | 1/2009 | Yano et al. |
| 2009/0027542 A1 | 1/2009 | Yamamoto et al. |
| 2009/0041381 A1 | 2/2009 | Georgiev |
| 2009/0041448 A1 | 2/2009 | Georgiev |
| 2009/0086304 A1 | 4/2009 | Yurlov et al. |
| 2009/0122175 A1 | 5/2009 | Yamagata |
| 2009/0127440 A1 | 5/2009 | Nakai |
| 2009/0128658 A1 | 5/2009 | Hayasaka et al. |
| 2009/0128669 A1 | 5/2009 | Ng et al. |
| 2009/0140131 A1 | 6/2009 | Utagawa et al. |
| 2009/0167922 A1 | 7/2009 | Perlman et al. |
| 2009/0179142 A1 | 7/2009 | Duparre et al. |
| 2009/0185801 A1 | 7/2009 | Georgiev et al. |
| 2009/0190022 A1 | 7/2009 | Ichimura |
| 2009/0268970 A1 | 10/2009 | Babacan et al. |
| 2009/0295829 A1 | 12/2009 | Georgiev et al. |
| 2009/0316014 A1 | 12/2009 | Lim et al. |
| 2010/0013979 A1 | 1/2010 | Golub et al. |
| 2010/0026852 A1 | 2/2010 | Ng et al. |
| 2010/0085468 A1 | 4/2010 | Park et al. |
| 2010/0091133 A1 | 4/2010 | Lim et al. |
| 2010/0097491 A1 | 4/2010 | Farina et al. |
| 2010/0128145 A1 | 5/2010 | Pitts et al. |
| 2010/0141802 A1 | 6/2010 | Knight et al. |
| 2010/0205388 A1 | 8/2010 | MacInnis |
| 2010/0265381 A1 | 10/2010 | Yamamoto et al. |

(56) References Cited

U.S. PATENT DOCUMENTS

| | | | |
|---|---|---|---|
| 2010/0265386 | A1 | 10/2010 | Raskar et al. |
| 2011/0043604 | A1 | 2/2011 | Peleg et al. |
| 2011/0063354 | A1 | 3/2011 | Enge |
| 2011/0069189 | A1 | 3/2011 | Venkataraman et al. |
| 2011/0141224 | A1 | 6/2011 | Stec et al. |
| 2011/0157387 | A1 | 6/2011 | Han et al. |
| 2011/0169980 | A1 | 7/2011 | Cho et al. |
| 2011/0211824 | A1 | 9/2011 | Georgiev et al. |
| 2012/0183232 | A1 | 7/2012 | Babacan et al. |
| 2012/0229679 | A1 | 9/2012 | Georgiev et al. |
| 2012/0281072 | A1 | 11/2012 | Georgiev et al. |
| 2013/0120356 | A1 | 5/2013 | Georgiev |
| 2013/0120605 | A1 | 5/2013 | Georgiev |
| 2013/0121615 | A1 | 5/2013 | Intwala |
| 2013/0127901 | A1 | 5/2013 | Georgiev et al. |
| 2013/0128030 | A1 | 5/2013 | Georgiev |
| 2013/0128068 | A1 | 5/2013 | Georgiev et al. |
| 2013/0128069 | A1 | 5/2013 | Georgiev et al. |
| 2013/0128077 | A1 | 5/2013 | Georgiev |
| 2013/0128087 | A1 | 5/2013 | Georgiev et al. |
| 2013/0342734 | A1* | 12/2013 | Georgis et al. ............ 348/240.2 |

FOREIGN PATENT DOCUMENTS

| | | |
|---|---|---|
| CN | 807604 | 7/2011 |
| EP | 1548481 | 6/2005 |
| JP | 504669 | 10/1976 |
| JP | 7270791 | 10/1995 |
| JP | 2001330769 | 11/2001 |
| JP | 2004239932 | 8/2004 |
| WO | 01/37025 | 5/2001 |
| WO | WO-0137025 | 5/2001 |
| WO | 2006/057838 | 6/2006 |
| WO | WO-2006057838 | 6/2006 |
| WO | WO-2007044725 | 4/2007 |
| WO | 2007/115281 | 10/2007 |
| WO | WO-2007115281 | 10/2007 |
| WO | WO-2009151903 | 12/2009 |

OTHER PUBLICATIONS

Georgiev, et al. "Light-Field Capture by Multiplexing in the Frequency Domain," ADOBE Technical Report, Apr. 2007, all pages.
Levoy, Mark et al., "Light Field Microscopy," Stanford University, Submitted to Siggraph 2006, 5 pages.
Zhang, et al., "A Survey on Image-based Rendering-Representation, Sampling and Compression," Signal Processing, Image Communication, Elsevier Science Publishers, vol. 19, No. 1, Jan. 1, 2004, 28 pages.
Heung-Yeung Shum, et al., "Survey of Image-Based Representations and Compression Techniques," IEEE Transactions on Circuits and Systems for Video Technology, IEEE Service Center, vol. 13, No. 11, Nov. 1, 2003, 18 pages.
Georgiev T., Wainer M.: "Morphing Between Multiple Images," Tech. Rep. (1997).
Shing-Chow, Chan, et al., "The Compression of Simplified Dynamic Light Fields," Proceedings of International Conference on Acoustics, Speech and Signal Processing, Apr. 6-10, 2003 Hong Kong, vol. 3, Apr. 6, 2003, 4 pages.
Xiao J., Shah M.: "Tri-view Morphing," Computer Vision and Image Understanding 96, 3 (2004), 345-366.
Lippmann G.: "Epreuves reversible donnant la sensation du relief ("Reversible Prints Providing the Sensation of Depth")", Journal of Physics 7 (1908), pp. 821-825.
Ulrich, Fecker, et al., "Transposed Picture Ordering for Dynamic Light Field Coding," Joint Video Team (JVT) of ISO/ IEC MPEG & ITU-T VGEG (ISO/IEC JTC1/SC29/WG11 and ITU-T SG16 Q6), Jul. 9, 2004, 8 pages.
Lee S., Wolberg G., Shin S.: "Polymorph: Morphing Among Multiple Images," IEEE Computer Graphics and Applications (1998).
Zaharia, R., et al., "Adaptive 3D-DCT Compression Algorithm for Continuous Parallax 3D Integral Imaging," Signal Processing, Image Communication, Elsevier Scient Publishers, Amsterdam, NL, vol. 17, No. 3, Mar. 1, 2002, 12 pages.
Grzeszczuk, R., et al., "Standard Support for 1-13 Progressive Encoding, Compression and Interactive Visualization of Surface Light Fields," Joint Video Tem (JVT) of ISO/IEC MPEG & ITU-T VGEG (ISO/IEC JTC1/SC29/WG11 and ITU-T SG16 Q6), Nov. 21, 2001, 11 pages.
Naemura T., Yoshida T., Harashima H.: "3d Computer Graphics Based on Integral Photography," Optics Express, vol. 8, 2 (2001).
Zitnick C. L., Jojic N., Kang S.: "Consistent Segmentation for Optical Flow Estimation" In Proceedings of IEEE International Conference on Computer Vision (ICCV) (2005).
Seitz S. M., Dyer C. R.: "View Morphing," ACM Trans. Graph. (1996), 21-30.
Stevens R., Harvey T.: "Lens Arrays for a Three-dimensional Imaging System," Journal of Optics A, vol. 4 (2002).
Stewart J., Yu J., Gortler S. J., McMillan L.: "A New Reconstruction Filter for Undersampled Light Field," Eurographics Symposium on Rendering (2003), 150-156.
Vaish V., Wilburn B., Joshi N., Levoy M.: "Using Plane + Parallax to Calibrate Dense Camera Arrays," In Proceedings of IEEE Conference on Computer Vision and Pattern Recognition (CVPR) (2004).
Chang, et al., "Light Field Compression Using Disparity-Compensated Lifting and Shape Adaptation," IEEE Transactions on Image Processing, vol. 15, No. 4, Apr. 2006, pp. 793-806.
Sebe, et al., "Mutli-View Geometry Estimation for Light Field Compression," VMV 2002, 8 pages.
Levoy, et al. "Recording and controlling the 4D light field in a microscope using microlens arrays", Journal of Microscopy, 2009, 19 pages.
Dana Dudley, Walter Duncan, John Slaughter, "Emerging Digital Micromirror Device (DMD) Applications", DLPTM Products New Applications, Texas Instruments, Inc., Copyright 2003 Society of Photo-Optical Instrumentation Engineers., This paper was published in SPIE Proceedings vol. 4985, 12 pages.
Shree K. Nayar, Vlad Branzoi, Terry E. Boult, "Programmable Imaging using a Digital Micromirror Array", Shree K. Nayar, Vlad Branzoi, Terry E. Boult, In Conf. on Computer Vision and Pattern Recognition, pp. I: 436-443, 2004.
Yang, J C, et al., "A Real-Time Distributed Light Field Camera," Rendering Techniques 2002, Eurographics Workshop Proceedings, PIS, Italy, Jun. 26-28, 2002, 9 pages.
M. Levoy, "Light Fields and computational Imaging," Computer [Online], vol. 39, No. 8, Aug. 2006, pp. 46-55, XP002501300.
J. Neumann, et al., "Eyes from Eyes Analysis of Camera Design Using Plenoptic Video Geometry," Dec. 2001, 20 pages, XP002509893.
Todor Georgiev and Chintan Intwala: "Light Field Camera Design for Integral View Photography," Adobe Tech. Rep., 2006, 13 pages.
J. Chai, S. Chan, H. Shum, and X. Tong: "Plenoptic Sampling", ACM Trans. Graph., pp. 307-318, 2000.
F. Durand, N. Holzschuch, C. Soler, E. Chan, and F. Sillion: "A frequency Analysis of Light Transport," ACM Trans. Graph., pp. 1115-1126, 2005.
U.S. Appl. No. 12/574,183, filed Oct. 6, 2009, Todor G. Georgiev.
U.S. Appl. No. 12/144,411, filed Jun. 23, 2008, Todor G. Georgiev.
U.S. Appl. No. 12/130,725, filed May 30, 2008, Chintan Intwala, et al.
U.S. Appl. No. 12/690,569, filed Jan. 20, 2010, Todor G. Georgiev, et al.
U.S. Appl. No. 12/790,677, filed May 28, 2010, Todor G. Georgiev.
JP504669 (1975), all pages, english equivalent is U.S. Patent 3985419, dated Oct. 12, 1976 by Matsumoto, et al.
Final Office Action, U.S. Appl. No. 12/957,308, (Nov. 19, 2013), 21 pages.
Final Office Action, U.S. Appl. No. 12/957,312, (Dec. 13, 2013), 15 pages.
Final Office Action, U.S. Appl. No. 12/957,316, (Sep. 26, 2013), 16 pages.
Notice of Allowance, U.S. Appl. No. 12/957,316, (Dec. 11, 2013), 13 pages.
Notice of Allowance, U.S. Appl. No. 12/957,320, (Oct. 16, 2013), 10 pages.

(56) References Cited

OTHER PUBLICATIONS

Restriction Requirement, U.S. Appl. No. 12/957,326, (Nov. 25, 2013), 6 pages.
Supplemental Notice of Allowance, U.S. Appl. No. 12/186,392, (Jul. 19, 2013) 5 pages.
Non-Final Office Action, U.S. Appl. No. 12/957,308, (Jul. 25, 2013),18 pages.
Final Office Action, U.S. Appl. No. 12/957,322, (Aug. 12, 2013),16 pages.
Supplemental Notice of Allowance, U.S. Appl. No. 12/186,392, (Aug. 27, 2013), 2 pages.
Non-Final Office Action, U.S. Appl. No. 12/957,312, (Aug. 28, 2013),17 pages.
Non-Final Office Action, U.S. Appl. No. 13/288,759, (Sep. 11, 2013),11 pages.
European Search Report, EP Application No. 09159086.9 (Aug. 14, 2009), 8 pages.
Final Office Action, U.S. Appl. No. 13/425,306, (Sep. 19, 2012), 7 pages.
Final Office Action, U.S. Appl. No. 12/130,725, (Jan. 3, 2012), 6 pages.
Non-Final Office Action, U.S. Appl. No. 12/957,316, (Mar. 22, 2013), 16 pages.
Non-Final Office Action, U.S. Appl. No. 12/111,735, (Jul. 28, 2011), 12 pages.
Non-Final Office Action, U.S. Appl. No. 12/130,725, (Sep. 9, 2011), 7 pages.
Non-Final Office Action, U.S. Appl. No. 12/186,392, (Apr. 3, 2012), 13 pages.
Non-Final Office Action, U.S. Appl. No. 12/186,392, (Nov. 19, 2012), 13 pages.
Non-Final Office Action, U.S. Appl. No. 12/271,389, (Sep. 30, 2010), 7 pages.
Non-Final Office Action, U.S. Appl. No. 12/474,112, (Oct. 19, 2011), 5 pages.
Non-Final Office Action, U.S. Appl. No. 12/628,437, (Jul. 30, 2012), 10 pages.
Non-Final Office Action, U.S. Appl. No. 12/957,312, (Nov. 13, 2012), 14 pages.
Non-Final Office Action, U.S. Appl. No. 12/957,320, (Dec. 5, 2012), 11 pages.
Non-Final Office Action, U.S. Appl. No. 13/103,880, (Aug. 9, 2011), 5 pages.
Non-Final Office Action, U.S. Appl. No. 13/425,306, (May 31, 2012), 7 pages.
Non-Final Office Action, U.S. Appl. No. 13/434,189, (Mar. 7, 2013), 8 pages.
Non-Final Office Action, U.S. Appl. No. 13/476,638, (Jul. 6, 2012), 6 pages.
Notice of Allowance, U.S. Appl. No. 12/917,984, (Aug. 21, 2012), 11 pages.
Notice of Allowance, U.S. Appl. No. 12/111,735, (Dec. 14, 2011), 10 pages.
Notice of Allowance, U.S. Appl. No. 12/130,725, (Apr. 3, 2012), 8 pages.
Notice of Allowance, U.S. Appl. No. 12/186,392, (Mar. 13, 2013), 8 pages.
Notice of Allowance, U.S. Appl. No. 12/271,389, (Feb. 2, 2011), 4 pages.
Notice of Allowance, U.S. Appl. No. 12/271,389, (Jun. 18, 2010), 6 pages.
Notice of Allowance, U.S. Appl. No. 12/474,112, (Jan. 30, 2012), 5 pages.
Notice of Allowance, U.S. Appl. No. 12/503,803, (Mar. 20, 2012), 6 pages.
Notice of Allowance, U.S. Appl. No. 12/628,437, (Dec. 18, 2012), 6 pages.
Notice of Allowance, U.S. Appl. No. 13/103,880, (Dec. 13, 2011), 5 pages.
Notice of Allowance, U.S. Appl. No. 13/425,306, (Dec. 10, 2012), 4 pages.
Notice of Allowance, U.S. Appl. No. 13/429,226, (Dec. 26, 2012), 7 pages.
Notice of Allowance, U.S. Appl. No. 13/476,638, (Oct. 29, 2012), 4 pages.
Notice of Allowance, U.S. Appl. No. 13/549,330, (Feb. 7, 2013), 9 pages.
"PyOpenGL 3.x The Python OpenGL Binding", Retrieved from <http://pyopengl.sourceforge.net> on Dec. 21, 2010, (2010), 2 pages.
Restriction Requirement, U.S. Appl. No. 12/111,735, (Apr. 29, 2011), 6 pages.
Restriction Requirement, U.S. Appl. No. 12/130,725, (Jul. 15, 2011), 5 pages.
Restriction Requirement, U.S. Appl. No. 12/474,112, (Jul. 28, 2011), 6 pages.
Restriction Requirement, U.S. Appl. No. 12/957,316, (Jan. 23, 2013), 6 pages.
Supplemental Notice of Allowance, Application No. 12/271,389, (Feb. 10, 2011), 2 pages.
Supplemental Notice of Allowance, U.S. Appl. No. 12/474,112, (Mar. 8, 2012), 2 pages.
Supplemental Notice of Allowance, U.S. Appl. No. 12/503,803, (Apr. 23, 2012), 13 pages.
Supplemental Notice of Allowance, U.S. Appl. No. 13/103,880, (Jan. 20, 2012), 2 pages.
U.S. Appl. No. 11/627,141, (Jan. 25, 2007), 43 pages.
U.S. Appl. No. 11/874,611, (Oct. 18, 2007), 43 pages.
U.S. Appl. No. 12/111,735, (Apr. 29, 2008), 44 pages.
U.S. Appl. No. 12/186,396, (Aug. 5, 2008), 69 pages.
U.S. Appl. No. 12/271,389, (Nov. 14, 2008), 63 pages.
U.S. Appl. No. 12/474,112, (May 28, 2009), 75 pages.
U.S. Appl. No. 12/636,168, (Dec. 11, 2009), 60 pages.
U.S. Appl. No. 12/690,569, (Jan. 20, 2010), 36 pages.
U.S. Appl. No. 12/690,871, (Jan. 20, 2010), 105 pages.
U.S. Appl. No. 12/917,984, (Nov. 2, 2010), 127 pages.
U.S. Appl. No. 12/957,308, (Nov. 30, 2010), 73 pages.
U.S. Appl. No. 12/957,312, (Nov. 30, 2010), 91 pages.
U.S. Appl. No. 12/957,316, (Oct. 30, 2010), 66 pages.
U.S. Appl. No. 12/957,320, (Nov. 30, 2010), 58 pages.
U.S. Appl. No. 12/957,322, (Nov. 30, 2010), 53 pages.
U.S. Appl. No. 12/957,326, (Nov. 30, 2010), 73 pages.
U.S. Appl. No. 13/288,759, (Nov. 3, 2011), 54 pages.
U.S. Appl. No. 13/288,765, (Nov. 3, 2011), 50 pages.
U.S. Appl. No. 13/429,765, (Mar. 23, 2012), 44 pages.
U.S. Appl. No. 13/429,226, (Mar. 23, 2012), 44 pages.
Adelson, et al., "Single lens stereo with a plenoptic camera", *IEEE Transactions on Pattern Analysis D and Machine Intelligence*, val. 14, issue 2, 99-106, 1992, (1992), pp. 99-106.
Adelson, et al., "The Plenoptic Function and the Elements of Early Vision", *Computational models of visual processing* (MIT Press), (1991), 18 pages.
Aggarwal, Manoj et al., "Split Aperture Imaging for High Dynamic Range", *International Journal of Computer Vision*, (Jan. 2004), 8 pages.
Baker, et al., "Limits on Superresolution and How to Break Them", *IEEE Transactions on Pattern Analysis and Machine Intelligence*, (Jan. 2002), 37 pages.
Bishop, et al., "Light Field Superresolution", *In International Conference on Computational Photography* (Apr. 6-17, 2009), (Apr. 16, 2009), 4 pages.
Borman, et al., "Super-resolution from image sequences—a review", *Proceedings of the 1998 D Midwest Symposium on Circuits and Systems*, Publication Date: Aug. 9-12, 1998, on pp. 374-378, (Aug. 9, 1998), 5 pages.
Brown, et al., "Unsupervised 3D Object Recognition and Reconstruction in Unordered Datasets", *In Proceedings of 5th International Conference on 3D Imaging and Modelling* (301M), (2005), 8 pages.
Capel, et al., "Computer Vision Applied to Super-resolution", *IEEE Signal Processing Magazine*, vol. 20, (Jan. 2003), 10 pages.
Chai, et al., "Plenoptic Sampling", *ACM Transactions Graphics*, (2000), 12 pages.

(56) References Cited

OTHER PUBLICATIONS

Chang, et al., "Light Field Compression Using Disparity-Compensated Lifting and Shape Adaptation", *IEEE Transactions on Image Processing*, vol. 15, No. 4,, (Apr. 2006), pp. 793-806.

Christensen, et al., "PANOPTES: A thin agile multi-resolution imaging sensor", *Microcuircuit Applications and Critical, Technology Conference (GOMACTech-05)*, (Jan. 2005), 4 Pages.

Debevec, Paul E., et al., "Recovering High Dynamic Range Radiance Maps from Photographs", *ACM Transaction on Graphics, SIGGRAPH 1997 Conference Proceedings*, San Diego, CA, (1997), 10 pages.

Dudley, Dana et al., "Emerging Digital Micromirror Device (DMD) Applications", *DLPTM Products New Applications, Texas Instruments, Inc., Copyright 2003 Society of Photo-Optical Instrumentation Engineers., This paper was published in SPIE Proceedings* vol. 4985, (2003), 12 pages.

Durand, et al., "A Frequency Analysis of Light Transport", *ACM Transactions Graphics*, (2005), 12 pages.

Durand, Fredo "Fast Bilateral filtering for the Display of High-Dynamic-Range Images", *ACM Transactions on Graphics (TOG), Proceedings of the 29th Annual Conference on Computer Graphics and Interactive Techniques SIGGRAPH-02*, vol. 21, Issue 3, (2002), 10 pages.

Elad, et al., "Restoration of a single superresolution image from several blurred, noisy and undersampled measured images", *IEEE Transactions on Image Processing* Dec. 1997, (Dec. 1997), 1646-1658.

Farsiu, et al., "Advances and challenges in super-resolution", *International Journal of Imaging Systems and Technolog, 2004.*, (2004), pp. 47-57.

Fecker, Ulrich et al., "Transposed Picture Ordering for Dynamic Light Field Coding", *Joint Video Team (JVT) of ISO/IEC MPEG & ITU-T VCEG (ISO/IEC JTC1/SC29/WG11 and ITU-T SG16 06)*, (Jul. 9, 2004), 8 pages.

Ferrand, et al., "Direct imaging of photonic nanojets", *Optics Express* vol. 16, No. 10, (Oct. 12, 2008), pp. 6930-6940.

Fife, Keith et al., "A 3Mpixel Multi-Aperture Image Sensor With 0.7um Pixels In 0.11um CMOS", *IEEE ISSCC Digest of Technical Papers* (Feb. 2008), pp. 48-49, available at <http://isl.stanford.edu/groups/elgamal/people/kfife/>,(Feb. 2008), 3 pages.

Georgiev, U.S. Appl. No. 12/144,411, filed Jun. 23, 2008, 63 pages.

Georgiev, U.S. Appl. No. 12/574,183, filed Oct. 6, 2009, 30 pages.

Georgiev, U.S. Appl. No. 12/790,677, filed May 28, 2010, 48 pages.

Georgiev, et al., "Depth of Field in Plenoptic Cameras", *In Eurographics 2009-Annex*, (Apr. 2009), 4 pages.

Georgiev, et al., "Light Field Camera Design for Integral View Photography", *Adobe Systems Technical Report*, (2006), 13 pages.

Georgiev, et al., "Light-Field Capture by Multiplexing in the Frequency Domain", *ADOBE Technical Report*, (Apr. 2007), 14 pages.

Georgiev, et al., "Morphing Between Multiple Images", *Southern Illinois University at Carbondale, Dept. of Computer Science, Technical Report*, (Apr. 17, 1997), 17 pages.

Georgiev, et al., "Spatio-angular resolution tradeoff in integral photography", *Proc. Eurographics Symposium on Rendering, 2006*, (2006), 10 pages.

Georgiev, et al., U.S. Appl. No. 12/690,869, filed Jan. 20, 2010, 103 pages.

Georgiev, et al., U.S. Appl. No. 12/503,803, filed Jul. 15, 2009, 114 pages.

Georgiev, et al., U.S. Appl. No. 12/628,437, filed Dec. 1, 2009, 114 pages.

Gortler, et al., "The Lumigraph", *ACM Trans. Graph.*, 43-54, 1996, (1996), pp. 43-54.

Grzeszczuk, et al., "Standard Support for Progressive Encoding, Compression and Interactive Visualization of Surface Light Fields", *Joint Video Tern (JVT) of ISO/IEC MPEG & ITU-T VGEG (ISO/IEC JTC1/SC29/WG11 and ITU-T SG16 06)*, (Nov. 21, 2001), 11 pages.

Guttosch, Rudolph J., "Investigation of Color Aliasing of High Spatial Frequencies and Edges for Bayer-Pattern Sensors and Foveon X3 Direct Image Sensors", *Tech. Rep., Foveon*, 2002, (2002), 8 pages.

Horstmeyer, R et al., "Flexible multimodal camera using a light field architecture.", *In Proceedings ICCP 2009*, 2009., (2009), pp. 1-8.

Horstmeyer, Roarke et al., "Modified light field architecture for reconfigurable multimode imaging", *In Adaptive Coded Aperture Imaging, Non-Imaging, and Unconventional Imaging Sensor Systems. SPIE, 2009.*, (2009), 9 pages.

Horstmeyer, Roarke et al., "Pupil plane multiplexing for multi-domain imaging sensors.", *In Society of Photo-Optical Instrumentation Engineers (SPIE) Conference Series*, vol. 7096, Aug. 2008., (Aug. 2008), 10 pages.

Hubel, Paul M., "Foveon Technology and the Changing Landscape of Digital Cameras", *Thirteenth Color Imaging Conference: Color Science and Engineering Systems, Technologies, and Applications*, Scottsdale, Arizona, (Nov. 2005), pp. 314-317.

Hubel, Paul M., et al., "Spatial Frequency Response of Color Image Sensors: Bayer Color Filters and Foveon X3", *Proceedings of the SPIE*, vol. 5301, (2004), pp. 1-4.

Intwala, et al., U.S. Appl. No. 12/130,725, filed May 30, 2008, 52 pages.

Isaksen, Aaron "Dynamically Reparameterized Light Fields", *Submitted to the Department of Electrical Engineering and Computer Science in partial fulfillment of the requirements for the degree of Master of Science in Electrical Engineering and Computer Science at the Massachusetts Institute of Technology*, (Nov. 2000), 79 pages.

Isaksen, et al., "Dynamically reparameterized light fields", *ACM Trans. Graph.*, 297-306, 2000, (2000), pp. 297-306.

Kessenich, et al., "The OpenGL Shading Language", Version: 4.00, Document Revision: 7, (Feb. 12, 2010), 160 pages.

Lee, et al., "Polymorph: Morphing Among Multiple Images", *IEEE Computer Graphics and Applications*, (1998), pp. 60-73.

Levin, et al., "Image and Depth from a Conventional Camera with a Coded Aperture", *ACM Transactions on Graphics, SIGGRAPH 2007 Conference Proceedings*, San Diego, CA, Retrieved from <http://groups.csail.mit.edu/graphics/CodedAperture/CodedAperture-LevinEtAl-SIGGRAPH07.pdf> on Dec. 21, 2012,(2007), 9 pages.

Levoy, et al., "Light Field Rendering", *ACM Trans. Graph.*, 31-42, 1996, (1996), pp. 31-42.

Levoy, et al., "Recording and Controlling the 4D Light Field in a Microscope Using Microlens Arrays", *Journal of Microscopy*, vol. 235, Pt 2, (Apr. 7, 2009), 19 pages.

Levoy, Marc "Light Fields and Computational Imaging", *Computer* [Online], vol. 39, No. 8, XP002501300, (Aug. 2006), pp. 46-55.

Levoy, Mark et al., "Light Field Microscopy", *ACM Transactions on Graphics* 25(3), *Proceedings of SIGGRAPH*, (2006), 11 pages.

Levoy, Mary "Optical Recipes for Light Microscopes", *Stanford Computer Grpahics Laboratory Technical Memo 2006-001*, (Jun. 20, 2006), 5 pages.

Lin, Zhouchen "Fundamental Limits of Reconstruction-Based Superresolution Algorithms under Local Translation", *IEEE Transactions on Pattern Analysis and Machine Intelligence 26, 1* (Jan. 2004), 83-97, available at <http://research.microsoft.com/apps/pubs/default.aspx?id=69073>, (Jan. 2004), pp. 83-97.

Lippmann, "Epreuves Reversible Donnant la Sensation Du Relief ("Reversible Prints Providing the Sensation of Depth")", *Journal of Physics 7*, (1908), pp. 821-825.

Lippmann, "Reversible Prints", *Academie des sciences*, (Mar. 1908), 3 pages.

Lippmann, M.G. "Epreuves Reversibles Photographies Integrales ("Reversible Prints. Integral Photographs.")", *Academie des sciences*, Translation,(Mar. 1908), 4 Pages.

Lumsdaine, Andrew et al., "Full Resolution Lightfield Rendering", *Adobe Systems Technical Report*, (Jan. 2008), 12 pages.

Lumsdaine, et al., "The Focused Plenoptic Camera", *In International Conference on Computational Photography*, (Apr. 2009), 8 pages.

Lyon, Richard F., et al., "Eyeing the Camera: into the Next Century", *In Proceedings IS&T/SID 10th Color Imaging Conference*, (2002), 7 pages.

Naemura, et al., "3D Computer Graphics Based on Integral Photography", *Optics Express*, vol. 8, 2, (2001), 8 pages.

Narasimhan, Srinivasa G., et al., "Enhancing resolution along multiple imaging dimensions using assorted pixels.", *IEEE Trans. Pattern Anal. Mach. Intel I.*, 27 (4 ), (Apr. 2005), pp. 518-530.

(56) References Cited

OTHER PUBLICATIONS

Nayar, et al., "High Dynamic Range Imaging: Spatially Varying Pixel Exposures", *IEEE Conference on Computer Vision and Pattern Recognition*, Jun. 2000, vol. 1, pp. 4 72-4 79., (Jun. 2000), 8 pages.
Nayar, Shree N., et al., "Programmable Imaging using a Digital Micromirror Array", *In Conf. on Computer Vision and Pattern Recognition*, pp. 1: 436-443, 2004, (2004), 8 pages.
Neumann, et al., "Eyes from Eyes Analysis of Camera Design Using Plenoptic Video Geometry", XP002509893, (Dec. 2001), 20 pages.
Ng, "Digital Light Field Photography", *A Dissertation Submitted to the Dept. of Computer Science and the Commitiee on Graduate Studies of Stanford Univ in Partial fulfillment of the requirements for the degree of Doctor of Philosophy*, 203, (Jul. 2006), 203 pages.
Ng, "Fourier slice photography", *International Conference on Computer Graphics and Interactive Techniques Proceedings of ACM SIGGRAPH 2005.*, (2005), 10 pages.
Ng, et al., "Light field photography with a hand-held plenoptic camera", *Stanford University Computer Science Tech Report CSTR 2005-02*, Apr. 2005, 11 pages.
Ng, et al., "Mathematical Analysis of Super-Resolution Methodology", *Signal Processing Magazine, IEEE* 20, 3 (2003), (2003), pp. 62-74.
Nickolls, et al., "Scalable Parallel Programming with CUDA", *Queue* 6, 40-53 (Mar. 2008), 14 pages.
Park, Cheol S., et al., "Super-Resolution Image Reconstruction: A Technical Overview", *IEEE Signal Processing Magazine*, vol. 20, Issue 3, (May 2003), 16 pages.
Park, Jong H., et al., "An Ultra Wide Dynamic Range CMOS Image Sensor with a Linear Response", *Proceedings SPIE-IS&T Electronic Imaging, SPIE* vol. 6068, 2006., (2006), 8 pages.
Roberts, David E., "History of Lenticular and Related Autostereoscopic Methods", available at <ftp://ftp.umiacs.umd.edu/pub/aagrawal/HistoryOfIntegralImaging/HistoryOfLenticular.pdf>, (2003), 17 pages.
Schechner, Yoav Y., et al., "Generalized mosaicing", *In ICCV*, pp. 17-25, 2001., (2001), 8 pages.
Schechner, Yoav Y., et al., "Generalized Mosaicing: High Dynamic Range in a Wide Field of View", *International Journal of Computer Vision*, 53(3):245-267, (2003), 23 pages.
Schechner, Yoav Y., et al., "Generalized mosaicing: Polarization panorama", *IEEE Trans. Pattern Anal. Mach. Intell.*, 27(4):631-636, 2005., (2005), pp. 631-636.
Schechner, Yoaz et al., "Generalized mosaicing: Wide field of view multispectral imaging", *IEEE Trans. Pattern Anal. Mach. Intell.*, 24(1 0):1334-1348, 2002., (Oct. 2002), pp. 1334-1348.
Schultz, Richard R., "Super-Resolution Enhancement of Native Digital Video Versus Digitized NTSC Sequences", *In Proceedings of the Fifth IEEE Southwest Symposium on Image Analysis and Interpretation*, (2002), 5 pages.
Sebe, et al., "Multi-View Geometry Estimation for Light Field Compression", *VMV 2002*, (2002), 8 pages.
Segal, et al., "The OpenGL Graphics System: A Specification", *Version 3.2 (Core Profile)*, (Dec. 7, 2009), 404 pages.
Seitz, et al., "View Morphing", *ACM Transactions Graphics*, (1996), 10 pages.
Shing-Chow, et al., "The Compression of Simplified Dynamic Light Fields", *Proceedings of International Conference on Acoustics, Speech and Signal Processing*, Apr. 6-10, 2003, Hong Kong, val. 3, (Apr. 6, 2003), 4 pages.
Shum, Heung-Yeung et al., "Survey of Image-Based Representations and Compression Techniques", *IEEE Transactions on Circuits and Systems for Video Technology*, IEEE Service Center, vol. 13, No. 11, (Nov. 1, 2003), 18 pages.
Sloan, et al., "Time Critical Lumigraph Rendering", *Proceedings of the 1997 symposium on Interactive 3D graphics*, (Jan. 1997), 7 pages.
Stevens, et al., "Lens Arrays for a Three-dimensional Imaging System", *Journal of Optics A: Pure and Applied Optics*, Opt. 4, (2002), 5 pages.
Stewart, et al., "A New Reconstruction Filter for Undersampled Light Field", *Eurographics Symposium on Rendering*, (2003), 8 pages.
Stone, et al., "OpenCL: The open standard for parallel programming of heterogeneous systems", *Computing in Science & Engineering*, (May 2010), 8 pages.
Tanida, et al., "TOMBO: Thin Observation Module by Bound Optics", *Lasers and Electro-Optics Society, 2002. LEOS 2002. The 15th Annual Meeting of the IEEE*, vol. 1, (2002), pp. 233-234.
Todt, et al., "Fast (Spherical) Light Field Rendering with Per-Pixel Depth", *Technical Report, Computer Graphics Group, University of Siegen*, (2007), 8 pages.
Tumblin, Jack et al., "LCIS: A Boundary Hierarchy for Detail-Preserving Contrast Reduction", *ACM Transactions on Graphics, SIGGRAPH 1999 Conference Proceedings*, Los Angeles, CA, pp. 83-90, 1999., (1999), pp. 83-90.
Vaish, Vaibhav et al., "Using Plane+ Parallax to Calibrate Dense Camera Arrays", *In Proceedings of IEEE Conference on Computer Vision and Pattern Recognition (CVPR)*, (2004), 8 pages.
Veeraraghavan, et al., "Dappled photography: Mask enhanced cameras for heterodyned light fields and coded aperture refocusing", *ACM Trans. Graph.* 26, 3, 69, 2007, (2007), 14 pages.
Wang, et al., "Optical virtual imaging at 50 nm lateral resolution with a white-light nanoscope", *Nature Communications*, (Mar. 1, 2011), 13 pages.
Wang, et al., "The optical microscopy with virtual image breaks a record: 50-nm resolution imaging is demonstrated", *Cornell University Library*, (Jun. 2010), 7 pages.
Wilburn, Bennett et al., "High Performance Imaging Using Large Camera Arrays", *In ACM Transactions Graphics*, (2005), 12 pages.
Wu, et al., "Imaging with Solid Immersion Lenses, Spatial Resolution and Applications", *Proc. IEEE* 88, 1491, (2000), 8 pages.
Wu, et al., "Realization of numerical aperture 2.0 using a gallium phosphide solid immersion lens", *Applied Physics Letters* 75, (1999), 3 pages.
Xiao, Jiangjian et al., "Tri-view Morphing", *Computer Vision and Image Understanding* 96, 3, (2004), pp. 345-366.
Yang, et al., "A Real-Time Distributed Light Field Camera", *Rendering Techniques 2002, Eurographics Workshop Proceedings, PIS*, Italy, Jun. 26-28, 2002, 9 pages.
Zaharia, et al., "Adaptive 3D-DCT Compression Algorithm for Continuous Parallax 3D Integral Imaging", *Signal Processing, Image Communication*, Elsevier Scient Publishers, Amsterdam, NL, vol. 17, No. 3, (Mar. 1, 2002), 12 pages.
Zhang, et al., "A Survey on Image-based Rendering-Representation, Sampling and Compression", *Signal Processing, Image Communication*, Elsevier Science Publishers, vol. 19, No. 1, (Jan. 1, 2004), 28 pages.
Zitnick, et al., "Consistent Segmentation for Optical Flow Estimation", *In Proceedings of IEEE International Conference on Computer Vision (ICCV)*, (2005), 8 pages.
Non-Final Office Action, U.S. Appl. No. 12/957,322, Jan. 13, 2014, 20 pages.
Non-Final Office Action, U.S. Appl. No. 12/957,326, Feb. 24, 2014, 8 pages.
Notice of Allowance, U.S. Appl. No. 12/957,308, Mar. 28, 2014, 7 pages.
Notice of Allowance, U.S. Appl. No. 12/957,312, Feb. 26, 2014, 12 pages.
Supplemental Notice of Allowance, U.S. Appl. No. 12/957,320, Jan. 24, 2014, 2 pages.
Supplemental Notice of Allowance, U.S. Appl. No. 12/957,320, Jan. 30, 2014, 2 pages.
Chang, et al., "Super-Resolution through Neighbor Embedding", Computer Vision and Pattern Recognition, 2004. CVPR 2004. Proceedings of the 2004 IEEE Computer Society Conference, Jul. 2004, 8 pages.
Final Office Action, U.S. Appl. No. 12/957,312, (Jun. 6, 2013),16 pages.
Final Office Action, U.S. Appl. No. 12/957,320, (Jun. 27, 2013),16 pages.
Non-Final Office Action, U.S. Appl. No. 12/690,869, (Mar. 26, 2012), 8 pages.
Non-Final Office Action, U.S. Appl. No. 12/957,322, (Apr. 24, 2013),15 pages.

(56) References Cited

OTHER PUBLICATIONS

Notice of Allowance, U.S. Appl. No. 12/690,869, (Jul. 13, 2012), 7 pages.
Notice of Allowance, U.S. Appl. No. 13/434,189, (Jul. 10, 2013), 8 pages.
Aliaga, et al., "Plenoptic Stitching: A Scalable Method for Reconstructing 30 Interactive Walkthroughs", *Proceedings of the 28th annual conference on Computer graphics and interactive techniques*, (Aug. 2001), pp. 443-450.
Hunt, B. R., "Super-Resolution of Images: Algorithms, Principles, Performance", *International Journal of Imaging Systems and Technology*, vol. 6, (Jan. 1995), 9 pages.
Meng, et al., "An Approach on Hardware Design for Computational Photography Applications based on Light Field Refocusing Algorithm", *Technical Reports CS-2007-15, University of Virginia*, (Nov. 18, 2007), pp. 1-12.
"Non-Final Office Action", U.S. Appl. No. 13/288,759, Apr. 28, 2014, 11 pages.
"Non-Final Office Action", U.S. Appl. No. 13/288,765, Jun. 25, 2014, 20 pages.
"Notice of Allowance", U.S. Appl. No. 12/957,322, Apr. 25, 2014, 7 pages.
"Notice of Allowance", U.S. Appl. No. 12/957,326, May 30, 2014, 8 pages.
"Supplemental Notice of Allowance", U.S. Appl. No. 12/957,308, Jun. 9, 2014, 2 pages.
U.S. Appl. No. 12/474,112, filed May 28, 2009.
Adelson, T., and Wang, J., "Single lens stereo with a plenoptic camera," IEEE Transactions on Pattern Analysis and Machine Intelligence, vol. 14, issue 2, 99-106, 1992.
Borman, S., and Stevenson, R., "Super-resolution from image sequences—a review", Proceedings of the 1998 Midwest Symposium on Circuits and Systems, Publication Date: Aug. 9-12, 1998, on pp. 374-378.
Elad, M., and Feuer, A., "Restoration of a single superresolution image from several blurred, noisy, and undersampled measured images," IEEE Transactions on Image Processing Dec. 1997.
Farsiu, S., Robinson, D., Elad, M., and Milanfar, P., "Advances and challenges in super-resolution," International Journal of Imaging Systems and Technology, 2004.
Georgiev, T., Zheng, K., Curless, B., Salesin, D., and et al., "Spatio-angular resolution tradeoff in integral photography," Proc. Eurographics Symposium on Rendering, 2006.
Gortler, S. J., Grzeszczuk, R., Szeliski, R., and Cohen, M. F., "The lumigraph," ACM Trans. Graph., 43-54, 1996.
Isaksen, A., McMillan, L., and Gortler, S. J., "Dynamically reparameterized light fields," ACM Trans. Graph., 297-306, 2000.
Levoy, M., and Hanrahan, P., Light field rendering, ACM Trans. Graph., 31-42, 1996.

Ng, R., Levoy, M., Brdif, M., Duval, G., Horowitz, M., and Hanrahan, P., "Light field photography with a hand-held plenoptic camera," 2005.
Ng, R., "Fourier slice photography," International Conference on Computer Graphics and Interactive Techniques Proceedings of ACM SIGGRAPH 2005.
Park, S., Park, M., and Kang, M., "Super-resolution image reconstruction: a technical overview," Signal Processing Magazine, 2003.
Veeraraghavan, A., Mohan, A., Agrawal, A., Raskar, R., and Tumblin, J., "Dappled photography: Mask enhanced cameras for heterodyned light fields and coded aperture refocusing," ACM Trans. Graph. 26, 3, 69, 2007.
U.S. Appl. No. 12/503,803, filed Jul. 15, 2009, Georgiev, et al.
U.S. Appl. No. 12/628,437, filed Dec. 1, 2009, Georgiev, et al.
U.S. Appl. No. 12/636,168, filed Dec. 11, 2009.
Fife K., Gamal A. E., Wong H.-S. P.: A 3mpixel multi-aperture image sensor with 0.7um pixels in 0.11um cmos. In IEEE ISSCC Digest of Technical Papers (Feb. 2008), pp. 48-49.
Lumsdaine A., Georgiev T.: Full Resolution Lightfield Rendering. Tech. rep., Adobe Systems, Jan. 2008.
Baker S., Kanade T.: Limits on superresolution and how to break them. IEEE Transactions on Pattern Analysis and Machine Intelligence (Jan. 2002).
Bishop T. E., Zanetti S., Favaro P.: Light field superresolution. In International Conference on Computational Photography (Apr. 16-17, 2009).
Hunt B.: Super-resolution of images: algorithms, principles, performance. International Journal of Imaging Systems and Technology (Jan. 1995).
Levin A., Fergus R., Durand F., Freeman W.: Image and depth from a conventional camera with a coded aperture. ACM Transactions on Graphics, SIGGRAPH 2007 Conference Proceedings, San Diego, CA (2007).
Lippmann G.: Epreuves reversibles. photographies integrales. Academie des sciences (Mar. 1908), 446-451.
Lin Z., Shum H.: Fundamental limits of reconstruction-based super-resolution algorithms under local translation. IEEE Transactions on Pattern Analysis and Machine Intelligence 26, 1 (Jan. 2004), 83-97.
Ng M. K., Bose N. K.: Mathematical analysis of super-resolution methodology. Signal Processing Magazine, IEEE 20, 3 (2003), 62-74.
Schultz R.: Super-resolution enhancement of native digital video versus digitized NTSC sequences. In Proceedings of the Fifth IEEE Southwest Symposium on Image Analysis and Interpretation (2002), pp. 193-197.
Wilburn B., Joshi N., Vaish V., Talvala E., Antunez E., Barth A., Adams A., Levoy M., Horowitz M.: High performance imaging using large camera arrays. In ACM Transactions on Graphics (2005).
Georgiev T., Lumsdaine A.: Depth of field in plenoptic cameras. In Eurographics 2009—Annex (Apr. 2009), pp. 5-8.
Lumsdaine A., Georgiev T.: The focused pienoptic camera. In International Conference on Computational Photography (Apr. 2009).

* cited by examiner

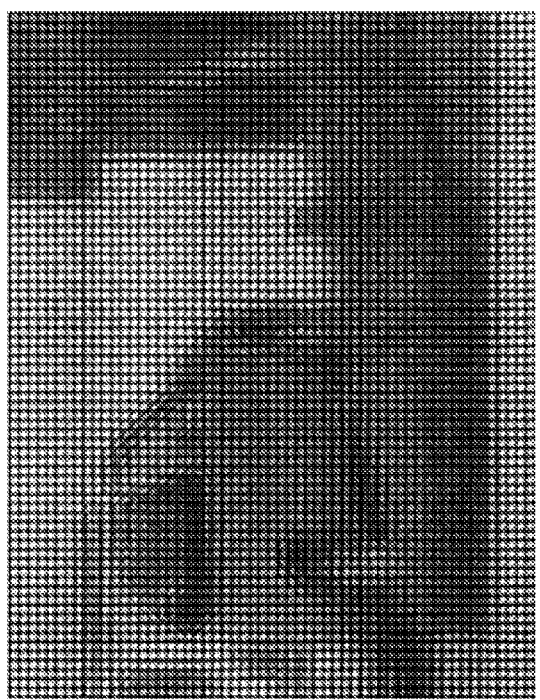
FIG. 5A
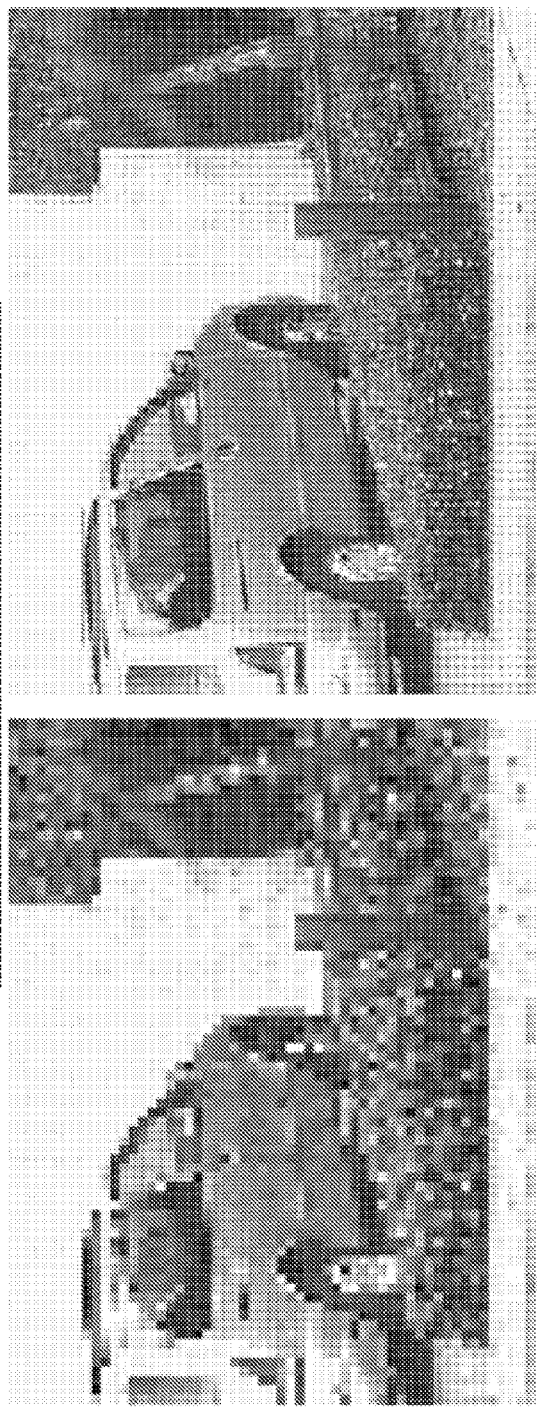
FIG. 5B
FIG. 5C

*(Keplerian telescopic case)*

*(Galilean telescopic case)*

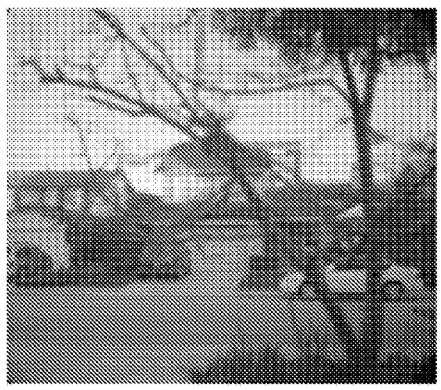
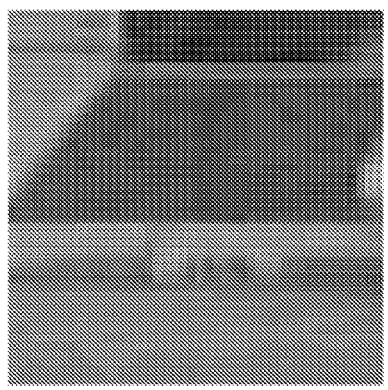
FIG. 18A FIG. 18B
FIG. 18C

METHODS AND APPARATUS FOR REDUCING PLENOPTIC CAMERA ARTIFACTS

PRIORITY INFORMATION

This application is a continuation of U.S. application Ser. No. 12/690,871, filed Jan. 20, 2010, now U.S. Pat. No. 8,189,089 which claims benefit of priority of U.S. Provisional Application Ser. No. 61/145,923 entitled "Reducing Plenoptic Camera Artifacts" filed Jan. 20, 2009, the content of which is incorporated by reference herein in its entirety.

BACKGROUND

Description of the Related Art

In a conventional camera, the main lens maps the 3D world of the scene outside camera into a 3D world inside camera. FIG. 1 illustrates imaging in a conventional camera. "Inside world" represents inside the camera. The shaded oval regions represent the order of depths in the outside world, and the corresponding depths inside the camera. One particular image plane inside the camera is shown. The mapping of the 3D world of the scene outside camera into a 3D world inside camera is governed by the lens equation:

$$\frac{1}{A} + \frac{1}{B} = \frac{1}{F}$$

where A and B are respectively the distances from the lens to the object plane and from the lens to the image plane. This equation is normally used to describe the effect of a single image mapping between two fixed planes. In reality, however, the lens equation describes an infinite number of mappings—it constrains the relationship between, but does not fix, the values of the distances A and B. That is, every plane in the outside scene (which is described as being at some distance A from the objective lens) is mapped by the objective lens to a corresponding plane inside of the camera at a distance B. When a sensor (e.g., conventional film, a charge-coupled device (CCD), etc.) is placed at a distance B between F and ∞ (infinity) inside the camera, the sensor captures an in-focus image of the corresponding plane at A that was mapped from the scene in front of the lens.

Conventional cameras render a three-dimensional scene onto a two-dimensional sensor. During operation, a conventional digital camera captures a two-dimensional (2-D) image representing a total amount of light that strikes each point on a photosensor within the camera. However, this 2-D image contains no information about the direction of the light that strikes the photosensor. The image captured by a conventional camera essentially integrates the radiance function over its angular portion, resulting in a two-dimensional intensity as a function of position. The angular information of the original radiance is lost. Thus, conventional cameras fail to capture a large amount of optical information.

Light-Field or Radiance Capturing Cameras

In contrast to conventional cameras, light-field, or radiance capturing, cameras sample the four-dimensional (4-D) optical phase space or light-field, and in doing so capture information about the directional distribution of the light rays. This information captured by light-field cameras may be referred to as the light-field, the plenoptic function, or radiance. In computational photography, a light-field is a 4-D record of all light rays in 3-D. Radiance describes both spatial and angular information, and is defined as density of energy per unit of area per unit of stereo angle (in radians). A light-field camera captures radiance; therefore, light-field images originally taken out-of-focus may be refocused, noise may be reduced, viewpoints may be changed, and other light-field effects may be achieved.

Light-fields, i.e. radiance, may be captured with a conventional camera. In one conventional method, M×N images of a scene may be captured from different positions with a conventional camera. If, for example, 8×8 images are captured from 64 different positions, 64 images are produced. The pixel from each position (i, j) in each image are taken and placed into blocks, to generate 64 blocks. FIG. 2 illustrates an example prior art light-field camera, or camera array, which employs an array of two or more objective lenses 110. Each objective lens focuses on a particular region of photosensor 108, or alternatively on a separate photosensor 108. This light-field camera 100 may be viewed as a combination of two or more conventional cameras that each simultaneously records an image of a subject on a particular region of photosensor 108 or alternatively on a particular photosensor 108. The captured images may then be combined to form one image.

FIG. 3 illustrates an example prior art plenoptic camera, another type of radiance capturing camera, that employs a single objective lens and a microlens or lenslet array 106 that includes, for example, about 100,000 lenslets. In a conventional plenoptic camera 102, lenslet array 106 is fixed at a small distance (~0.5 mm) from a photosensor 108, e.g. a charge-coupled device (CCD). In conventional plenoptic cameras, the microlenses are placed and adjusted accurately to be exactly at one focal length f from the sensor 108. This is done by placing the array of microlenses at distance f from the sensor, where f is the focal length of the microlenses. Another way to say this is that, for the microlenses, f is chosen to be equal to the distance to the photosensor 108. In other words, the microlenses are focused on infinity, which is essentially equivalent to focusing the microlenses on the main lens 104, given the large distance of the microlenses to the main lens relative to the focal length of the microlenses. Thus, the raw image captured with plenoptic camera 102 is made up of an array of small images, typically circular, of the main lens 108. These small images may be referred to as microimages. However, in conventional plenoptic camera 102, each microlens does not create an image of the internal world on the sensor 108, but instead creates an image of the main camera lens 104.

The lenslet array 106 enables the plenoptic camera 102 to capture the light-field, i.e. to record not only image intensity, but also the distribution of intensity in different directions at each point. Each lenslet splits a beam coming to it from the main lens 104 into rays coming from different locations on the aperture of the main lens 108. Each of these rays is recorded as a pixel on photosensor 108, and the pixels under each lenslet collectively form an n-pixel image. This n-pixel area under each lenslet may be referred to as a macropixel, and the camera 102 generates a microimage at each macropixel. The plenoptic photograph captured by a camera 102 with, for example, 100,000 lenslets will contain 100,000 macropixels, and thus generate 100,000 microimages of a subject. Each macropixel contains different angular samples of the light rays coming to a given microlens. Each macropixel contributes to only one pixel in the different angular views of the scene; that is, only one pixel from a macropixel is used in a given angular view. As a result, each angular view contains 100,000 pixels, each pixel contributed from a different macropixel. Another type of integral or light-field camera is similar to the plenoptic camera of FIG. 3, except that an array of pinholes is used between the main lens and the photosensor instead of an array of lenslets.

FIG. 4 further illustrates an example prior art plenoptic camera model. In conventional plenoptic camera 102, the microlens-space system swaps positional and angular coordinates of the radiance at the microlens. For clarity, only the rays through one of the microlenses are illustrated. The conventional optical analysis of such a plenoptic camera considers it as a cascade of a main lens system followed by a microlens system. The basic operation of the cascade system is as follows. Rays focused by the main lens 104 are separated by the microlenses 106 and captured on the sensor 108. At their point of intersection, the rays have the same position but different slopes. This difference in slopes causes the separation of the rays when they pass through a microlens-space system. In more detail, each microlens functions to swap the positional and angular coordinates of the radiance, then this new positional information is captured by the sensor 108. Because of the swap, it represents the angular information at the microlens. As a result, each microlens image captured by sensor 108 represents the angular information for the radiance at the position of the optical axis of the corresponding microlens.

The light-field is the radiance density function describing the flow of energy along all rays in three-dimensional (3D) space. Since the description of a ray's position and orientation requires four parameters (e.g., two-dimensional positional information and two-dimensional angular information), the radiance is a four-dimensional (4D) function. This function may be referred to as the plenoptic function. Image sensor technology, on the other hand, is only two-dimensional, and light-field imagery must therefore be captured and represented in flat (two dimensional) form. A variety of techniques have been developed to transform and capture the 4D radiance in a manner compatible with 2D sensor technology. This may be referred to as a flat representation of the 4D radiance (or light-field), or simply as a flat.

SUMMARY

Various embodiments of methods and apparatus for reducing plenoptic camera artifacts are described. The focused plenoptic camera differs from the conventional plenoptic camera in that its microlenses are focused on the photographed object rather than at infinity. The spatio-angular tradeoffs available with this approach enable rendering of final images that have significantly higher resolution than final images rendered from conventional plenoptic cameras. However, the low angular resolution of the focused plenoptic camera may result in visible artifacts when basic focused plenoptic camera rendering is used. These artifacts are a result of the basic rendering method of patching together the microimages created by the microlenses. The final image is free of artifacts in one or another part of the field at the expense of other parts of the field representing different depths in 3D.

Methods for reducing these focused plenoptic camera artifacts are described. A first method is based on careful design of the optical system of the focused plenoptic camera to reduce artifacts that result in differences in depth in the microimages. A second method is computational; a focused plenoptic camera rendering algorithm is described that corrects for artifacts resulting from differences in depth in the microimages.

In an artifact-reducing focused plenoptic camera design, according to some embodiments, the focused plenoptic camera may include at least a photosensor, a microlens array, and a main, or objective, lens. The main lens refracts light from an object located in front of the camera to form an image of the object at a focal plane of the main lens. The focal plane is located at focal length F of the main lens. The object is at distance A from the main lens. The distance from the main lens to the focal plane is designated as B. The microlens array is positioned between the main lens and the photosensor. The microlens array includes a plurality of microlenses. Each of the microlenses is focused on the focal plane and not on the main lens. Distance from the microlenses to the focal plane is designated as a, and distance from the microlenses to the photosensor is designated as b. In some embodiments, b is fixed. Each microlens of the microlens array projects a separate portion of the image of the object formed at the focal plane on which the microlens is focused onto a separate location on the photosensor. The photosensor is configured to capture a flat comprising the separate portions of the image of the object projected onto the photosensor by the microlens array. Each of the separate portions is in a separate region of the flat. These separate portions may be referred to as microimages.

The value Δa is related to difference in the magnification, that is change in the size of the microimages over a range of depth. To reduce artifacts in the camera optics, this difference at different depths should be as small as possible, and should be much smaller than a. Thus, a should be relatively large. From this, the following may be derived:

$$a > \frac{F^2}{A}$$

In some embodiments, a value for a is chosen to be much greater than $F^2/A$. In some embodiments, "much greater than" in this expression indicates at least twice as large. In some embodiments, "much greater than" in this expression indicates at least ten times as large. Thus, to reduce artifacts in images generated from captured flats, the optics of a focused plenoptic camera may be configured so that the above relation between a and the main lens optics is satisfied.

However, there are trade-offs to be considered. Magnification M of the microlenses in the microlens array is defined by $$M = \frac{a}{b}.$$

While a should be made larger in relation to Δa to reduce artifacts, a should not be increased too much because with a fixed b, a large value of a produces a large magnitude for M. A large magnitude of M is related to a large number of almost identical microimages in different microlenses. Rendering in such a mode is rather wasteful. Thus, the magnitude of M should not be too large, nor should the magnitude of M be made too small as too small microimages may waste pixels due to vignetting effects. Thus, in some embodiments, the magnitude of M should be around 10 or less. In some embodiments, the magnitude of M may be within a range from 5 to 10, inclusive. However, some embodiments may be configured so that the magnitude of M is outside that range.

Artifacts may occur in rendered images due to the different magnification in different microlens images of the flat light field, even in images rendered from flats captured with embodiments of the artifact-reducing focused plenoptic camera described above. This effect can be greatly reduced through appropriate rendering. In rendering, neighboring patches overlap. The basic condition for proper rendering is straightforward—overlapping regions must match up. That is, the same portion of the scene that is captured by different microlenses should be rendered to the same position in the image. To render a complete image without artifacts, each portion of the image should be rendered according to that part of the flat's required magnification. In embodiments of an artifact-reducing rendering algorithm, for each microimage in the captured flat, a magnification value $M_i$ is determined that results in the best match with its neighbor microimages. A final image is rendered according to the saved magnification value $M_i$ for each microimage.

Determining the magnification value $M_i$ that provides the best match between two microimages is essentially an image registration problem. In a method for determining magnification values $M_i$ for the microimages in a flat, registration is performed on each microimage in the flat to determine a value for $k_i$, where $k_i$ is a measure of depth of the microimage. A magnification-finding algorithm that may be used in some embodiments to find a value for $k_i$ for each microimages is described. The value for $k_i$ may then be used to determine a magnification value $M_i$ for each microimage. Either or both $k_i$ and $M_i$ may be stored, for example in an array or other data structure, for use during rendering.

While both the artifact-reducing focused plenoptic camera design and the artifact-reducing rendering algorithm work by themselves to reduce artifacts, the two approaches may be combined, while making tradeoffs and thus not using either to its full potential. This combined approach may provide a better position in terms of the trade-offs that are made between parallax and artifacts. At the same time, the action of both approaches reduces the artifacts significantly. This combined approach may be a practical method for 3D and refocused imaging. The final rendered images using the combined approach are of good quality and good resolution

BRIEF DESCRIPTION OF THE DRAWINGS

FIG. 5A shows a raw light-field image, or flat, as captured by a plenoptic camera.

FIG. 5B shows a final image rendered from the flat of FIG. 5A according to a conventional rendering method.

FIG. 5C shows a final image rendered from the flat of FIG. 5A according to an embodiment of the full-resolution light-field rendering method.

FIGS. 18A through 18C show output images rendered from a flat using conventional rendering methods.

Figure 1:
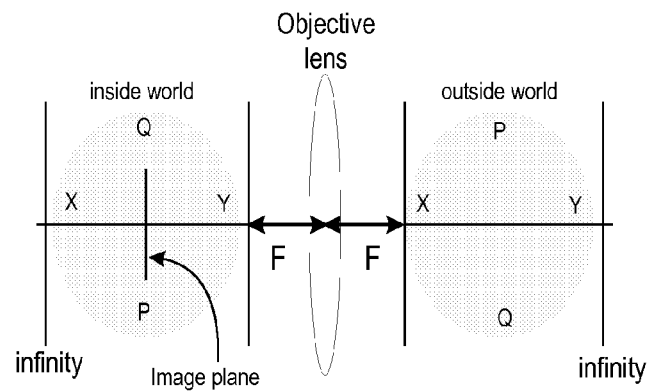
FIG. 1 illustrates imaging in a conventional camera.
Figure 2:
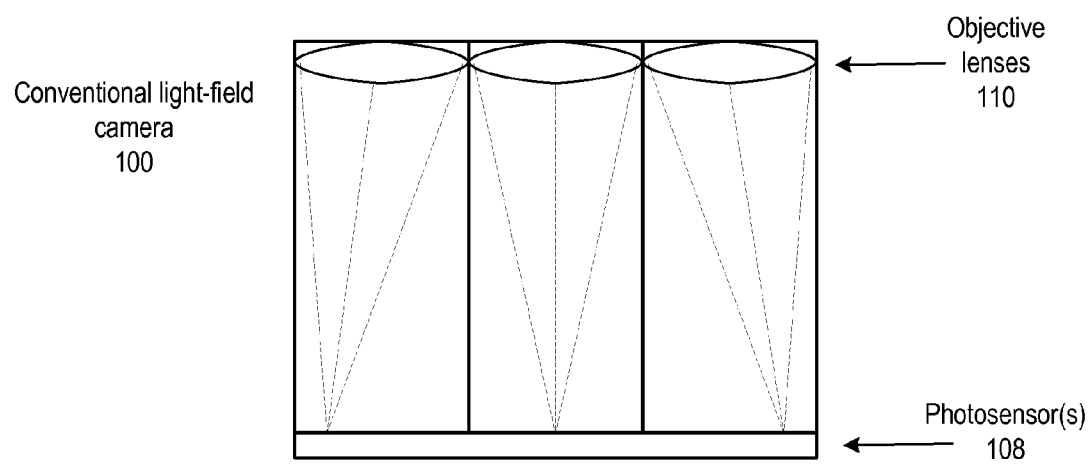
FIG. 2 illustrates an example prior art light-field camera, or camera array, which employs an array of two or more objective lenses.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of a method and apparatus for full-resolution light-field capture and rendering are described. Embodiments of a full-resolution radiance camera, which may also be referred to as a radiance camera or a focused plenoptic camera, and of a method for rendering high-resolution images from flat 2D representations of the 4D light-field, referred to herein as flats, captured by embodiments of the focused plenoptic camera, are described. The method for rendering high-resolution images from flats captured by embodiments of the focused plenoptic camera may be referred to as a full-resolution light-field rendering method, or simply as the light-field rendering method. The term "full resolution" does not directly refer to sensor resolution of the camera, but instead refers to resolution as supported by the captured radiance data.

Light-field photography enables many new possibilities for digital imaging because it captures both spatial and angular information, i.e., the full four-dimensional radiance, of a scene. High-resolution is required in order to capture four-dimensional data with a two-dimensional sensor. However, images rendered from this data as projections of the four-dimensional radiance onto two spatial dimensions using conventional light-field cameras and conventional light-field rendering methods are at significantly lower resolutions. Embodiments of the focused plenoptic camera and of the full-resolution light-field rendering method more adequately meet the resolution and image size expectations of modern photography than do conventional light-field cameras and rendering methods.

In embodiments of the focused plenoptic camera, the microlenses in the microlens array are focused on the image plane of the main camera lens, rather than on the main camera lens itself as in conventional plenoptic cameras. In the image plane, there is a real image of a scene in front of the camera and refracted by the main lens to the image plane, but there is nothing there physically (other than light); the image plane is simply a plane location in space that can be considered to have an image "in the air" as created by the main lens. The microlenses, being focused on the image plane instead of on the main lens, can capture the image of the scene at the image plane. Each microlens captures a small area or region of the image at the image plane and maps or projects the captured region onto a corresponding region of the photosensor. The imaging property of the focused plenoptic camera may be viewed as two steps: from the world through the main lens to the image plane, and then from the image plane through the microlenses to the photosensor. This is similar to a cascade of two cameras, but the second camera is actually many small cameras, as each microlens is effectively a little camera that captures a small image from the image plane. This is also similar to the way a telescope operates. By focusing the microlenses on the image produced by the main lens, embodiments of the focused plenoptic camera are able to fully capture the positional information of the radiance. Embodiments of the full-resolution light-field rendering method may be used to render full-resolution images from flats captured by embodiments of the focused plenoptic camera, producing output images at a dramatically higher resolution than conventional light-field rendering techniques. Embodiments may render images at spatial resolutions that meet the expectations of modern photography (e.g., 10 megapixel and beyond), making light-field photography much more practical.

An analysis of light-field camera structure and optics is given below that provides insight on the interactions between the main lens system and the microlens array in light-field cameras. Based on results of this analysis, embodiments exploit the fact that, at every plane of depth, the radiance contains a considerable amount of positional information about the scene, encoded in the angular information at that plane. Accordingly, embodiments may be referred to as full-resolution because embodiments make full use of both angular and positional information that is available in the four-dimensional radiance, as shown in the analysis. In contrast to super-resolution techniques, which create high-resolution images from sub-pixel shifted low-resolution images, embodiments render high-resolution images directly from the radiance data. Moreover, embodiments may generate light-field images that are amenable to radiance processing techniques such as Fourier slice refocusing.

FIGS. 5A through 5C show, for comparison, results from a conventional plenoptic camera and rendering method and results from example embodiments of a focused plenoptic camera and full-resolution light-field rendering method as described herein. FIG. 5A shows a raw light-field image as captured by a plenoptic camera. Note that, to the untrained human eye, the raw light-field image captured by a conventional plenoptic camera may look similar to the raw light-field image captured by an embodiment of the focused plenoptic camera. FIG. 5B shows a conventionally rendered final image, and FIG. 5C shows a final image rendered according to an embodiment of the full-resolution light-field rendering method as described herein. Even in this small, grayscale format, a drastic improvement in spatial resolution in FIG. 5C when compared to the spatial resolution in FIG. 5B is easily observable.

Focused Plenoptic Cameras

Figure 3:
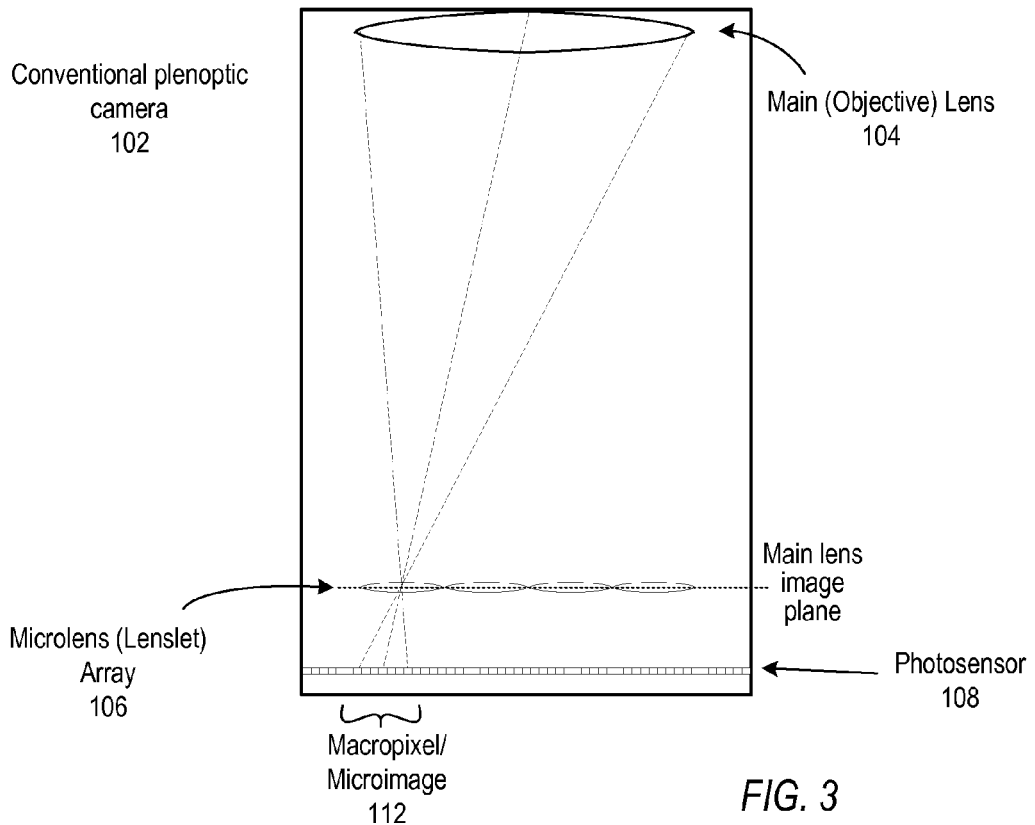
FIG. 3 illustrates an example prior art plenoptic camera that employs a single objective lens and a microlens array.
Figure 4:
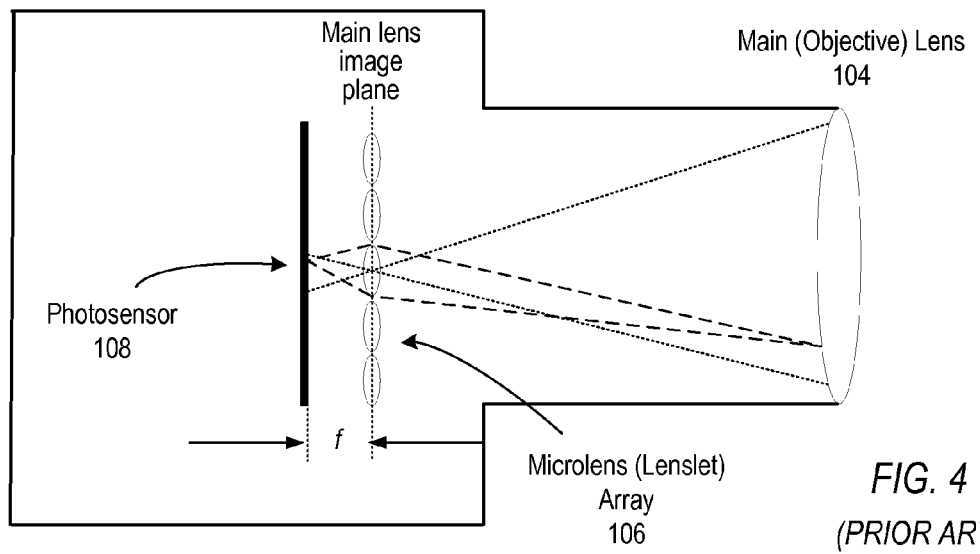
FIG. 4 further illustrates an example prior art plenoptic camera.

Various embodiments of a focused plenoptic camera are described. In conventional plenoptic cameras such as those illustrated in FIGS. 3 and 4, the microlenses are placed and adjusted accurately to be exactly at one focal length f from the photosensor, where f is the focal length of the microlenses. In addition, in conventional plenoptic cameras, the microlens array is fixed at the image plane of the main or objective lens of the camera, and the microlenses in the array are focused at infinity. In contrast, in embodiments of the focused plenoptic camera described herein, in order to increase or maximize spatial resolution, i.e., to achieve sharper, higher spatial resolution, microlens images, the microlenses are focused on the image created by the main lens inside the camera and in front of the microlenses (the image plane of the main lens), instead of being focused on the main lens itself, as in conventional plenoptic cameras. In further contrast to conventional plenoptic cameras, the microlenses in embodiments of the focused plenoptic camera described herein may be located at, or may be moved to, distances greater than f or less than f from the photosensor, where f is the focal length of the microlenses. In one embodiment, the array of microlenses may be placed at distance 4/3 f from the photosensor. Other embodiments may place the array of microlenses at other distances that are multiples of f e.g. 1.5f or ¾ f. In addition, embodiments of focused plenoptic cameras in which the distance of the microlens array from the photosensor is variable or adjustable, and in which other characteristics of the camera may be adjustable, are described. For example, in one embodiment, the distance of the microlens array from the photosensor may be adjustable within the range 0.5f to 1.5f. For the Keplerian telescopic case (the distance of the microlens array from the photosensor>f), a maximum useful distance may be 1.5 f, although distances greater than 1.5 f may be possible, if not practical. Thus, for the Keplerian telescopic case, a practical range for the distance of the microlens array from the photosensor may be f<b≤1.5f.

Various embodiments of the focused plenoptic camera implemented in digital cameras and in film cameras are anticipated, and example embodiments of both types are described. In digital cameras, the photosensor is a digital light-capturing device or medium such as a charge-coupled device (CCD) that captures and records the light in digital format. In film cameras, the photosensor is a film. Thus, "photosensor" as used herein refers to digital media that are used in digital cameras to capture light and to film media that are used in film cameras to capture light, and more generally to any device or medium that may be used to capture light. Light-field images captured on a film using film camera embodiments may subsequently be digitized, for example using a high-resolution scanner, so that the captured light-field may be rendered, for example using the full-resolution light-field rendering method described herein, to produce high-resolution output images. Light-field images captured using digital camera embodiments may be directly rendered.

In addition to digital and film embodiments, fixed and adjustable embodiments of both digital camera and film camera embodiments of the focused plenoptic camera are anticipated, and example embodiments of both types are described. In a fixed embodiment, the photosensor and the microlens array are at a fixed distance b from each other (the distance b is a multiple of f, for example 4/3f, ¾f, or 1.5f, where f is the focal length of the microlenses). Note that b is used herein to designate the distance between the microlenses and the photosensor, while a is used herein to designate the distance between the microlenses and the image plane of the main or objective lens. In some embodiments, the microlens array/photosensor combination may be fixed at a location in the camera body. In some embodiments, the microlens array may be fixed in optical characteristics as well as in its physical location. In some embodiments, the main lens of the camera may also be fixed in optical characteristics and location, while possibly allowing for changes in shutter speed, aperture, focusing, etc. In adjustable embodiments, various manual or automatic mechanisms may be employed to change the distance b between the photosensor and the microlens array, to change the location of the microlens array/photosensor combination in the camera body, to change the distance from the main lens to the microlens array, to change the distance a between the microlenses and the image plane, and/or to swap or replace various components such as the microlens array and the main lens. In addition, the main lens of the camera may be swappable to use different main lenses, and may be adjustable according to aperture, shutter speed, focusing, distance from the microlens array, and so on. Embodiments where the microlens array may be swappable, so that microlens arrays with different numbers of microlenses and/or microlenses with different optical characteristics may be used, are also possible.

The optical characteristics of the optical system, including the optical characteristics of the lenses and the distances between the various components or elements, is important in capturing light-fields that may be rendered to yield high-resolution output images as described herein. Thus, in fixed embodiments, the microlenses, main lens, photosensor, and the relative physical location of these components in the camera may be determined according to the formulas and equations described herein to capture appropriate and satisfactory light-field images. In adjustable embodiments, some embodiments may include automated mechanisms that automatically adjust the positioning or other aspects of one or more of the components to capture appropriate and satisfactory light-field images. For example, if the user adjusts or replaces one component, the camera may automatically adjust one or more other components to compensate for the change. Alternatively, a human operator of an adjustable focused plenoptic camera may manually adjust the positioning or other aspects of one or more of the components, may replace one or more components with units that have different characteristics, or may insert other components (e.g., microsheet glass, as described below) to capture appropriate and satisfactory light-field images.

Figure 6:
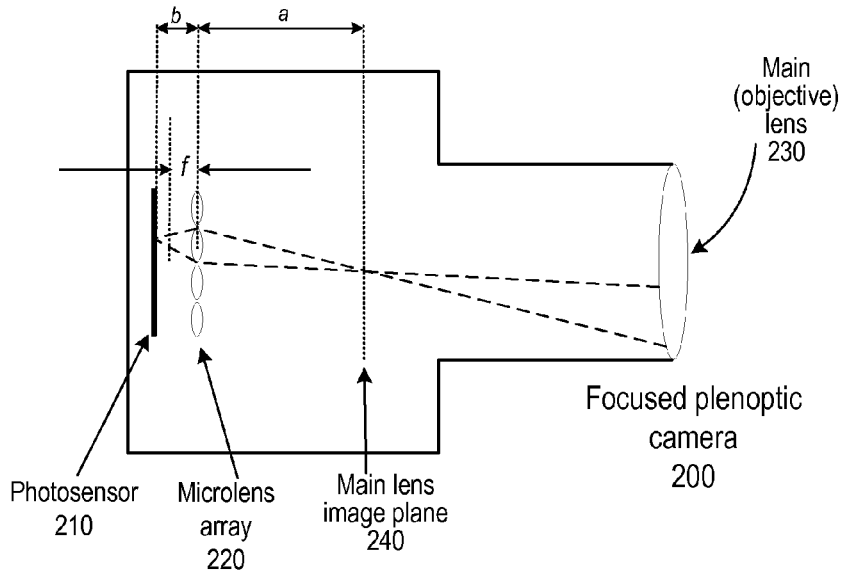
FIG. 6 is a block diagram illustrating a focused plenoptic camera according to one embodiment.
Figure 7:
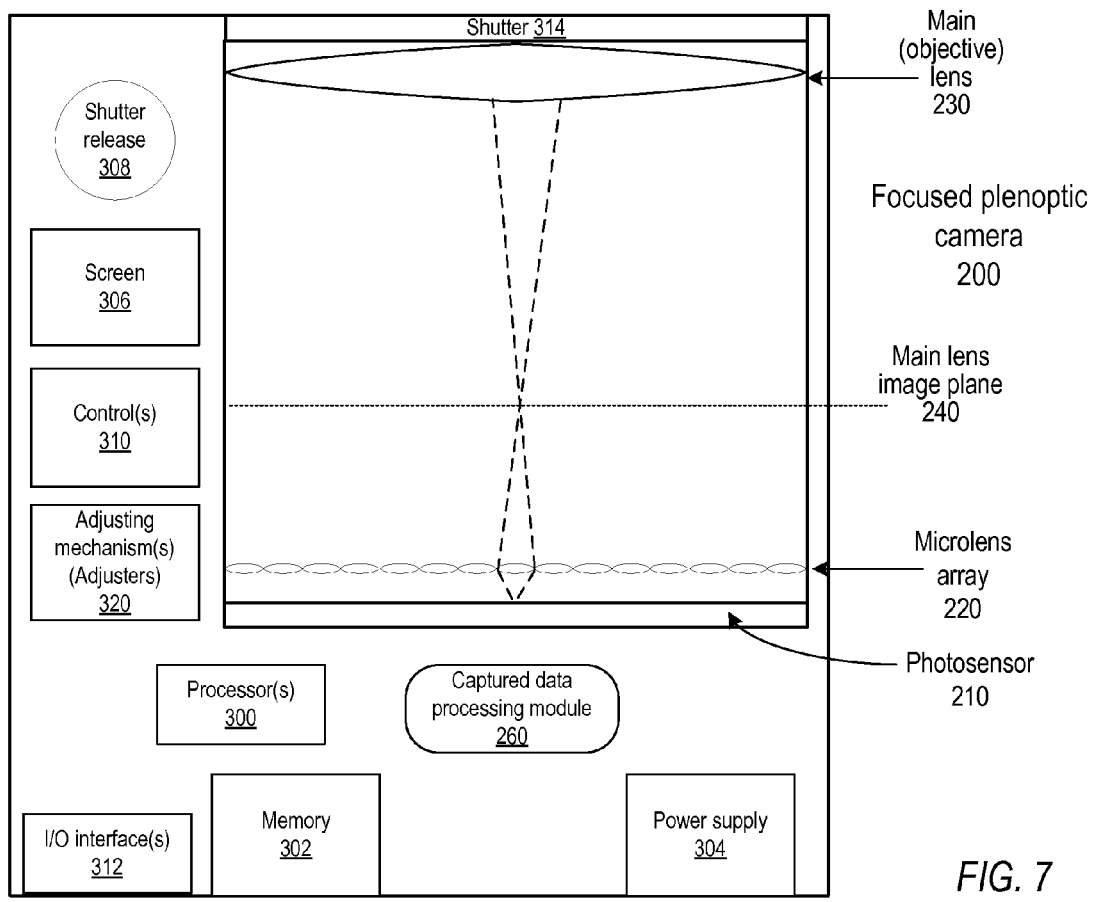
FIG. 7 illustrates an example embodiment of a focused plenoptic camera with various other elements that may be integrated in the camera.
Figure 8:
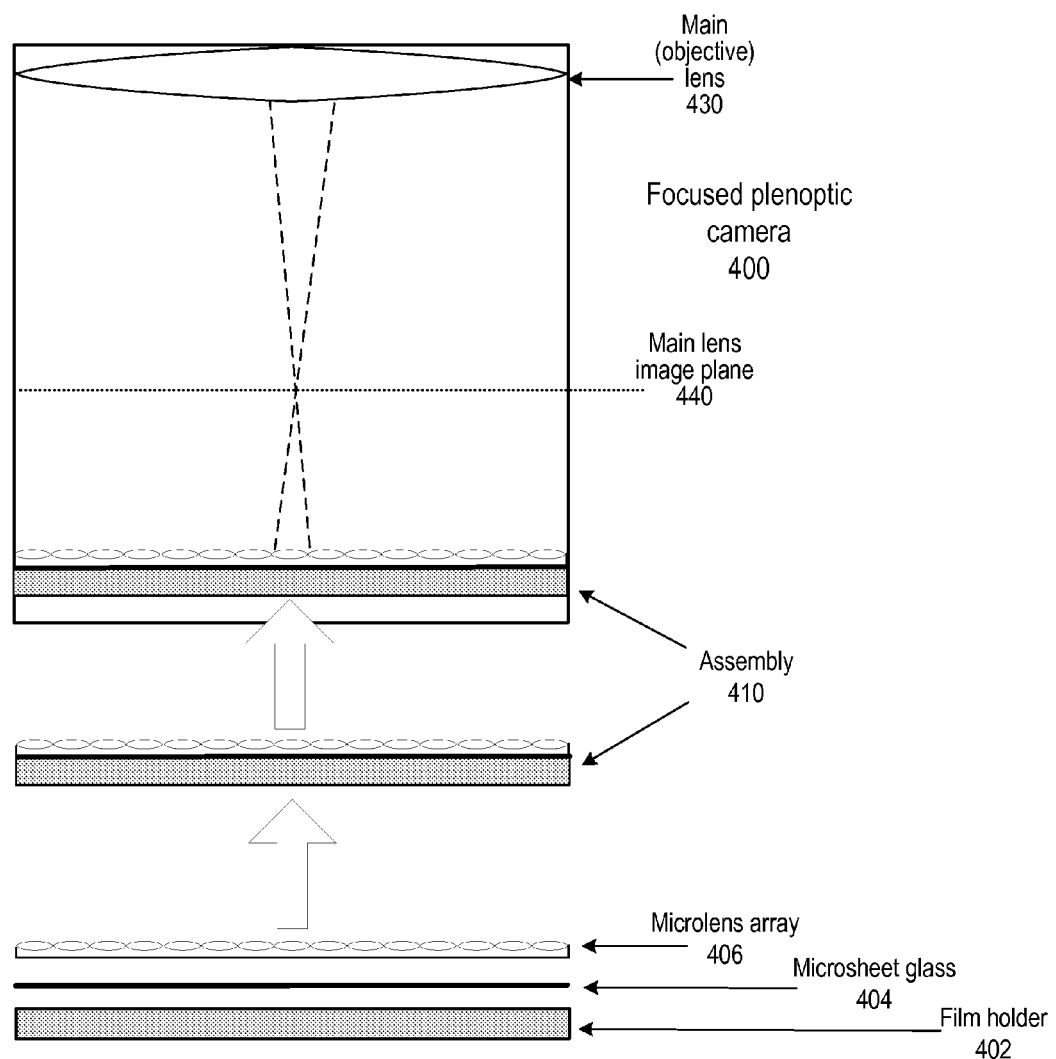
FIG. 8 illustrates an example embodiment of a focused plenoptic camera based on a large-format film camera.

FIGS. 6 through 8 illustrate example film camera and digital camera embodiments of a focused plenoptic camera as described herein, and further illustrate both fixed and adjustable embodiments of the focused plenoptic camera. It is noted that these are example embodiments, and are not intended to be limiting. Other embodiments are possible and anticipated.

Figure 16:
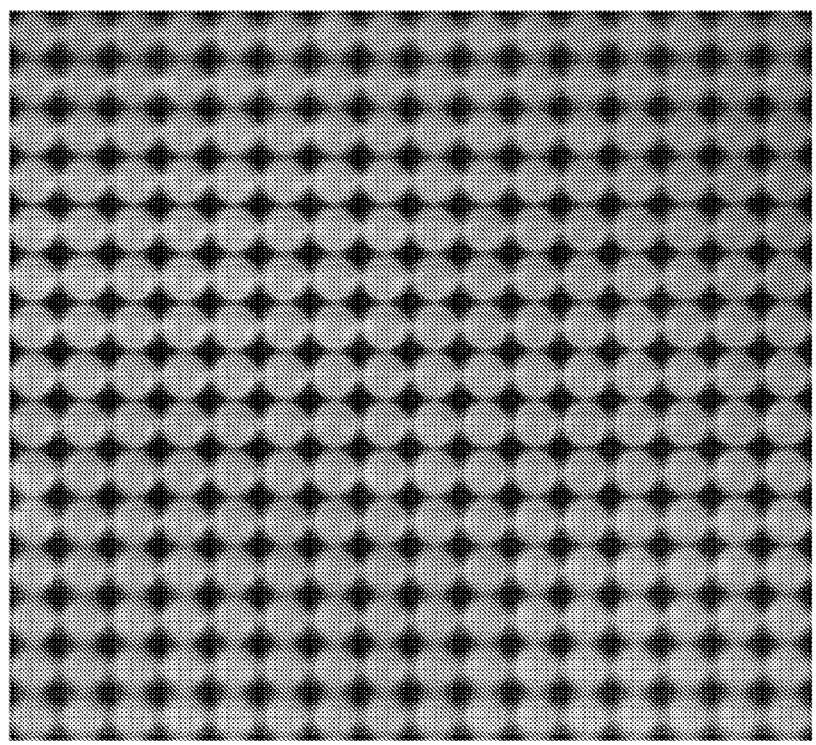
FIG. 16 shows a zoom into an example microlens array.

FIG. 6 is a block diagram illustrating a focused plenoptic camera according to one embodiment. Focused plenoptic camera 200 may include a main (objective) lens 230, a microlens array 220, and a photosensor 210. Microlens array 220 may be located at a distance greater than f from photosensor 210, where f is the focal length of the microlenses in array 220. In addition, the microlenses in array 220 are focused on the image plane 240 of the main lens 230. In contrast, in conventional plenoptic cameras such as plenoptic camera 102 of FIGS. 3 and 4, the microlens array 106 is fixed at distance f from photosensor 108, and the microlenses in array 106 are focused on the main lens 104. In some embodiment, photosensor 210 may be conventional film; in other embodiments, photosensor 210 may be a device for digitally capturing light, for example a CCD. In one embodiment of a microlens array 220 that may be used in embodiments of focused plenoptic camera 200, or in other embodiments as illustrated in FIGS. 7 and 8, the microlens array 220 may include 146,000 microlenses of diameter 0.25 mm and focal length 0.7 mm. Other configurations of microlens array 220, including different numbers of microlenses and/or microlenses with different optical characteristics, are possible and anticipated. FIG. 16 shows a zoom into an example microlens array, and shows individual microlenses and (black) chromium mask between the microlenses.

FIG. 7 illustrates an example embodiment of focused plenoptic camera 200 with various other elements that may be integrated in the camera 200. In some embodiments of focused plenoptic camera 200, the objective lens 230, the microlens array 220, and the photosensor 210 may be fixed. In other embodiments, one or more of the above elements may be replaceable and/or adjustable. In some embodiment, photosensor 210 may be conventional film; in other embodiments, photosensor 210 may be a device for digitally capturing light, for example a CCD. In general, embodiments of a focused plenoptic camera 200 as described herein may include, in addition to main lens 230, microlens array 220, and photosensor 210, any other type of elements and features commonly found in digital cameras or other cameras including light-field and plenoptic cameras and large-format film cameras, and may also include additional elements and features not generally found in conventional cameras.

Figure 24:
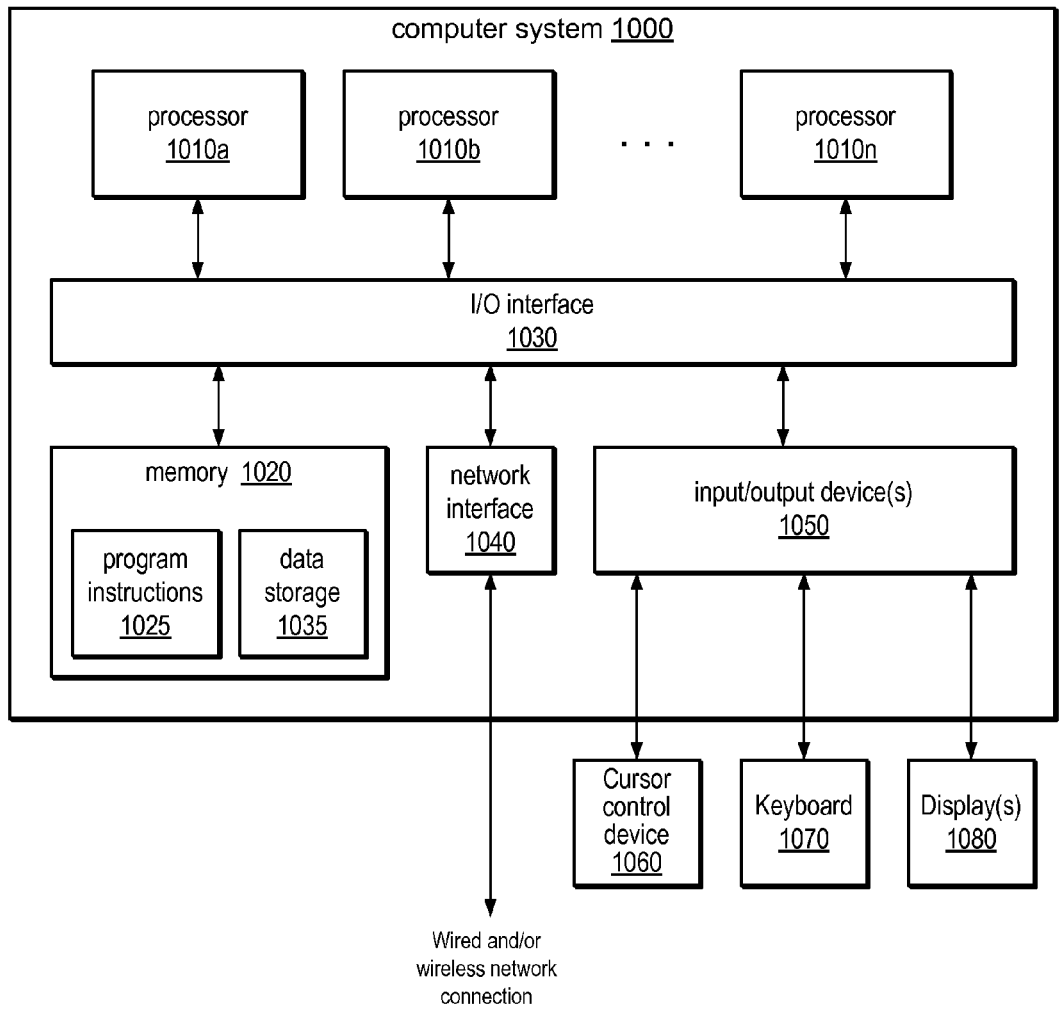
FIG. 24 illustrates an example computer system that may be used in embodiments.

In one embodiment, a full-resolution light-field rendering method for rendering high-resolution images from light-fields captured by focused plenoptic camera 200, and/or other image processing algorithms for application to light-fields captured by embodiments of focused plenoptic camera 200, may be implemented in captured data processing module 260. Captured data processing module 260 may be implemented in hardware, software, or a combination thereof. Alternatively, light-fields captured by focused plenoptic camera 200 may be rendered according to the full-resolution light-field rendering method implemented in a rendering module executing on a separate device, e.g. a computer system, to generate one or more high-resolution output images of a captured scene, as described herein. An example computer system in which embodiments of the full-resolution light-field rendering method may be implemented is illustrated in FIG. 24.

A focused plenoptic camera 200 may include a shutter 314. Shutter 314 may be located in front of or behind objective lens 230. A focused plenoptic camera 200 may include one or more processors 300. A focused plenoptic camera 200 may include a power supply or power source 304, such as one or more replaceable or rechargeable batteries. A focused plenoptic camera 200 may include a memory storage device or system 302 for storing captured light-field images and/or rendered final images or other information such as software. In one embodiment, the memory 302 may be a removable/swappable storage device such as a memory stick. A focused plenoptic camera 200 may include a screen 306 (e.g., an LCD screen) for viewing scenes in front of the camera prior to capture and/or for viewing previously captured and/or rendered images. The screen 306 may also be used to display one or more menus or other information to the user. A focused plenoptic camera 200 may include one or more I/O interfaces 312, such as FireWire or Universal Serial Bus (USB) interfaces, for transferring information, e.g. captured light-field images, software updates, and so on, to and from external devices such as computer systems or even other cameras. A focused plenoptic camera 200 may include a shutter release 308 that is activated to capture a light-field image of a subject or scene.

A focused plenoptic camera 200 may include one or more controls 310, for example controls for controlling optical aspects of the focused plenoptic camera 200 such as shutter speed, one or more controls for viewing and otherwise managing and manipulating captured images stored in a memory on the camera, etc. An adjustable focused plenoptic camera 200 may include one or more controls for adjusting the relative location of (the distance between) the components in the camera 200, such as the distance b between microlens array 220 and photosensor 210. An adjustable focused plenoptic camera 200 may include one or more manual or automatic adjusting mechanism(s) 320, or adjusters, configured to adjust the relative location of (the distance between) the components in the camera 200, such as the distance b between microlens array 220 and photosensor 210. In some embodiments, the adjusting mechanisms 320 may act to adjust one or more components responsively to controls 310.

FIG. 8 illustrates an example embodiment of a focused plenoptic camera 200 based on a large-format film camera. In conjunction with current high-resolution scanners used to digitize captured images from negatives or prints, large-format film camera embodiments are capable of up to 1 gigapixel, or even higher, resolution for the flat (a flat is a 2D representation of the 4D radiance). An example embodiment may, for example, be implemented in large-format film camera using a 135 mm objective lens 430 and 4×5 format film as the "photosensor" (in large-format cameras, single negatives of film are generally placed in a film holder 402 or cartridge that can be inserted into and removed from the camera body). Other objective lenses and/or other film formats, for example 8×10 format film, may be used in various embodiments. Focused plenoptic camera 400 includes a microlens array 406. FIG. 16 shows a zoom into an example microlens array, and shows individual microlenses and (black) chromium mask between the microlenses. In one embodiment of a microlens array that may be used in embodiments of focused plenoptic camera 400, or in other embodiments as illustrated in FIGS. 6 and 7, the microlens array 406 may include 146,000 microlenses of diameter 0.25 mm and focal length 0.7 mm. Other configurations of microlens array 406, including different numbers of microlenses and/or microlenses with different optical characteristics, are possible and anticipated.

In one embodiment, a mechanism inside a film holder 402 of the large-format film camera holds the microlens array 406 so that the flat side of the glass base of the array 406 is pressed against the film. In one embodiment, the thickness of the microlens array 406 is such that, when placed against the film, the microlenses are distance f from the film. Other configurations of microlens arrays 406 are possible, and the configuration of the large-format film camera makes it possible to easily change configurations of microlenses by simply using a different microlens array 406. Microsheets 404 of glass may be used in the assembly as spacers or shims between the microlens array 406 and the film in film holder 402 to increase the distance from the microlenses and the film to be greater than f (e.g., 4/3 f). An example thickness of a microsheet 404 that may be used is 0.23 mm. Inserting microsheet glass 404 provides spacing in a rigorously controlled manner. In one embodiment, additional spacing may be created by adding a single microsheet 404 between the film holder 402 and the microlens array 406 in order to displace the microlenses by an additional ⅓ f, approximately 0.2 mm from the sensor. Additional microsheets 404 may be added to provide additional spacing. In some embodiments, other mechanisms than microsheet glass may be used as spacers between the microlens array 406 and film holder 402 to adjust the distance between the microlens array 406 and film holder 402.

As illustrated in FIG. 8, in one embodiment, the film holder 402 and microlens array 406 may be coupled to create assembly 410. One or more microsheets 404 may optionally be inserted between the film holder 402 and microlens array 406 to provide additional spacing as necessary or desired. The assembly 410 may then be inserted into the large-format film camera. The combination of the large-format film camera and the assembly 410 effectively forms a focused plenoptic camera 400. Focused plenoptic camera 400 may then be used to capture a flat of a scene on the film in film holder 402. A flat is a 2D representation of the 4D lightfield. The assembly 410 may then be removed from the camera 400, disassembled, and the film may be appropriately processed. The film negative and/or a print of the flat may then be digitized, for example using a high-resolution scanner or a device that generates digital images from negatives. The digitized flat may be stored to a storage device, such as a disk drive, DVD, CD, etc. The digitized flat may be rendered according to the full-resolution light-field rendering method, implemented in a rendering module executing on a computer system, to generate one or more high-resolution output images of the scene as described herein. An example computer system in which embodiments of the full-resolution light-field rendering method may be implemented is illustrated in FIG. 24.

An analysis of the full-resolution light-field rendering methods and apparatus provided herein shows that focusing the microlenses on the image plane of the main lens in the focused plenoptic camera, rather than focusing on the main lens itself as in conventional plenoptic cameras, enables embodiments of the full-resolution light-field rendering methods and apparatus to more fully exploit positional information available in the captured flat (i.e., the 2D representation of the 4D light-field) captured by the light-field camera). Based on good focusing and high-resolution of the microlens images, embodiments of the described methods and apparatus are able to achieve very high-resolution of rendered images when compared to conventional plenoptic cameras and conventional rendering methods. For example, one embodiment achieves a 27× increase in resolution in each spatial dimension when compared to results from conventional plenoptic cameras and conventional rendering methods.

Full-Resolution Light-Field Rendering Method

Embodiments of a method and apparatus for rendering high-resolution images from a light-field, for example captured by embodiments of the focused plenoptic camera, are described. The method for rendering high-resolution images from the light-field may be referred to as a full-resolution light-field rendering method. The light-field rendering method may be referred to as full-resolution because the method makes full use of both positional and angular information available in the captured radiance data. The full-resolution light-field rendering method may be implemented as or in a tool, module, library function, plug-in, stand-alone application, etc. For simplicity, implementations of embodiments of the full-resolution light-field rendering method may be referred to as a rendering module. Alternatively, or in addition, other light-field rendering or processing techniques may be applied to captured flats by a rendering module, and/or by other modules. FIG. 24 illustrates an example computer system on which embodiments of a rendering module may be implemented.

A description of the full-resolution light-field rendering method and an analysis of the limits and tradeoffs of the method are presented. The effectiveness of the full-resolution light-field rendering method when compared to conventional methods may be demonstrated experimentally by rendering images from a 542-megapixel light-field using a conventional rendering approach and using the full-resolution light-field rendering method described herein. In the experiments, the conventional rendering methods produce a 0.146-megapixel final image, while the full-resolution light-field rendering method produces a 106-megapixel final image. Experimental results show that our method may produce full-resolution images that approach the resolution that would have been captured directly with a conventional (non-light-field) high-resolution camera.

Plenoptic Camera Modes of Behavior

The full-resolution light-field rendering method may be derived by analyzing the optical system of the plenoptic camera. First, some observations of captured flats, which are 2D representations of the 4D light-field, are presented, and these observations are used to motivate the subsequent analysis.

Figure 9:
FIG. 9 shows an example crop from a flat captured with a plenoptic camera.

FIG. 9 shows an example crop from a raw flat captured with a plenoptic camera. In FIG. 9, repeated edges inside multiple circles may be observed. Each microlens in the microlens array creates a microimage; the resulting flat is thus an array of microimages. On a large scale, the overall image may be perceived, whereas the correspondence between the individual microlens images and the large scale scene is less obvious. Interestingly, as will be shown, it is this relationship—between what is captured by the microlenses and what is in the overall scene—that may be exploited in embodiments to create high-resolution images.

In FIG. 9, on a small scale, a number of clearly distinguishable features inside the circles, such as edges, may be observed. Edges are often repeated from one circle to the next. The same edge (or feature) may be seen in multiple circles, in a slightly different position that shifts from circle to circle. If the main camera lens is manually refocused, a given edge can be made to move and, in fact, change its multiplicity across a different number of consecutive circles.

Repetition of features across microlenses is an indication that that part of the scene is out of focus. When an object from the large-scale scene is in focus, the same feature appears only once in the array of microimages.

In interpreting the microimages, it is important to note that, as with the basic conventional camera described above, the operation of a basic plenoptic camera is richer than a simple mapping of the radiance function at some plane in front of the main lens onto the sensor. That is, there are an essentially infinite number of mappings from the scene in front of the lens onto the image sensor. For one particular distance, this corresponds to a mapping of the radiance function. What the correspondence is for parts of the scene at other distances—as well as how they manifest themselves at the sensor—is less obvious. This will be the topic of the remaining part of this section.

Next, two limiting cases are considered which can be recognized in the behavior of the plenoptic camera: Keplerian telescopic (where the distance between the photosensor and the microlens array, b, is greater than the focal length f of the microlenses in the array) and Galilean telescopic (also referred to as binocular) (where b is less than f). Neither of those cases is exact for a true plenoptic camera, but their fingerprints can be seen in every plenoptic image. As will be show, both are achievable, and are very useful.

Plenoptic Camera: Keplerian Telescopic Case

Figure 10:
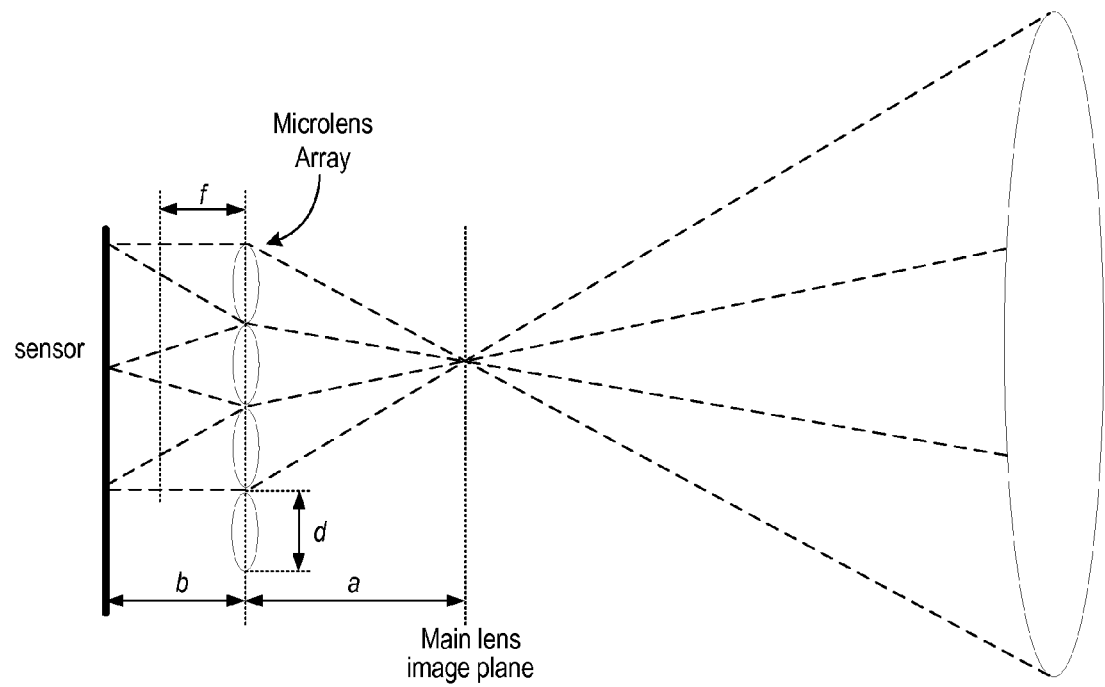
FIG. 10 illustrates the Keplerian telescopic case for a plenoptic camera.

FIG. 10 illustrates the Keplerian telescopic case (b>f) for a plenoptic camera. A plenoptic camera may be considered as an array of (Keplerian) telescopes with a common objective lens. (For the moment the issue of microlenses not being exactly focused for that purpose will be ignored.) Each individual telescope in the array has a microcamera (an eyepiece lens and the eye) inside the big camera. Just like any other camera, this microcamera is focused onto one single plane, and maps the image from the plane onto the retina, inverted and reduced in size. A camera can be focused only for planes at distances ranging from f to infinity (∞) according to the lens equation:

$$\frac{1}{a} + \frac{1}{b} = \frac{1}{f}$$

Here, a, b, and f have the same meaning as for the big camera, except on a smaller scale. It can be seen that since a and b must be positive, it is not possible to focus closer than f. In a conventional plenoptic camera, the image plane is fixed at the microlenses. It may be more natural to consider the image plane fixed at distance f in front of the microlenses. In both cases, microimages are out of focus.

Figure 11:
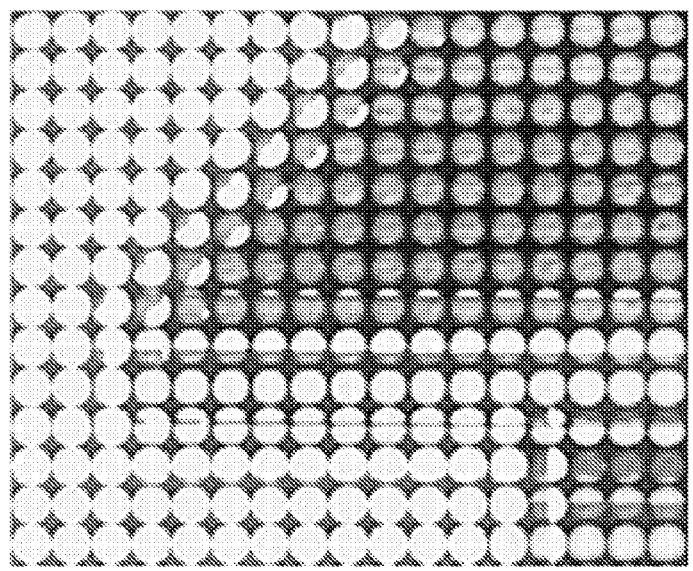
FIG. 11 shows a crop from the roof area in FIG. 9, and visually illustrates the Keplerian telescopic behavior in light-field cameras.

Following the movement of an edge from circle to circle, characteristic behavior of Keplerian telescopic imaging in the flat may be observed. FIG. 11 shows a crop from the roof area in FIG. 9. FIG. 11 may be used to visually illustrate the Keplerian "telescopic" behavior. It is possible to observe in FIG. 11 that the edge is repeated two times when moving away from the roof. The farther from the roof a circle is, the farther the edge appears inside that circle. Moving in any given direction, the edge moves relative to the circle centers in the same direction. Once detected in a given area, this behavior is consistent (valid in all directions in that area). Careful observation shows that images in the small circles are indeed inverted patches from the high-resolution image, as if observed through a telescope.

For the Keplerian telescopic case, a practical range for b may be f<b≤1.5 f.

Plenoptic Camera: Galilean Telescopic (Binocular) Case

Figure 12:
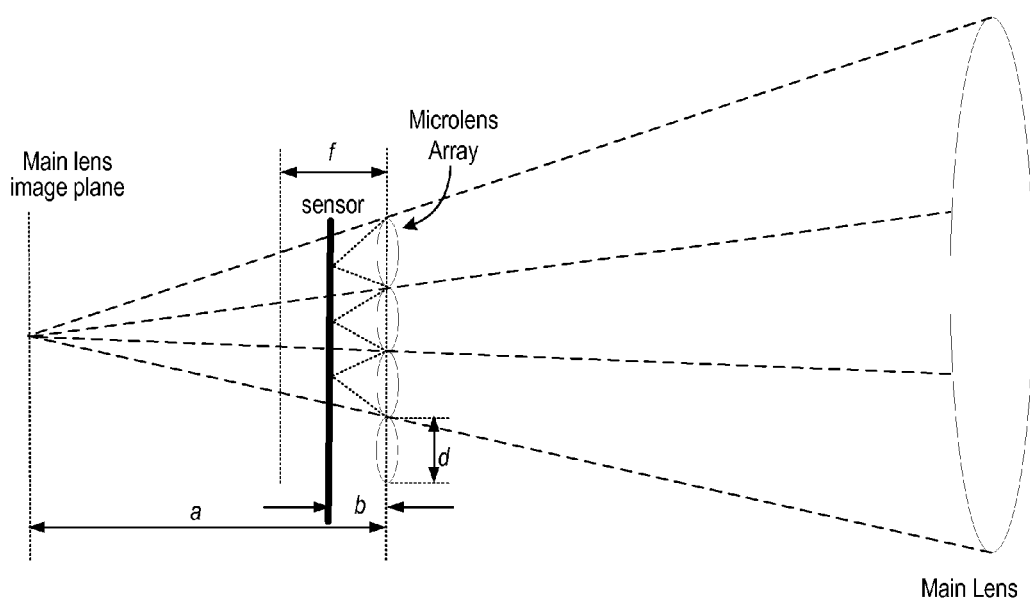
FIG. 12 illustrates the Galilean telescopic case for a plenoptic camera.
Figure 13:
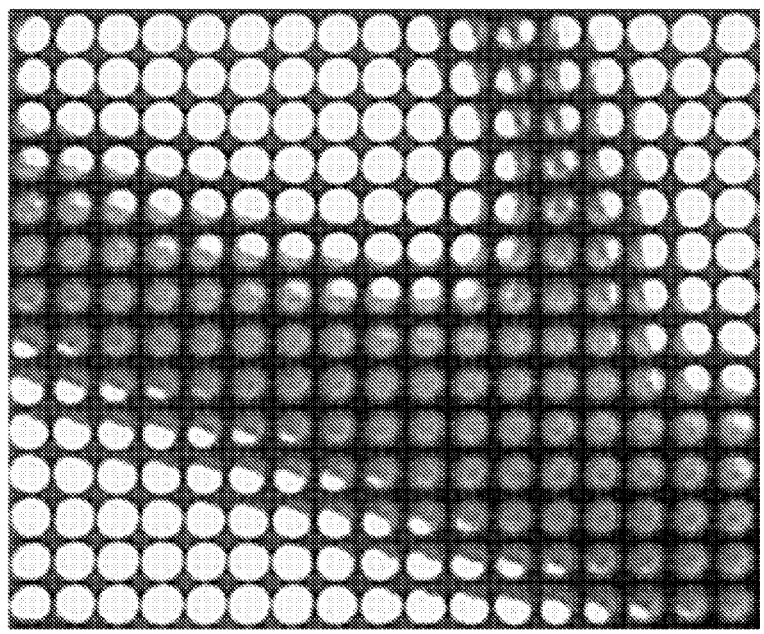
FIG. 13 shows a crop from the tree area in FIG. 9, and visually illustrates the Galilean telescopic behavior in light-field cameras.

FIG. 12 illustrates the Galilean telescopic, or binocular, case (b<f) for a plenoptic camera. FIG. 13 shows a crop from the tree area in FIG. 9, and is used to illustrate details of Galilean telescopic imaging in light-field cameras. Note that the image is not inverted in FIG. 13. A plenoptic camera may also be considered as an "incompletely focused" camera, i.e., a camera focused behind the film plane (as in a Galilean telescope and in binoculars). If an appropriate positive lens is placed in front of the film, the image would be focused on the film. For a Galilean telescope, this is the lens of the eye that focuses the image onto the retina. For a plenoptic camera, this role is played by the microlenses with focal length f. In the Galilean telescopic case, the microlenses would need to be placed at a distance smaller than f from the film. Note also that while the Keplerian telescopic operation inverts the inside image, the Galilean telescopic operation does not invert it.

As with Keplerian telescopic imaging, characteristic behavior of Galilean telescopic imaging can be observed in the plenoptic camera. See FIG. 13, which is a crop from the top left corner in FIG. 9. In FIG. 13, it can be observed that edges are repeated about two or three times when moving away from the branch. The farther from the branch, the closer to the branch the edge appears inside the circle. Moving in any given direction, the edge moves relative to the circle centers in the opposite direction. Once detected in a given area, this behavior is consistent (valid in all directions in that area). This is due to the depth in the image at that location. Careful observation shows that images in the small circles are in fact patches from the corresponding area in the high-resolution image, only reduced in size. The more times the feature is repeated in the circles, the smaller it appears and thus a bigger area is imaged inside each individual circle.

To summarize, an approximately focused plenoptic camera (i.e., a plenoptic camera where b≠f) may be considered as an array of microcameras looking at an image plane in front of the array or behind the array. Each microcamera images only a small part of that plane. The shift between those small images is obvious from the geometry, as explained below in the section titled Analysis. If at least one microcamera could image this entire plane, it could directly capture a high-resolution image. However, the small images are limited in size by the main lens aperture.

The magnification of these microcamera images, and the shift between them, is defined by the distance to the image plane. This distance can be at positive or negative distance from the microlenses, corresponding to the Keplerian telescopic (positive) and Galilean telescopic (negative) cases described above. By slightly adjusting the plane of the microlenses (so that the lenses are in focus), embodiments can make use of the Keplerian telescopic or Galilean telescopic behavior to generate a high-resolution image from the flat. This process is described in the following sections.

Analysis

In some embodiment, microlenses may not be focused exactly on the plane that is to be imaged, causing the individual microlens images to be blurry. This may limit the amount of resolution that can be achieved. One way to improve such results would be deconvolution. Another way would be to stop down the microlens apertures.

Figures 14A, 14B:
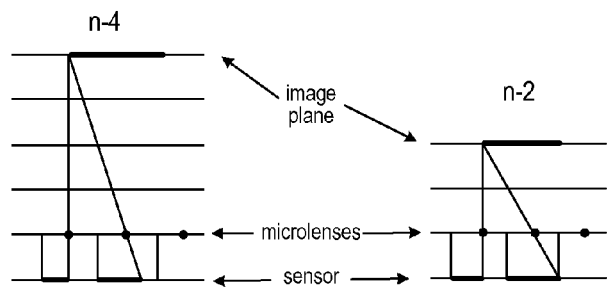
FIG. 14A shows the ray geometry in the Keplerian telescopic case for n=4.
FIG. 14B shows the ray geometry in the Keplerian telescopic case for n=2.

In FIGS. 14A and 14B, the case of a "plenoptic" camera using a pinhole array instead of microlens array is considered. In FIGS. 14A and 14B, an array of pinholes (or microlenses) maps the image in front of the array to the sensor. The distance to the image defines the magnification factor M=n−1. In ray optics, in theory, pinhole images produce no defocus blur, and in this way are perfect. But this is in theory; in the real world, pinholes are replaced with finite but small apertures and microlenses.

From the lens equation:

$$\frac{1}{a} + \frac{1}{b} = \frac{1}{f}$$

it can be seen that, if the distance to the object is a=nf, the distance to the image would be:

$$b = \frac{nf}{n-1}$$

$$n = \frac{b}{b-f}$$

The geometric magnification factor may be defined as M=a/b, which by substitution gives:

$$M=n-1$$

FIG. 14A shows the ray geometry in the Keplerian telescopic case for n=4, and FIG. 14B shows the ray geometry in the Keplerian telescopic case for n=2. Note that the distance b from the microlenses to the sensor is always greater than f (this is not represented in FIGS. 14A and 14B). Looking at the geometry in FIGS. 14A and 14B, the images are M times smaller, inverted, and repeated M times.

Full-Resolution Light-Field Rendering Algorithm

Two distinct behaviors (Keplerian telescopic and Galilean telescopic) are described above, and embodiments of the full-resolution light-field rendering method may execute a different action based on which behavior is observed in the microimages contained in the flat captured by a focused plenoptic camera. In one embodiment, if the full-resolution light-field rendering method detects edges (or features) moving relative to the microimage centers (the microimages are generally circular, so may be referred to as circles) in the same direction as the direction of movement, all microimages in that area are inverted relative to their individual centers (this is the Keplerian telescopic case). If the full-resolution light-field rendering method detects edges moving relative to the microimage centers in a direction opposite to the direction of movement, the method does nothing (this is the Galilean telescopic case). In some embodiments, examination of the microimages to determine the direction of movement of edges may be performed by a user via a user interface. The user may mark or otherwise indicate areas that the user determines need be inverted via the user interface. In some embodiments, examination of the microimages to determine the direction of movement of edges may be performed automatically in software.

The small circles, or microimages, in a flat are, effectively, puzzle pieces of the big image, and embodiments of the full-resolution light-field rendering method reproduce the big image by bringing the microimages sufficiently close together. The big image may also be reproduced by enlarging the pieces so that features from any given piece match those of adjacent pieces. Assembling the resized pieces reproduces exactly the high-resolution image.

Figure 15:
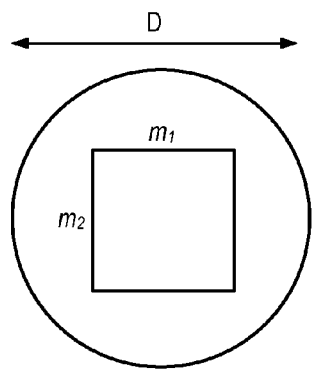
FIG. 15 illustrates a lens circle (or microimage) of diameter D and a patch or crop of size $m_1 \times m_2$, where at least one of $m_1$ and $m_2$ is an integer greater than or equal to 2.

In either of these approaches, the individual pieces may overlap. FIG. 15 illustrates a lens circle (or microimage) of diameter D and a patch of size $m_1 \times m_2$, where at least one of $m_1$ and $m_2$ is an integer greater than or equal to 2. Some embodiments of the full-resolution light-field rendering method avoid this overlapping by dropping all pixels outside a square of size $m_1 \times m_2$, effectively cropping the microimage to an $m_1 \times m_2$ square. Note that other embodiments may crop to other geometric shapes, such as a rectangle.

Conventional rendering methods do not reassemble pixels as described above; the conventional plenoptic camera algorithm produces one pixel per microlens for the output image. Embodiments of the full-resolution light-field rendering method, using the algorithm described above, produce a gain in resolution that is approximately equal to the number of pixels $m_1 \times m_2$ in the original patches. That is, embodiments produce $m_1 \times m_2$ pixels, instead of one pixel, per microimage It has been shown above that the magnification M=n−1. It is also the case that M=D/m. It therefore follows that:

$$n = 1 + \frac{D}{m}$$

From the above, the distance (measured in number of focal lengths) to the image plane in front of the microlens is related to D and m.

It is important to note that lenses produce acceptable images even when they are not exactly in focus. Additionally, out of focus images can be deconvolved, or simply sharpened. For those reasons, the above analysis is actually applicable for a wide range of locations of the image plane. Even if not optimal, such a result is often a useful tradeoff.

The optics of the microlens as a camera is the main factor in determining the quality of each microimage. Blurry images from optical devices may be deconvolved and the sharp image recovered to some extent. In order to do this, the effective kernel of the optical system should be known. While there are limitations in this related to bit depth and noise, embodiments may increase resolution up to $m_1 \times m_2$ times the resolution of a conventional plenoptic camera and conventional rendering method. Example embodiments have demonstrated a 27× increase of resolution in one plane, and a 10× increase of resolution in another plane, when compared to conventional methods and apparatus, and without any deconvolution. Other embodiments may yield other increases in resolution when compared to conventional methods and apparatus.

Example Results

Some embodiments of a focused plenoptic camera as described herein may be implemented in film cameras. Embodiments may, for example, be implemented in large-format film cameras. An example large-format film camera embodiment is illustrated in FIG. 8. One example embodiment may, for example, be implemented in large-format film camera using a 135 mm objective lens and 4×5 format film. A focused plenoptic camera based on a large-format film camera rather than on a digital camera may be used for experimental purposes in order to avoid resolution constraint of digital sensors. However, film camera embodiments of the focused plenoptic camera design are practical and may have practical applications. In conjunction with current high-resolution scanners used to digitize captured images from negatives or prints, large-format film camera embodiments are capable of 1 gigapixel, or even higher, resolution for the flat (2D) representation of the 4D radiance (the raw flat).

A component of the focused plenoptic camera is a microlens array. FIG. 16 shows a zoom into an example microlens array, and shows individual microlenses and (black) chromium mask between the microlenses. In one embodiment of a microlens array that may be used in the example embodiment based on a large-format film camera, the microlens array includes 146,000 microlenses of diameter 0.25 mm and focal length 0.7 mm. A mechanism inside a 4×5 inch film holder of the large-format film camera holds the microlens array so that the flat side of the glass base is pressed against the film. In one embodiment, the thickness of the microlens array is such that, when placed against the film, the microlenses are distance f from the film. Other configurations of microlens arrays are possible, and the configuration of the large-format film camera makes it possible to easily change configurations of microlenses by simply using a different microlens array. Microsheets of glass may be used in the assembly as spacers or shims between the microlens array and the film to increase the distance from the microlenses and the film to be greater than f (e.g., 4/3 J). An example thickness of a microsheet that may be used is 0.23 mm. Inserting microsheet glass provides spacing in a rigorously controlled manner. In one embodiment, additional spacing may be created by adding a single microsheet between the film and the microlenses in order to displace the microlenses by an additional ⅓ f, approximately 0.2 mm from the sensor. Additional microsheets may be added to provide additional spacing.

Experiments may be conducted both with and without inserting microsheets of glass as spacers or shims between the microlens array and the film in the example film camera used for testing. In both cases, the focal length of the microlenses is f=0.700 mm. The spacing in two experimental conditions differ as follows:

- b=0.71 mm so that n=71 and M=70, which is made possible directly by the thickness of glass of the microlens array assembly itself; and
- b=0.94 mm based on microsheet glass between microlens array and film. As a result, n=3.9 (almost 4) and M=3, approximately.

High-Resolution Rendering Methods and Results

FIGS. 17 through 20 are used to illustrate experimental results from applying the full-resolution rendering method to flats captured with the example focused plenoptic camera based on a large-format film camera described above. In particular, the operation of rendering in both the Keplerian telescopic case and the Galilean telescopic case is illustrated and described.

Figure 17:
FIG. 17 shows a portion of a digitized flat.

The original, unrendered flat was generated by capturing the image on film using the example focused plenoptic camera based on a large-format film camera, and digitizing the image via a scanning process using a high-resolution scanner. A portion of the digitized flat is shown in FIG. 17. After digitization, the full original flat is 24,862×21,818 pixels, of which 2,250×1,950 pixels are shown in FIG. 17. The approximate region of the original flat extracted to produce FIG. 17 is shown by small solid white rectangle in FIG. 18C.

Output images rendered from the flat using conventional rendering methods are shown in FIGS. 18A through 18C. The entire flat was rendered with the conventional method, resulting in a 408×357 pixel image. FIG. 18A is rendered at 300 ppi, while FIG. 18C is rendered at 72 ppi. At 300 ppi, the image is only about 1 inch by 1 inch. FIG. 18B shows a 27× magnification of a crop of the curb area from the 300 ppi image in FIG. 18A. The solid white rectangle in FIG. 18C shows the region from the light-field shown in FIG. 17. The dashed white rectangle in FIG. 18C shows a region that is rendered according to an embodiment of the full-resolution light-field method as shown in FIGS. 19 and 20.

Figure 19:
FIG. 19 shows a full-resolution rendering of a light-field, rendered assuming the Keplerian telescopic case according to one embodiment of the full-resolution light-field rendering method.

FIG. 19 show a full-resolution rendering of the experimental light-field, rendered assuming the Keplerian telescopic case according to one embodiment of the full-resolution light-field rendering method described herein. This region of the image is shown by the dashed white rectangle in FIG. 18C. For this rendering, the scaling-down factor was taken to be approximately 2.4, so that the full-resolution rendered image measured 11016×9666, i.e., over 100 megapixels. Even though the image is at 300 dpi, only a 2,250×1,950 region is shown in FIG. 19. The image is well-focused at full-resolution in the region of the house, but not well-focused on the tree branches.

Figure 20:
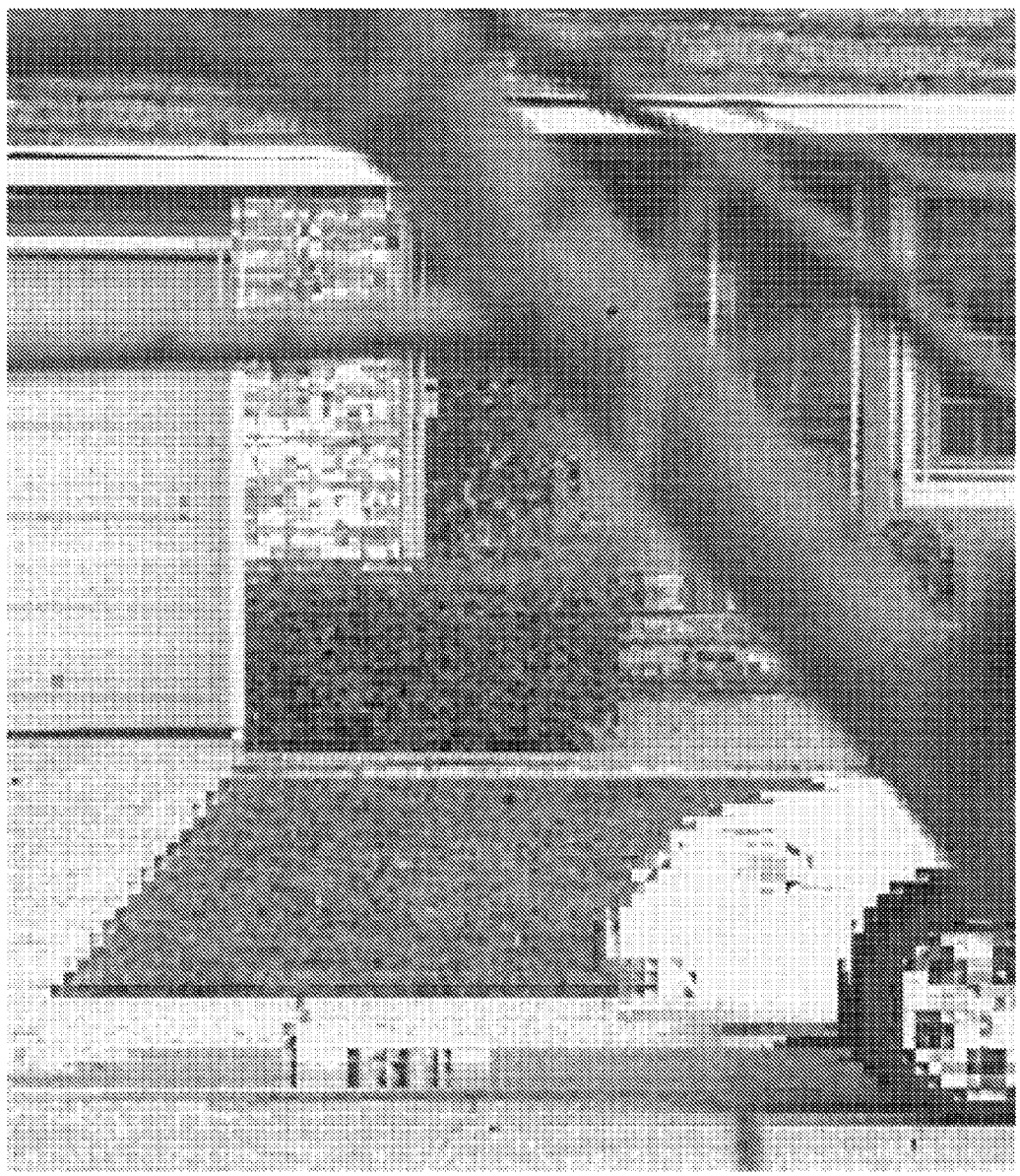
FIG. 20 shows a full-resolution rendering of a light-field, rendered assuming the Galilean telescopic case according to one embodiment of the full-resolution light-field rendering method.

FIG. 20 shows a full-resolution rendering of the experimental light-field, rendered assuming the Galilean telescopic case according to one embodiment of the full-resolution light-field rendering method described herein. This region of the image is shown by the dashed white rectangle in FIG. 18C. Note that, in contrast to the image in FIG. 20, this image is well-focused at full-resolution in the region of the tree branches but not well-focused on the house.

Figure 21:
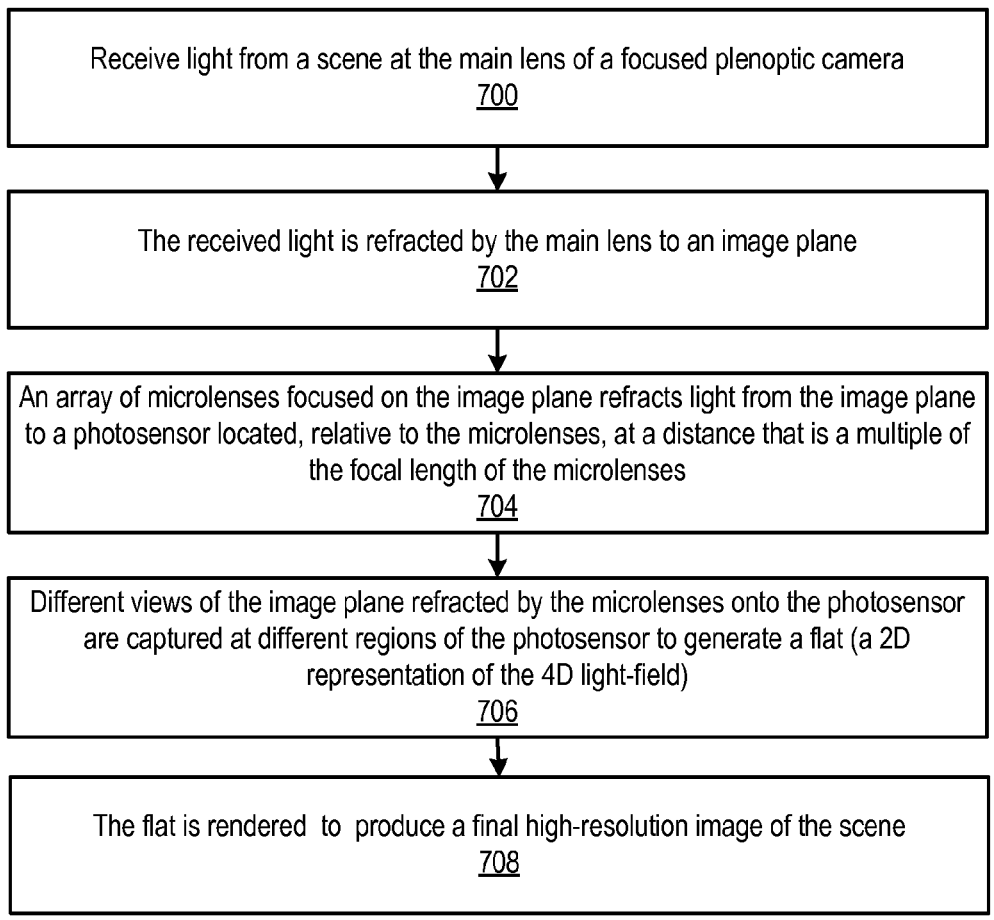
FIG. 21 is a flow chart illustrating how light is directed within a focused plenoptic camera according to one embodiment.

FIG. 21 is a flow chart illustrating how light is directed within a focused plenoptic camera according to one embodiment. As indicated at 700, light from a scene is received at the main lens of a focused plenoptic camera. FIGS. 6, 7 and 8 illustrate example focused plenoptic cameras. As indicated at 702, the received light is refracted by the main lens to an image plane. As indicated at 704, an array of microlenses, the microlenses of which are focused on the image plane, refracts light from the image plane onto a photosensor located, relative to the microlenses, at a distance that is a multiple of the focal length f of the microlenses. For example, the distance between the microlenses and the photosensor may be ¾ f, 4/3 f, 5/3 f, 1.5 f, and so on. As indicated at 706, different views of the image plane, refracted by the microlenses onto the photosensor, are captured at different regions of the photosensor to generate a flat, which is a 2D representation of the 4D light-field. In some embodiments, the photosensor may be a device configured to digitally capture light such as a CCD, while in other embodiments the photosensor may be conventional film. As indicated at 708, the captured flat may be rendered to produce a final high-resolution image, or images, of the scene, for example using a full-resolution light-field rendering method as described in FIG. 22. For flats captured on conventional film, the flat may be digitized to generate a digitized flat before rendering.

Figure 22:
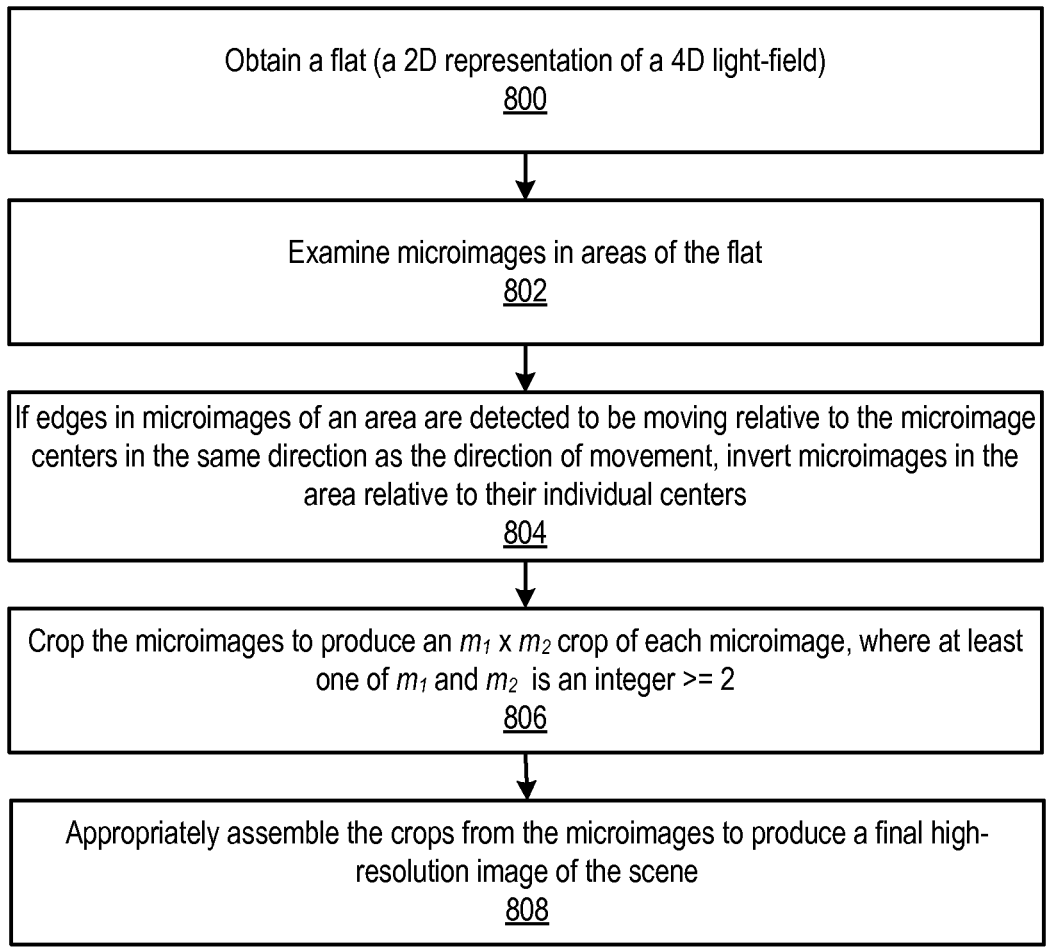
FIG. 22 is a flowchart of a full-resolution light-field rendering method according to one embodiment.

FIG. 22 is a flowchart of a full-resolution light-field rendering method according to one embodiment. As indicated at 800, a flat captured by a focused plenoptic camera may be obtained (see, e.g., FIG. 9 for an example of what such a flat may look like to a human observer). As indicated at 802, microimages in areas of the flat may be examined (manually or automatically, as described below) to determine the direction of movement of edges in the microimages relative to a direction of movement of the algorithm. At 804, if it is determined that edges in microimages of an area are moving relative to the microimage centers in the same direction as the direction of movement, the microimages in that area may be inverted relative to their individual centers. If the edges are not moving relative to the microimage centers in the same direction as the direction of movement (i.e., if the edges are moving in the opposite direction as the direction of movement), then the microimages in the area are not inverted.

In some embodiments, examination of the microimages to determine the direction of movement of edges may be performed manually by a user via a user interface. The user may mark or otherwise indicate areas that the user determines need be inverted via the user interface. In some embodiments, examination of the microimages to determine the direction of movement of edges may be performed automatically in software. In some embodiments, an automated software method may examine the microimages to determine noise in the microimages, for example using a Fourier transform to detect peaks at certain frequencies. An excessive amount of noise in an area of the final rendered image may indicate that microimages in that area are flipped, and thus need to be inverted. Microimages that include noise over a specified threshold may be marked to be inverted.

As indicated at 806, the microimages may each be cropped to produce an $m_1 \times m_2$ subregion or crop of each microimage, where at least one of $m_1$ and $m_2$ is an integer greater than two. As indicated at 808, the subregions or crops from the microimages may be appropriately assembled to produce a final high-resolution image of the scene.

In some embodiments, instead of cropping the microimages and assembling the subregions generated by the cropping, the microimages themselves may be appropriately assembled to produce a final high-resolution image of the scene. Thus, in these embodiments, element 806 is not performed; at 808, the microimages are assembled to produce an output image. In assembling the microimages, overlapping portions of adjacent microimages may be merged, blended, or otherwise handled.

In some embodiments, two or more images rendered from a flat according to rendering methods described herein may be combined to produce a higher-quality output image. For example, in some embodiments, the microimages in a flat may all be inverted, and the inverted microimages appropriately assembled to produce a first intermediate image. A second intermediate image may be generated without inverting the microimages prior to assembling. The two intermediate images may then be combined to produce a higher-quality output image. The combination of the two images may be performed manually by a user via a user interface, for example using a selection tool to select portions of an image to be combined with the other image, or alternatively may be performed automatically in software, for example using a noise detection technique as described above to find excessively noisy regions of one or both intermediate images. As an example, when combining the images, the user may manually (or software may automatically) select areas in one intermediate image that are of higher quality than the same areas in the other image, and then combine the selected areas with the other image to produce an output image that includes the highest quality portions of the two intermediate images. In some embodiments, a map (e.g., a bitmap) may be generated that indicates areas of each image that are to be included in the output image, and then the output image may be generated from the two intermediate images according to the map. In some embodiments, more than two intermediate images may be generated, and a similar method may be used to generate a higher-quality output image from the intermediate images.

Figure 25:
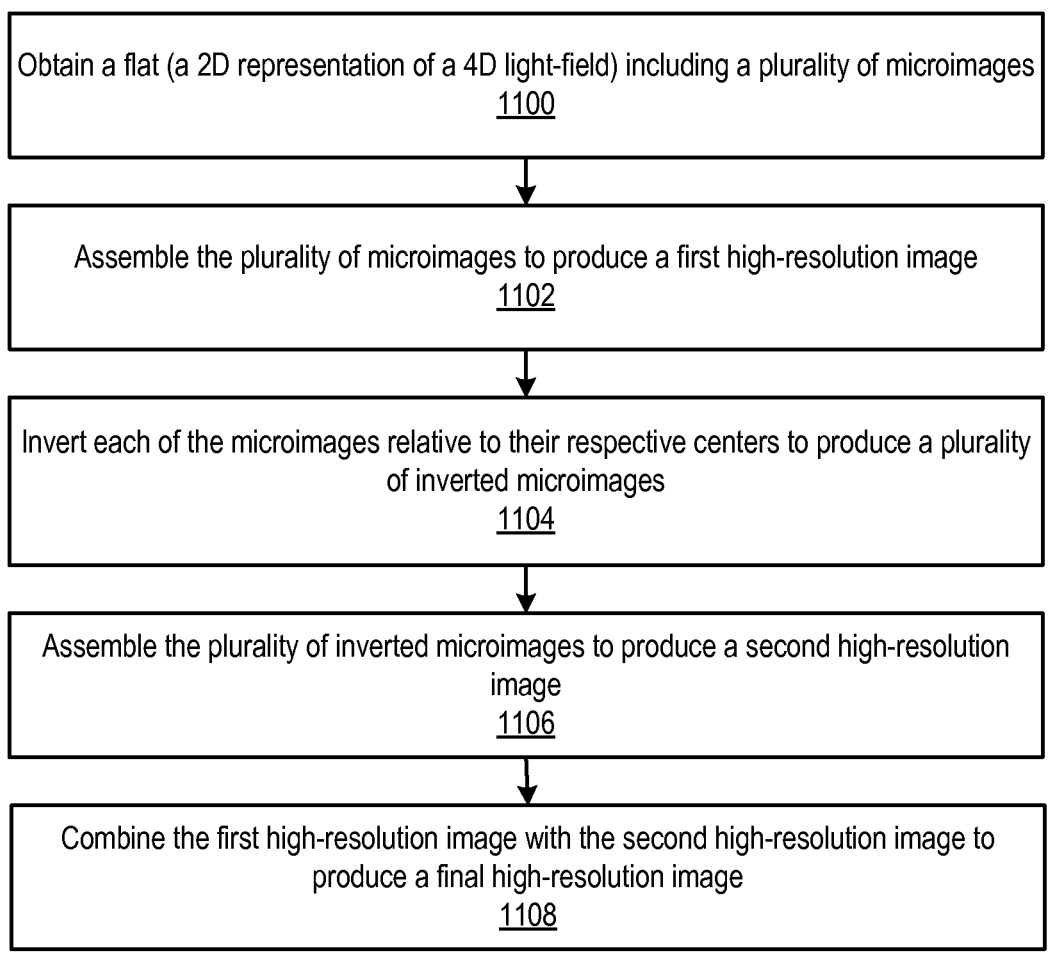
FIG. 25 is a flowchart of a full-resolution light-field rendering method in which multiple images are rendered from a flat and combined to produce a final high-resolution output image, according to some embodiments.

FIG. 25 is a flowchart of a full-resolution light-field rendering method in which multiple images are rendered from a flat and combined to produce a final high-resolution output image, according to some embodiments. As indicated at 1100, a flat captured by a focused plenoptic camera may be obtained (see, e.g., FIG. 9 for an example of what such a flat may look like to a human observer). As indicated at 1102, the plurality of microimages may be assembled to produce a first high-resolution image. As indicated at 1104, each of the microimages may be inverted relative to their respective centers to produce a plurality of inverted microimages. As indicated at 1106, the plurality of inverted microimages may be assembled to produce a second high-resolution image. As indicated at 1108, the first high-resolution image may be combined with the second high-resolution image to produce a final high-resolution image. The combination of the two images may be performed manually by a user via a user interface, for example using a selection tool to select portions of an image to be combined with the other image, or alternatively may be performed automatically in software, for example using a noise detection technique as described above to find excessively noisy regions of one or both intermediate images.

Figure 26:
FIG. 26 shows an example full-resolution rendering of a light-field in which foreground and background portions of the images shown in FIGS. 19 and 20 have been combined, according to one embodiment of the full-resolution light-field rendering method.
Figure 27:
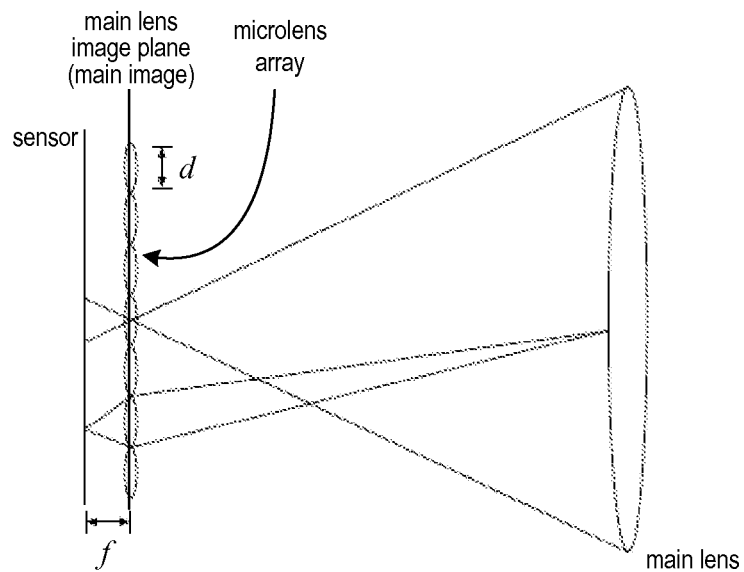
FIG. 27 shows an example of a focused plenoptic camera, according to some embodiments.

FIG. 26 shows an example full-resolution rendering of a light-field in which foreground and background portions of the example images shown in FIGS. 19 and 20 have been combined to produce a higher-quality output image. In FIG. 26, the foreground portion (the tree) of FIG. 19 has been replaced with the corresponding foreground portion of FIG. 19.

In some embodiments, multiple images may be rendered from a flat according to rendering methods described herein, using different values for $m_1$ and/or $m_2$ to crop the microimages before assembling the crops. This may produce multiple images with different visual quality. For example, assuming a square crop is to be made (i.e., $m_1=m_2$), some embodiments may be configured to perform the rendering using values for $m_1$ and $m_2$ in a specified range, for example from 5 to 10 inclusive to produce 6 output images, from 5 to 20 to produce 16 output images, and so on. One or more images may then be selected from among the multiple rendered images according to the quality of the images as output image(s). The selection may be performed manually, for example by a user via a user interface, or alternatively may be performed automatically in software, for example using a noise detection technique as described above to select images with lower levels of noise in one or more frequencies. Alternatively, two or more of the images may be selected and combined to generate a higher-quality output image. The combination of the images may be performed manually or automatically.

In some embodiments, inversion and cropping of microimages may be combined in a single automatic operation. For example, in some embodiments, a software module or modules configured to perform both inversion and cropping of microimages in a flat or in a specified area of a flat may have ($m_1$, $m_2$) as input parameters (or, alternatively, an input parameter m if the crop is to be a square and thus $m_1=m_2$). A negative value for ($m_1$, $m_2$) may be used to indicate that the microimages in the input flat or area are to be inverted, with a positive value for ($m_1$, $m_2$) indicating that the microimages are not to be inverted. Other methods to indicate whether microimages are to be inverted may be used.

In some embodiments, inversion and cropping of microimages may be performed in various combinations on an input flat to render multiple rendered images according to the combinations. For example, in one embodiment, some images may be rendered using a range of values for $m_1$ and $m_2$ as described above while also inverting the microimages, while other images may be rendered using a range of values for $m_1$ and $m_2$ as described above in which the microimages are not inverted. One or more of the rendered images may then be manually or automatically selected as output image(s). Alternatively, two or more of the rendered images may be combined as previously described (see, e.g., FIG. 26) to produce an output image.

Reducing Plenoptic Camera Artifacts

Various embodiments of methods and apparatus for reducing plenoptic camera artifacts are described. The focused plenoptic camera (see, e.g., FIGS. 6 through 8 and FIG. 27) differs from the conventional plenoptic camera (see, for example, FIGS. 3 and 4) in that its microlenses are focused on the photographed object rather than at infinity. The spatioangular tradeoffs available with this approach enable rendering of final images that have significantly higher resolution than final images rendered from conventional plenoptic cameras. However, the low angular resolution of the focused plenoptic camera may result in visible artifacts when basic focused plenoptic camera rendering (see, e.g., FIG. 22) is used. Examples of artifacts can be seen in FIGS. 6 and 7. These artifacts are a result of the basic rendering method of patching together the microimages created by the microlenses. The final image is free of artifacts in one or another part of the field at the expense of other parts of the field representing different depths in 3D.

Methods for reducing these focused plenoptic camera artifacts are described. A first method is based on careful design of the optical system of the focused plenoptic camera to reduce artifacts that result in differences in depth in the microimages. A second method is computational; a focused plenoptic camera rendering algorithm is described that corrects for artifacts resulting from differences in depth in the microimages. Example results are provided that demonstrate the effectiveness of these methods for reducing focused plenoptic camera artifacts.

In this section, the conventional plenoptic camera and the focused plenoptic camera are described and compared. The basic focused plenoptic camera rendering algorithm (see, e.g., FIG. 22) is described. Causes of artifacts in final images generated with the basic focused plenoptic camera rendering algorithm are described. Understanding the reasons for these artifacts leads to methods for artifact reduction. Two approaches, each of which can reduce and almost eliminate these artifacts, are described. A first approach is a hardware approach related to positioning the main lens image at a far enough distance from the microlens array so that different depths in the world lead to little change in magnification in the microimages. A second approach is a software approach that assumes variable depth (variable pitch) throughout the microlenses; a depth parameter is computed, and then used for artifact reduction during rendering.

While each of these two approaches works by itself to reduce artifacts, it is shown that the two approaches may be combined, while making tradeoffs and thus not using either to its full potential. This combined approach may provide a better position in terms of the trade-offs that are made between parallax and artifacts. At the same time, the action of both approaches reduces the artifacts significantly. This combined approach may be a practical method for 3D and refocused imaging. The final rendered images using the combined approach are of good quality and good resolution between, for example, 1 and 2 megapixels.

Conventional Plenoptic Cameras

The conventional plenoptic camera (see for example, FIG. 3) is based on an array of microlenses at the image plane of the main camera lens. The microlenses are placed at one focal length from the sensor. Considering that the focal length of the main camera lens is much greater than the focal length of the microlenses, each microcamera is focused on the main camera lens aperture, not on the object being photographed. Each microlens image is completely defocused relative to that object, representing strictly the angular distribution of the radiance at the image plane. As a rule, these images look blurry and unrecognizable to a human observer. As designed, the conventional plenoptic camera produces only one pixel per microlens; as a result, it has a very low resolution. Even with 100,000 microlenses, the handheld plenoptic camera produces a final image of only 300×300 pixels Focused Plenoptic Camera FIG. 7 shows an example of a focused plenoptic camera. The focused plenoptic camera 200 is based on an array of microlenses 220 focused on the image plane 240 of the main lens 230. Thus, each microlens captures a portion of the image formed by the main lens 230. The main camera lens may be considered as moved slightly forward, so the image 240 is formed some distance in front of the microlenses 220. The microlenses 220 serve as an array of real cameras, reimaging parts of that image 240 onto the sensor 210. In playing this role, each microlens is slightly shifted along its optical axis, so that it satisfies the lens equation:

$$\frac{1}{a} + \frac{1}{b} = \frac{1}{f}$$

where a, b, and f are respectively the distance from the microlens to the main lens image plane, the distance from the microlens to the sensor, and the focal length of the microlens. In one setting of the focused plenoptic camera as shown in FIG. 10 (the Keplerian telescopic case), b is greater than f. A different setting is possible, as shown in FIG. 12 (the Galilean telescopic case), where the main lens image is considered a virtual image formed behind the sensor, a is negative, and b is less than f. The discussion in this section generally addresses the Keplerian telescopic case and not the Galilean telescopic case, but the treatment of the Galilean telescopic case would be essentially similar.

Rendering Flats Captured with the Focused Plenoptic Camera

Figure 28:
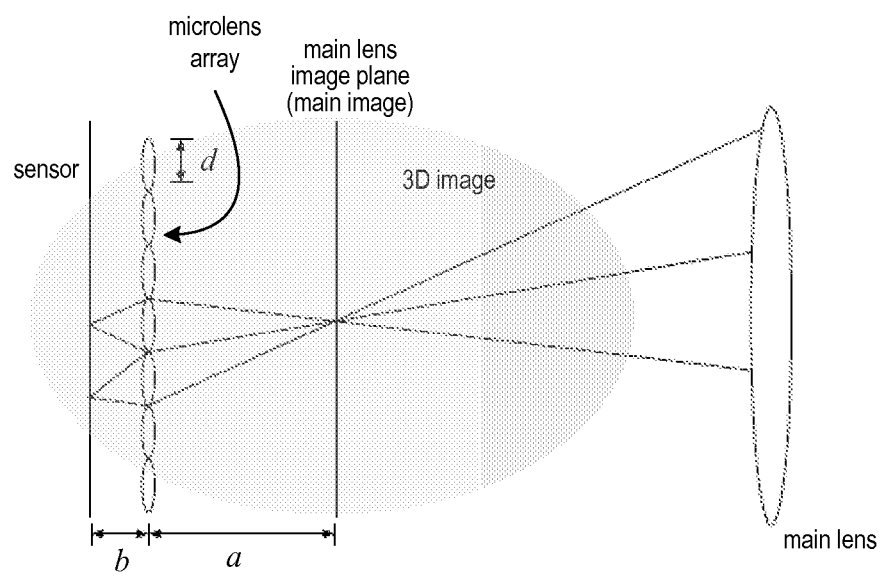
FIG. 28 shows an example section of a flat captured by a sensor in an embodiment of a focused plenoptic camera.

The focused plenoptic camera (see FIG. 27) records a flat 2D representation of the 4D light field (also called a flat). An example section of a flat captured by a sensor in an embodiment of a focused plenoptic camera is shown in FIG. 28. Note that the microimages are sharp. Also, in order to pack microimages more efficiently, a square main lens aperture is used. The flat thus consists of an array of square microimages, each microimage capturing part of the scene at the image plane formed by the main lens, with the microimages packed so that there is little or no space between the microimages. Each microimage is taken from a slightly different perspective, so each pair of microimage is a true stereo pair. Since the aperture is a square, the microimage are small squares fitting tightly together. This reduces wasted sensor space between the circular microimages that would be produced by an unmodified aperture. While a square aperture is used, a rectangular aperture, or an aperture of another geometric shape that allows the microimages to be packed more efficiently, may alternatively be used.

Each microlens generates a multi-perspective view of a part of the photographed object or scene. Clearly, if only the left parts of each microimage was picked up and patched together appropriately, one view of the whole scene from the right part of the main camera lens would be generated. This is because the left part of each microimage receives rays from only the right part of the main camera lens (see FIG. 27). Conversely, the right part of each microimage captures rays from the left part of the main camera lens.

Figure 29:
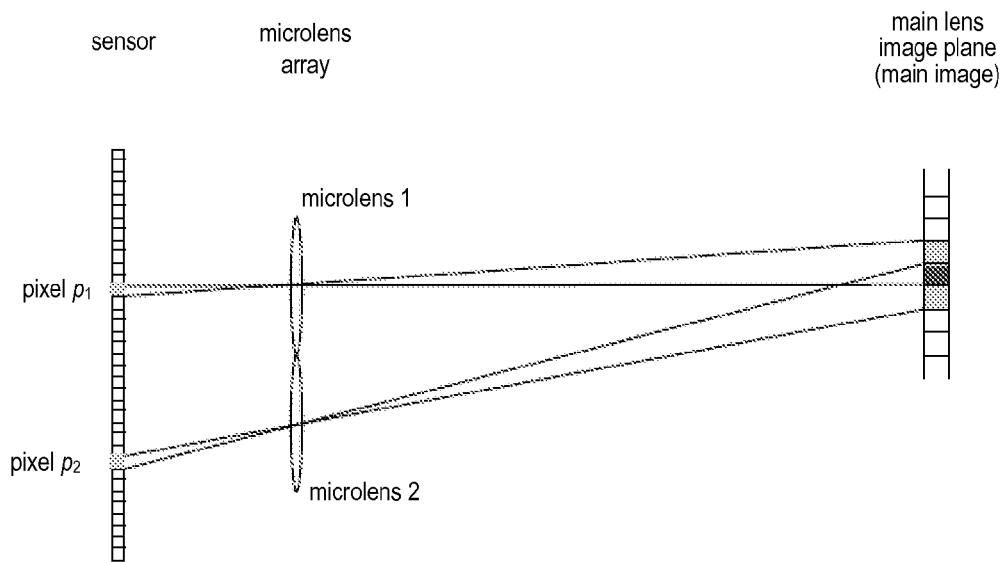
FIG. 29 graphically illustrates a focused plenoptic camera rendering algorithm according to some embodiments.

This is the underlying idea behind a basic rendering algorithm for flats captured with the focused plenoptic camera (see, e.g., FIG. 22). To explain the focused plenoptic camera rendering algorithm in more detail, consider FIG. 29, which graphically illustrates a focused plenoptic camera rendering algorithm that puts together a final image from patches cropped from individual microimages. The four microimages in FIG. 29 are outlined with a dashed rectangle in FIG. 28. Choosing a given pitch in the final image, squares of that size are cropped from the microimages and packed tightly together into a final rendered image. Choosing one pitch or another puts different world planes "in focus." In other words, patches match each other perfectly only for one image plane behind the main lens. By the lens equation, this corresponds to a given depth in the real world. A different pitch would correspond to a different depth.

For the focused plenoptic camera, the above rendering method is made possible by the precision of the microlenses, where the distance between any two microlenses (the pitch) is the same with micron precision.

Artifacts

Impressive high-resolution images can be created using the rendering method described above. Unfortunately, artifacts are often generated when the patches are stitched together. Ideally, the patches would match each other perfectly and stitch together as seamlessly as the pieces in a puzzle. For a fixed patch size, this matching of features from one patch to the next is possible only at the right depth. The reason for this is that, for a different depth, the magnification factor of size reduction, M, would be different.

Figure 32:
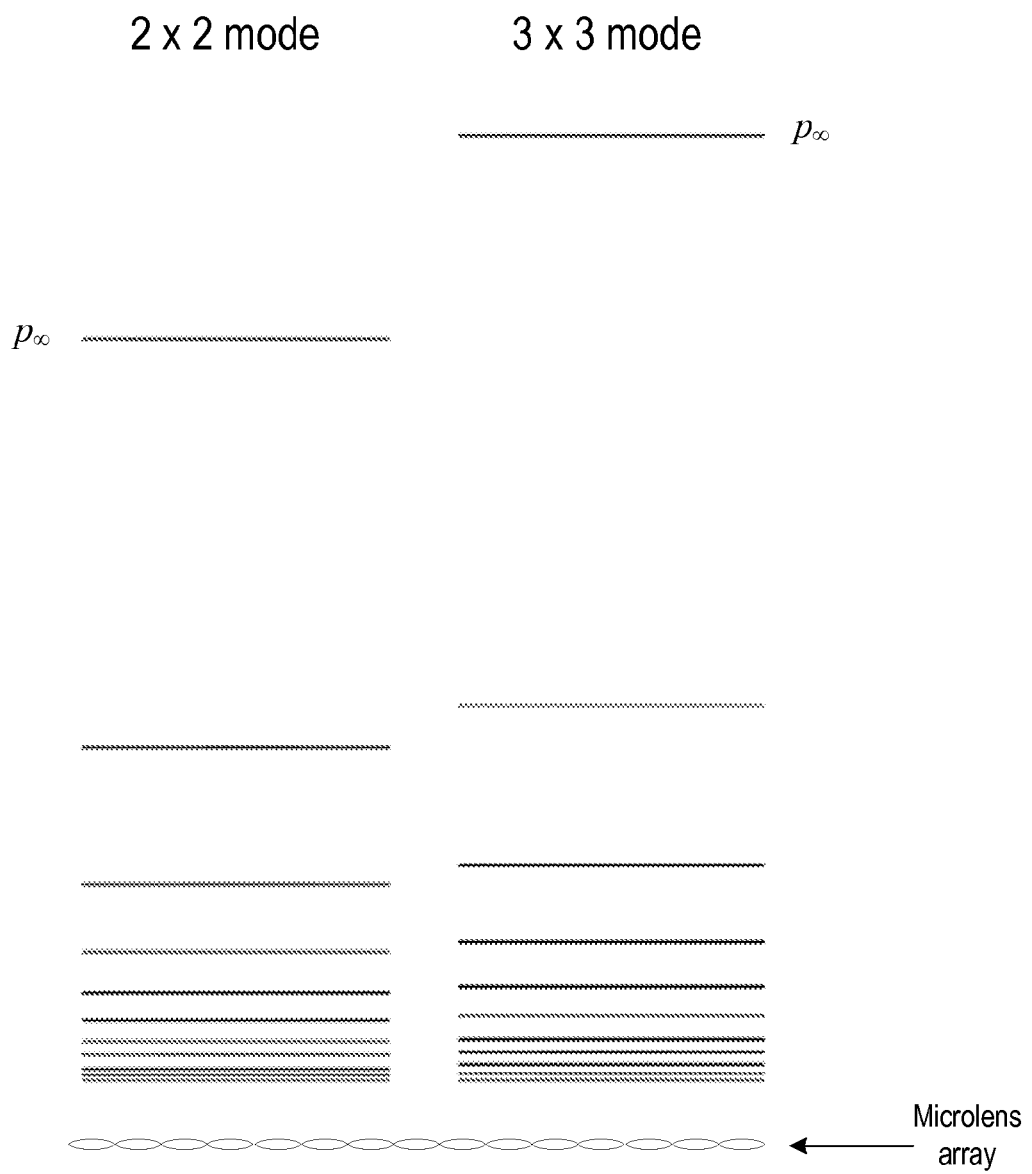
FIG. 32 illustrates optics and optical parameters of a focused plenoptic camera according to some embodiments.

To examine this in more detail, see FIG. 32, which shows depth of field, Δa, in a focused plenoptic camera. Microlens magnification is M=a/b. Consider an object of certain size in front of the microlenses. This might be a physical object or an image created by the main camera lens. Each microlens maps this object to a smaller image at the sensor, the size depending on the distance to the object. Imagine that the patches from different microlenses are matched at a certain magnification, and the patches tile together perfectly. However, matching such patches at a different magnification would not work. For example, if the patches were slightly larger, each patch would show a smaller part of the object. Part of the object would be missing, and the edges would not match properly. Or, if the patches were smaller (each one showing more of the object), there would be additional pixels at the edges.

Clearly, the strength of these artifacts depends on the difference in magnification between different depths. A second important element to consider is the physical size of patches (in pixels). At the same difference in magnification, big patches would accumulate more change than small patches. At the edges, the artifacts would be more noticeable.

Figure 30:
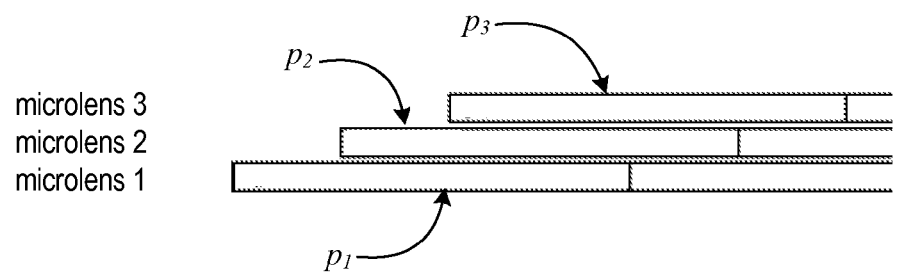
FIG. 30 shows a rendered image and demonstrates the rendering of a view of a scene using a pitch that is appropriate to correctly represent the foreground.
Figure 31:
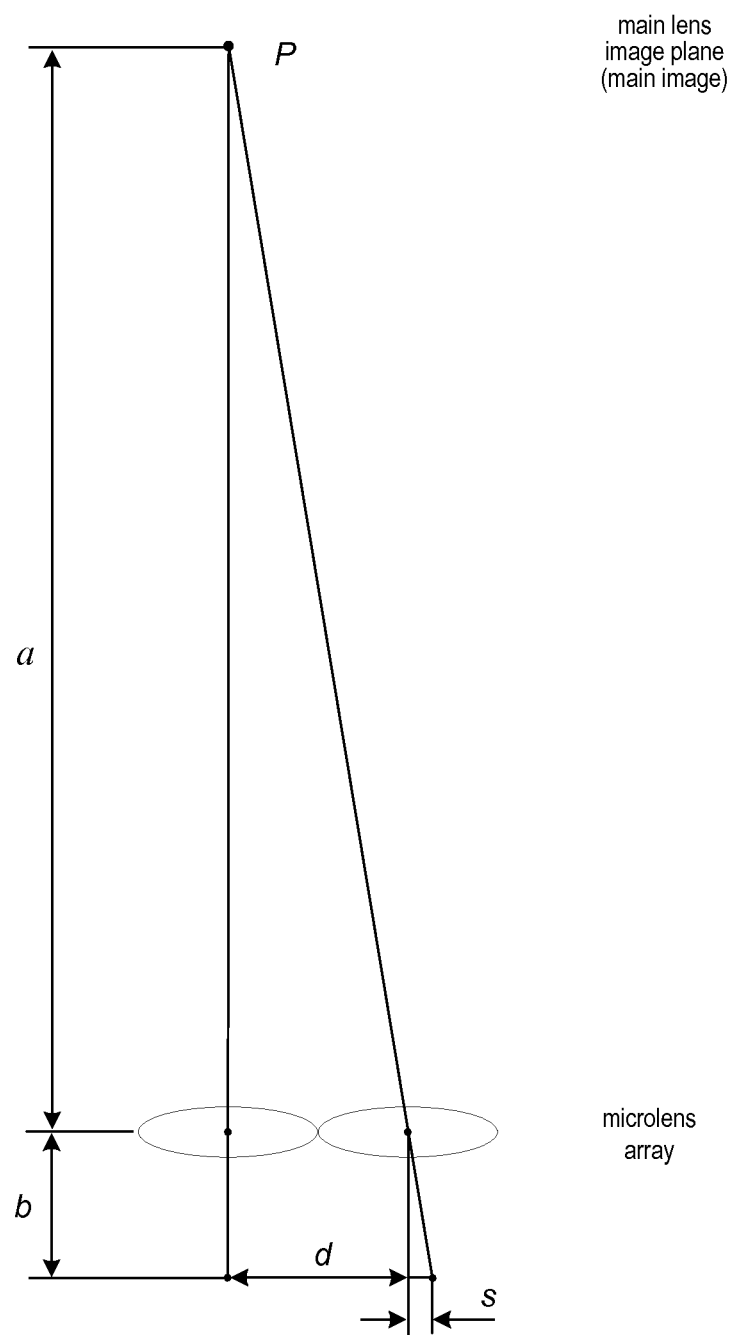
FIG. 31 shows a rendered image and demonstrates the rendering of a view of a scene using a pitch that is appropriate to correctly represent the midrange of the scene.
Figure 33:
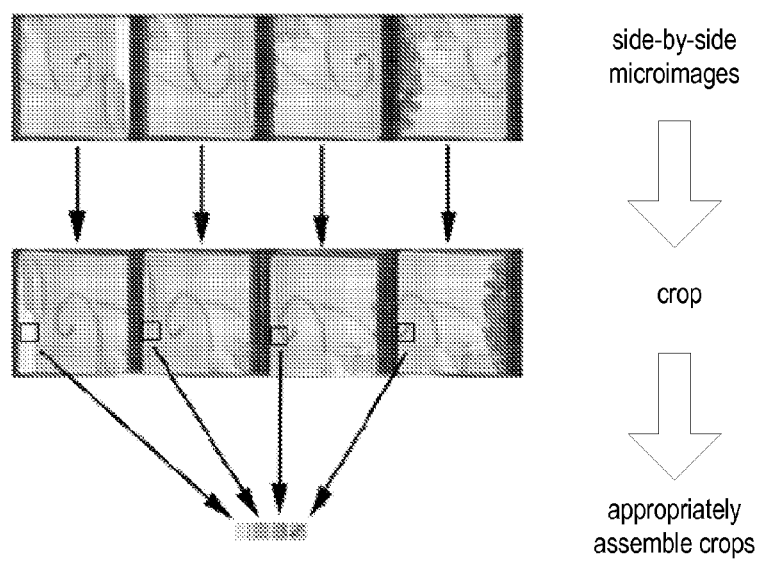
FIG. 33 shows an image of the same scene shown in the images of FIGS. 30 and 31, rendered using an embodiment of an artifact reduction rendering method based on depth of the individual microimages in the flat.

Based on an optics design for a focused plenoptic camera that is described below, artifacts may be reduced in hardware. As will be shown, a focused plenoptic camera can be designed to produce very few artifacts with basic rendering at distances greater than one meter. However, even with this focused plenoptic camera design that reduces artifacts, some images produced from some captured flats may still contain artifacts, as shown in the examples in FIGS. 30 and 31. Thus, artifact reduction methods are described for correcting artifacts in images when rendering the images from flats captured with focused plenoptic cameras; these methods may be applied during rendering to reduce or eliminate artifacts in the images. Even in the case of suboptimal light-field capture, as shown in FIGS. 30 and 31, artifacts may be reduced or eliminated via this artifact reduction method during rendering. FIG. 33 shows an image of the same scene shown in the images of FIGS. 30 and 31. This image was rendered using an artifact reduction rendering method based on depth of the individual microimages in the flat.

FIGS. 30 and 31 show images rendered from a flat captured with the focused plenoptic camera design with artifacts left uncorrected. The image in FIG. 30 demonstrates the rendering of a view of the scene using a pitch that is appropriate to correctly represent the foreground. The artifacts are clearly visible in the background. The image in FIG. 31 demonstrates the rendering of a view of the scene using a pitch that renders a middle range (the pencil holder) correctly. Blocky artifacts are clearly visible in the foreground, and some artifacts are visible in the background. The flat used to render the images in FIGS. 30 and 31 were captured at a suboptimal distance for the focused plenoptic camera design (@ 0.5 meters). That is why the images rendered from the flat without artifact correction show artifacts, and may be considered as examples of uncorrected (for that range) camera optics. The artifacts are intentionally left uncorrected in the images of FIGS. 30 and 31. However, the artifacts in the images of FIGS. 30 and 31 are reduced relative to what is observed with a focused plenoptic camera not implemented according to the artifact-correcting design.

Figure 34:
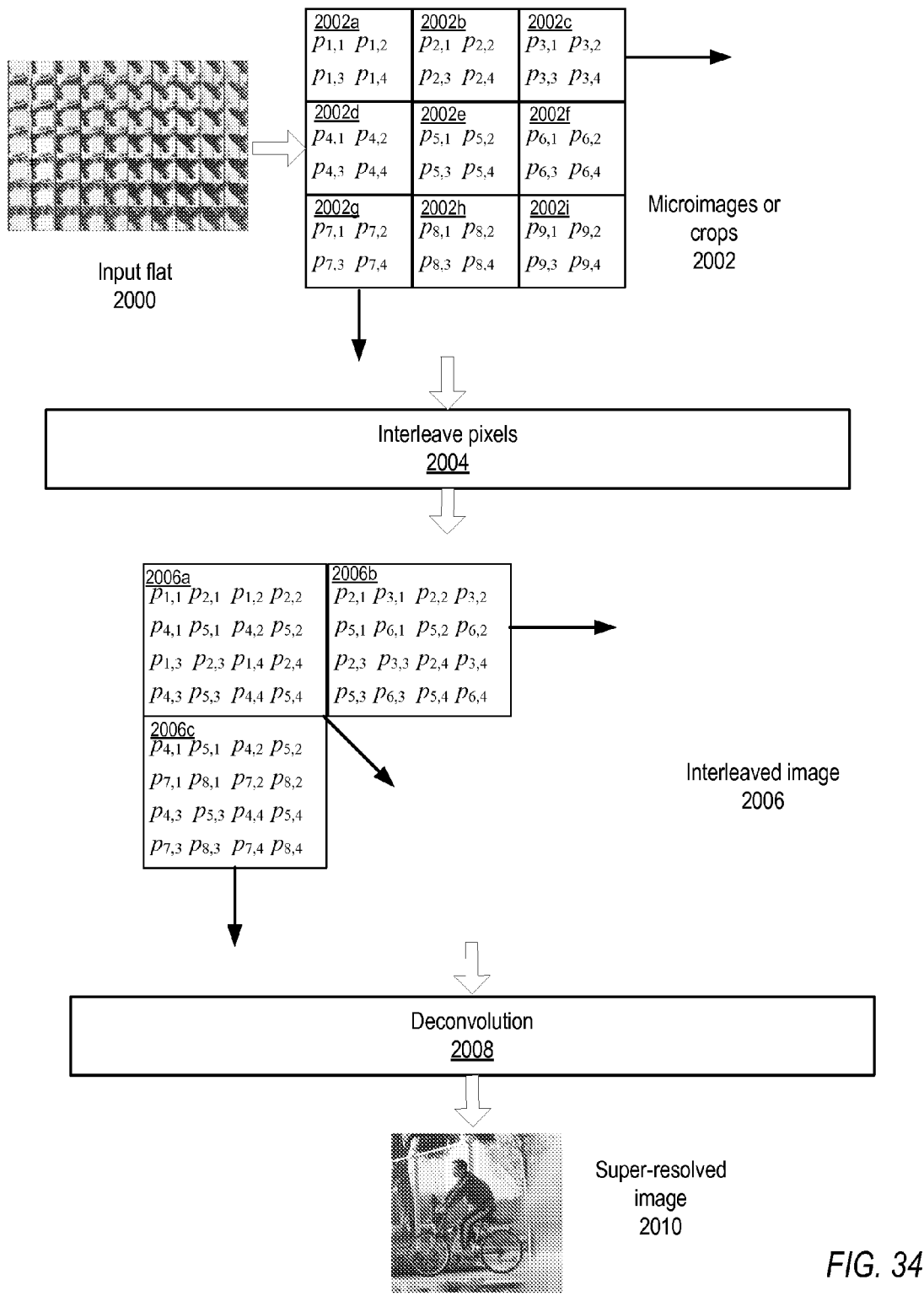
FIG. 34 shows an image rendered with constant depth.

An image rendered with data captured from a range greater than one meter using this example implementation of the artifact-reducing focused plenoptic camera design is shown in FIG. 34. The image in FIG. 34 was rendered with constant depth; that is, software reduction of artifacts was not applied to the image during rendering.

Reducing Artifacts in Focused Plenoptic Camera Optics Hardware

Artifacts can be reduced significantly by an appropriate focused plenoptic camera design. In considering the design, the patches extracted from the microimages during rendering need to be relatively small. However, data should not be wasted by throwing away a large portion of the captured data in the microimages. To help prevent wasting data, the microimages should be relatively small.

A limiting factor in making the microimages smaller is the edge artifacts in each microimage. The edge pixels of a microimage are not completely illuminated, and may be dark and noisy. A small microimage has a greater percentage of its pixels as noisy edge pixels. To avoid this, the microimages should be larger than 10×10 pixels.

From a practical point of view, there are other factors to be considered when designing the focused plenoptic camera. Sensors generally have a cover glass, and it may not be desirable to remove the cover glass, as this would force the distance b from the microlenses to the sensor to be greater than a certain value, $b_0$. In addition, considering that the microlenses need to match the F-number ($F_\#$) of the main lens, the size of the microimages should be greater than $b_0/F_\#$.

Another factor influencing artifacts is variability in magnification. The magnification in all microlens images should be as similar as possible. Considering FIG. 32, the magnification is given by:

$$M = a/b \qquad (1)$$

where a measures depth to the image in the camera and b is the distance from the microlens to the sensor. While a may be different for different objects, b is a constant. The image stays in focus within a certain range of a due to the small microlens apertures.

Because of these different depths, different areas may be imaged at different magnification. The condition that magnification should not differ much for different microlenses can be expressed as:

$$\frac{\Delta M}{M} \ll 1$$

where ΔM is the difference in magnification between two microlenses. The symbol "≪" denotes "much less than." In some embodiments, "much less than" in this expression indicates less than or equal to half as large $$\left(\frac{\Delta M}{M} \le 0.5\right).$$

In some embodiments, "much less than" in this expression indicates less than or equal to about 10%

$$\left(\frac{\Delta M}{M} \le 0.1\right).$$

From this, and considering the fact that b is the same for all microlenses, Δa≪a is derived. See FIG. 32. In some embodiments, "much less than" in this expression indicates less than or equal to half as large $$\left(\Delta a \le \frac{a}{2}\right).$$

In some embodiments, "much less than" in this expression indicates less than or equal to about 10%

$$\left(\Delta a \le \frac{a}{10}\right).$$

Next, a range of values for a that are best for artifact reduction are derived. This condition may be expressed as formula (5). Newton's form of the lens equation for the main lens may be used:

$$(F-A)(F-B)=F^2 \quad (2)$$

where A is the distance from the main lens to the outside object, B is the distance from the main lens to the image, and F is the focal length of the main camera lens. Both infinity and the point at closest distance A should be imaged into the Δa interval. See FIG. 32. In other words, (F−B)=Δa.

From (2), it follows that:

$$\Delta a = \frac{F^2}{F-A} \quad (3)$$

or, considering that A□F, approximately:

$$|\Delta a| = \frac{F^2}{A} \quad (4)$$

Since Δa≪a, it follows that:

$$a > \frac{F^2}{A} \quad (5)$$

While formula 5 indicates that a should be greater than $F^2/A$, note again that Δa≪a (Δa should be much less than a; see the above comments on the interpretation of ≪ in this expression) to achieve better artifact reduction. Thus, in some embodiments, a value for a is chosen to be much greater than $$F^2 \Big/ A \left(a \gg \frac{F^2}{A}\right).$$

In some embodiments, "much greater than" in this expression indicates at least twice as large. Thus, in these embodiments, $$a >= 2\left(\frac{F^2}{A}\right).$$

In some embodiments, "much greater than" in this expression indicates at least 10 times as large. Thus, in these embodiments, $$a >= 10\left(\frac{F^2}{A}\right).$$

From the above, it can be seen that artifacts are reduced more if the main lens image is positioned as far from the microlenses as possible. The scale is defined by:

$$\frac{F^2}{A}$$

Example Focused Plenoptic Camera Implementation

An example implementation of a focused plenoptic camera is used to illustrate the hardware design for reducing artifacts. The example implementation is a medium-format camera with a main lens of F=80 mm. Note that other types of cameras may be used in the focused plenoptic camera design, and the optical characteristics of the camera may be different. FIG. 8 illustrates an example embodiment of a focused plenoptic camera based on a large-format film camera that is somewhat similar to the example focused plenoptic camera described in this section. More generally, FIGS. 6 through 8 illustrate example film camera and digital camera embodiments of a focused plenoptic camera which may be configured as described herein to reduce artifacts, and further illustrate both fixed and adjustable embodiments of the focused plenoptic camera. It is noted that these are example embodiments, and are not intended to be limiting. Other embodiments of the focused plenoptic camera are possible and anticipated.

Using the example implementation of a focused plenoptic camera, assuming a goal of imaging objects as close as A=1000 mm, $$\frac{F^2}{A} = \left(\frac{80^2}{1000}\right),$$

so a>>6.4 mm. However, a should not be increased too much because with a fixed b, a large value of a produces a large M. In some embodiments, a will be within a range of from 2 mm to 20 mm, inclusive. A large magnitude of M is related to a large number of almost identical images in different microlenses. Rendering in such a mode is rather wasteful. With this example implementation, good resolution may not be achieved; however, considerable space on the sensor is used. Design methods to make the number of images small and to make direct imaging less wasteful are considered below.

Based on the above reasoning, the magnitude of M should be made as small as possible. The following provides an estimate of how much M may be reduced.

It can be shown that the image-side depth of field for a microlens image is $pF_\#$, where p is the size of a pixel at the sensor, and $F_\#$ is the image-side F-number for the microlens. The corresponding object-side depth of field, x, for the microlens would be:

$$x = M^2 pF_\# \quad (6)$$

The image on the sensor is sharp only if the object is within the depth of field. In other words, considering (4):

$$x = M^2 pF_\# > \frac{F^2}{A} \quad (7)$$

$$M^2 > \frac{F^2}{ApF_\#} \quad (8)$$

By plugging in the numbers for the example implementation of a focused plenoptic camera, $M^2 > 941/F_\#$. $M^2 = 1000/F_\#$ may be chosen. Clearly, a way to make the magnitude M smaller is by choosing a large $F_\#$. A limitation is diffraction in wave optics. Considering the size of the pixels, the largest possible F-number is around 10. Based on that, microlenses with $F_\# = 7.5$ are selected. This yields a magnitude of M=11.5.

In order to avoid problems associated with removing the cover glass, microlenses with a focal length of f=1.5 mm are chosen. The main lens image is moved forward using an extension tube. The result is a=13 mm, approximately. This corresponds to a magnitude of M=8.6. The result of this slightly smaller magnitude of M is that some objects will be outside the depth of field and may appear slightly blurry. However, this may result in more efficient imaging in terms of using sensor space.

As mentioned above, the reason for selecting such a long focal length for the microlenses, f=1.5 mm, is so that the microlens array can be placed directly on the cover glass of the sensor. This is a nondestructive practical approach to building a light-field camera. This is possible only with a focused plenoptic camera because in order to match the F-number of the main lens (around 4) at this focal length, a large spacing (pitch) is needed between microlenses, around 0.5 mm. Considering that even the large medium-format sensor is less than 50 mm across, no more than about 100 microlenses may fit in each direction. In a conventional plenoptic camera (see, e.g., FIG. 3), this would produce a final rendered image of 100×100 pixels, which is not very practical. An advantage of the focused plenoptic camera is that the rendered image is more than 1000×1000 pixels.

General Optics in an Artifact-Reducing Focused Plenoptic Camera

Figure 35:
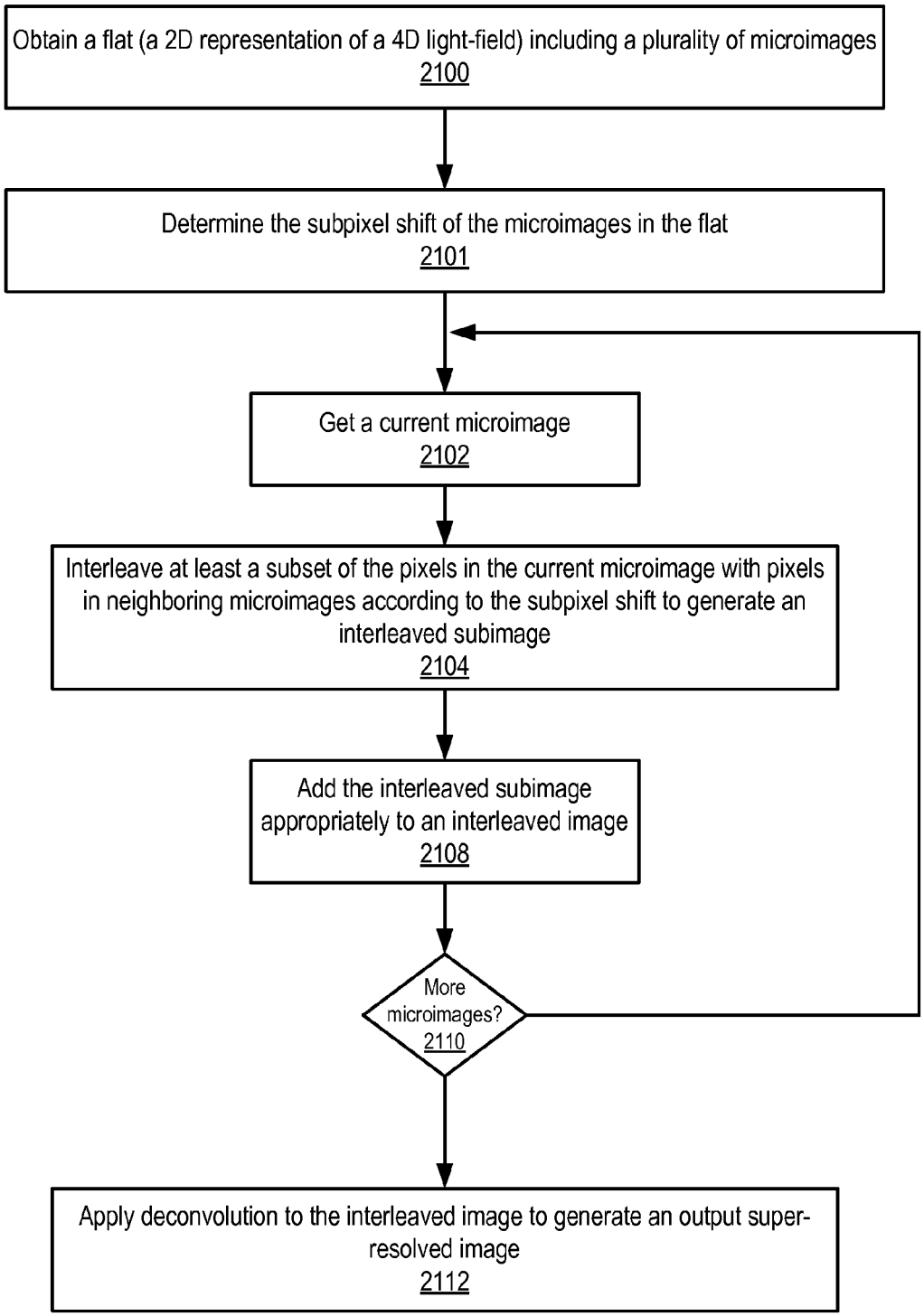
FIG. 35 illustrates optics in an artifact-reducing focused plenoptic camera, according to some embodiments.

FIG. 35 illustrates optics in an artifact-reducing focused plenoptic camera, according to some embodiments. Focused plenoptic camera 2500 may include at least a photosensor 2510, a microlens array 2520, and a main, or objective, lens 2530. Main lens 2530 refracts light from an object 2580 located in front of the camera 2500 to form an image of the object at a focal plane 2540 of the main lens 2530. The focal plane 2540 is located at focal length F of the main lens 2530. The object 2580 is at distance A from the main lens 2530. The distance from the main lens 2530 to the focal plane 2540 is designated as B. The microlens array 2520 is positioned between the main lens 2530 and the photosensor 2510. The microlens array 2520 includes a plurality of microlenses. Each of the microlenses is focused on the focal plane 2540 and not on the main lens 2530. Distance from the microlenses 2520 to the focal plane 2540 is designated as a, and distance from the microlenses 2520 to the photosensor 2510 is designated as b. In some embodiments, b is fixed. Each microlens of the microlens array 2520 projects a separate portion of the image of the object 2580 formed at the focal plane 2540 on which the microlens is focused onto a separate location on the photosensor 2510. The photosensor 2510 is configured to capture a flat comprising the separate portions of the image of the object projected onto the photosensor 2510 by the microlens array 2520, Each of the separate portions is in a separate region of the flat. These separate portions may be referred to as microimages.

The value Δa is related to difference in the magnification, that is change in the size of the microimages over a range of depth. To reduce artifacts in the camera optics, this difference at different depths should be as small as possible, and should be much smaller than a. Thus, a should be relatively large. From this, equation (5) follows. Thus, to reduce artifacts in images generated from captured flats, the optics of focused plenoptic camera are configured so that equation (5) is satisfied:

$$a > \frac{F^2}{A}$$

However, there are trade-offs that should be considered. Magnification M of the microlenses in the microlens array 2520 is defined by $$M = \frac{a}{b}.$$

While a should be made larger in relation to Δa to reduce artifacts, a should not be increased too much because with a fixed b, a large value of a produces a large magnitude of M. A large magnitude of M is related to a large number of almost identical microimages in different microlenses. Rendering in such a mode is rather wasteful. Thus, M should not be too large, nor should M be made too small as too small microimages may waste pixels due to vignetting effects. In some embodiments, the magnitude of M should be around 10 or less. In some embodiments, the magnitude of M may be within a range from 5 to 10, inclusive. However, some embodiments may be configured so that the magnitude of M is outside that range.

Reducing Artifacts in Software

Blocky artifacts may occur in rendered images due to the different magnification in different microlens images of the flat light field, even in images rendered from flats captured with embodiments of the artifact-reducing focused plenoptic camera described above. This effect can be greatly reduced through appropriate rendering. To render a complete image without artifacts, each portion of the image should be rendered according to that part of the flat's required magnification.

Figure 36:
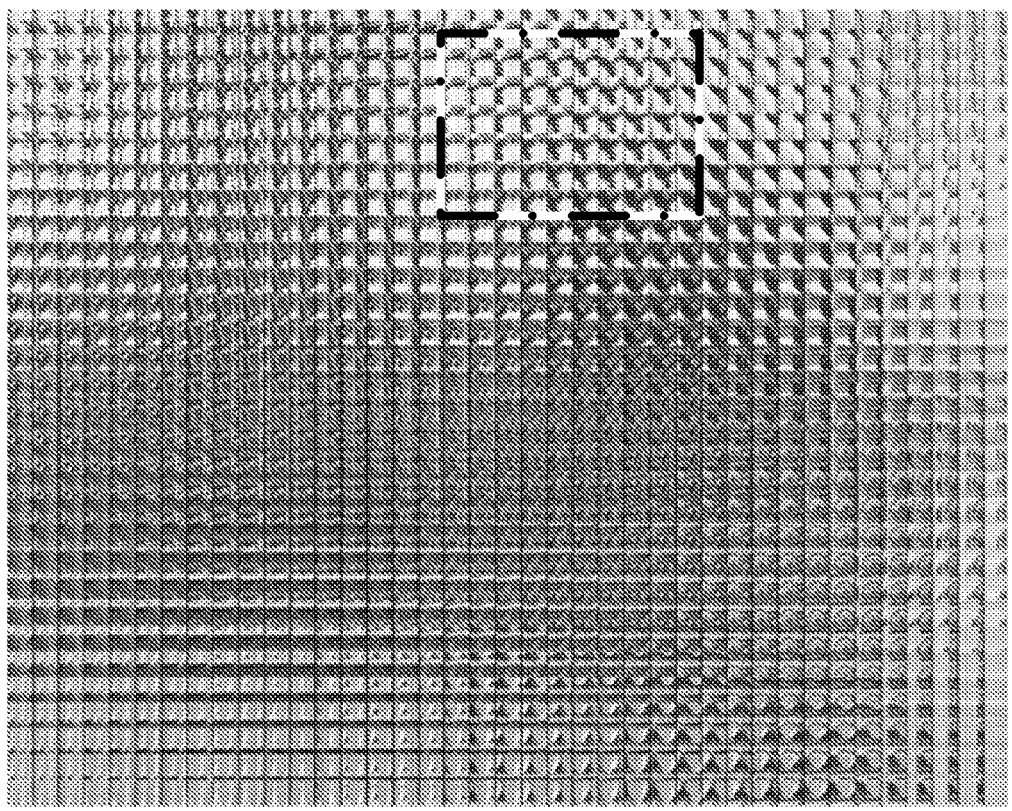
FIG. 36 is a flowchart of an artifact-reducing rendering algorithm, according to some embodiments.

In rendering, neighboring patches overlap. The basic condition for proper rendering is straightforward—overlapping regions must match up. That is, the same portion of the scene that is captured by different microlenses should be rendered to the same position in the image. This matching condition suggests a two-pass algorithm for rendering images shown in FIG. 36. FIG. 36 is a flowchart of an artifact-reducing rendering algorithm, according to some embodiments. As indicated at 2100, for each microlens image (microimage) in the captured flat, a magnification value $M_i$ is determined that results in the best match with its neighbor microimages. As indicated at 2110, a final image is rendered according to the saved magnification value $M_i$ for each microimage. Element 2100 will be expanded on in FIG. 37, and element 2110 will be expanded on in FIG. 38.

Figure 37:
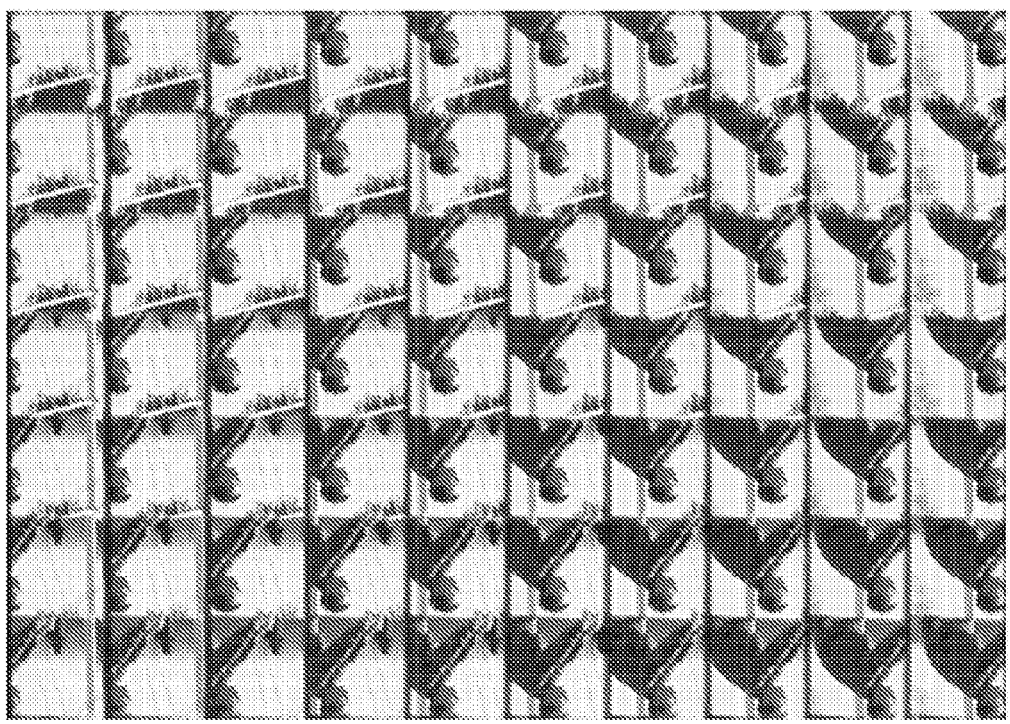
FIG. 37 is a flowchart of a method for determining magnification values for the microimages in a flat, according to some embodiments.

Determining the magnification value $M_i$ that provides the best match between two microimages is essentially an image registration problem. FIG. 37 is a flowchart of a method for determining magnification values $M_i$ for the microimages in a flat, according to some embodiments. As indicated at 2200, registration is performed on each microimage in the flat to determine a value for $k_i$, where $k_i$ is a measure of depth of the microimage. A magnification-finding algorithm that may be used in some embodiments to find a value for $k_i$ for each microimages is given below. As indicated at 2210, the value for $k_i$ may then be used to determine a magnification value $M_i$ for each microimage. Either or both $k_i$ and $M_i$ may be stored, for example in an array or other data structure, for use during rendering.

Several aspects of the focused plenoptic camera system may be exploited to streamline this process. First, since the method is registering images that are captured on a precision grid, the method may take advantage of the fact that only translation need be considered. Moreover, translations only need to be considered along the horizontal and vertical axes of the microlens array.

The following is a magnification-finding algorithm that may be used in some embodiments:

For each N×N microlens image in the flat:
Select an m×m window from the microlens image.
For $k_i = -N + m/2$ to $k_i = N - m/2$
   Compute the cross correlation between the m×m window and a corresponding window centered at $k_x$ in the neighboring microlens image along the x axis.
   Record the value of $k_x$ with the best correlation.
   Compute the cross correlation between the m×m window and a corresponding window centered at $k_y$ in the neighboring microlens image along the y axis.
   Record the value of $k_y$ with the best correlation.
Record value of $k_i$ equal to the average of $k_x$ on left and right boundaries and $k_y$ on top and bottom boundaries.
Return the array of recorded values of $k_i$.

Figure 39:
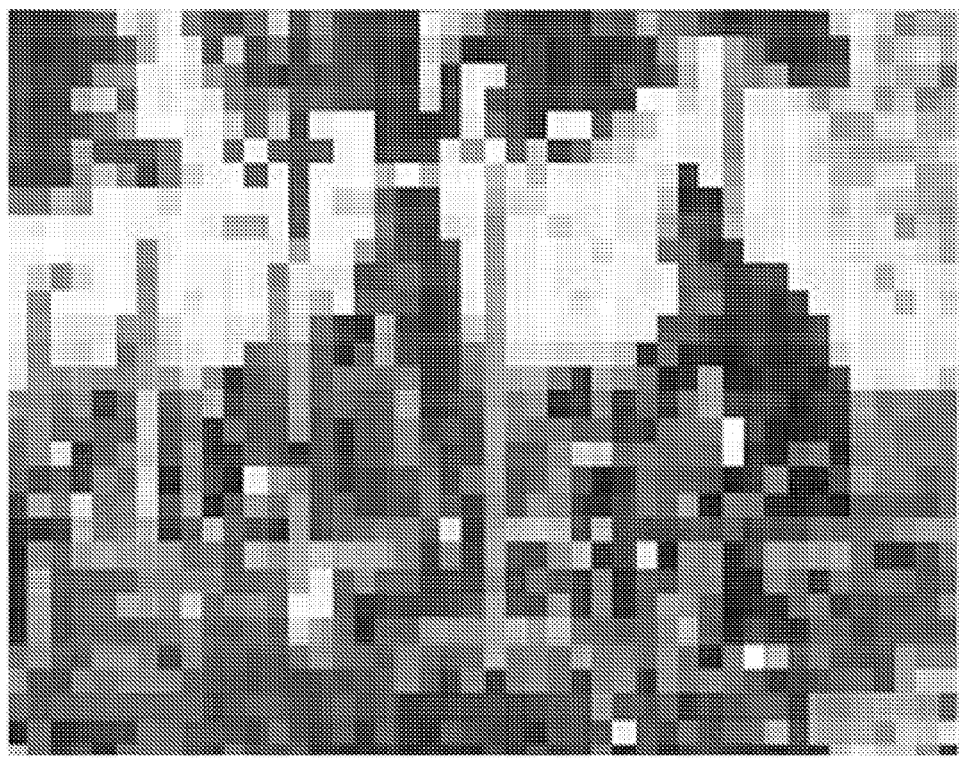
FIG. 39 shows an example of a computed depth map, according to some embodiments.

The value of $k_i$ for each microimage is a measure of depth for that microimage, and is used to determine the magnification $M_i$ that is to be applied to the microimage. FIG. 39 shows a graphical representation of the values of $k_i$ for a sample flat.

Other embodiments may use variations of the above algorithm or other algorithms or techniques to determine a depth value $k_i$ for each microimage.

The focused plenoptic rendering algorithm is modified in the following way. In the basic focused plenoptic camera rendering algorithm (see, for example, FIG. 22), a final image is rendered by visiting each microimage and magnifying it by a fixed amount. A crop is extracted from each microimage, and the crops are appropriately assembled to produce the final image.

Figure 38:
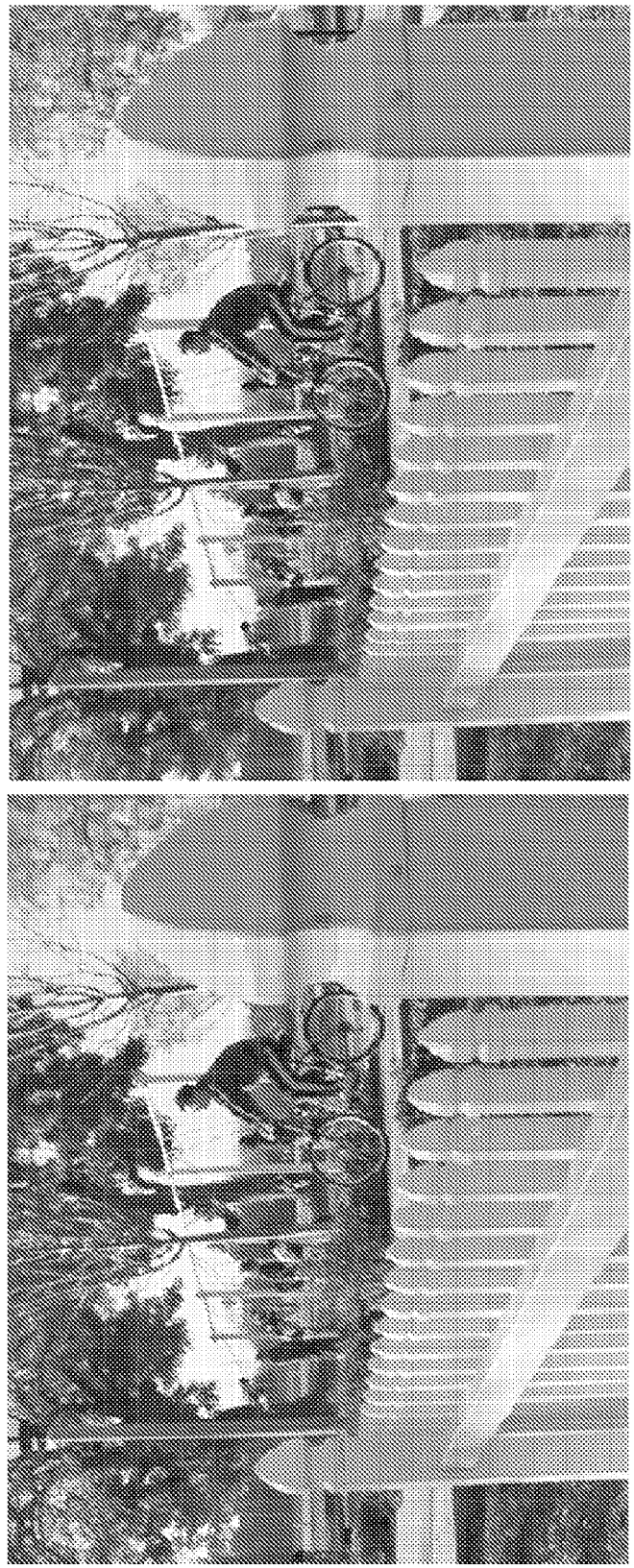
FIG. 38 is a flowchart of a method for rendering a final image from a flat using the determined magnification value for each microimage, according to some embodiments.

FIG. 38 is a flowchart of a method for rendering a final image from a flat using the determined magnification value $M_i$ for each microimage, according to some embodiments. FIG. 38 expands on element 2110 of FIG. 36. As indicated at 2300, a next microimage to be rendered is obtained. As indicated at 2310, the microimage is magnified according to its recorded value for $M_i$. In the artifact-reducing focused plenoptic rendering algorithm, rather than using a fixed value of magnification, the magnification value $M_i$ for the given microlens may be retrieved from an array or other data structure that was previously generated, for example using the method of FIG. 37, and used to magnify the microimage. As indicated at 2320, a crop is extracted from the magnified microimage. In some embodiments, a square crop of size m×m may be used. More generally, a rectangular crop of size $m_1 \times m_2$, where at least one of $m_1$ and $m_2$ is an integer greater than or equal to 2, and where $m_1$ may, but does not necessarily, equal $m_2$, may be used. In some embodiments, crops of other geometric shapes may be used. At 2330, if there are more microimages, the method returns to 2300. As indicated at 2340, the crops from the magnified microimages are appropriately assembled to produce the final high-resolution image. The final image may then be displayed, stored, or otherwise processed.

Figure 40:
FIG. 40 shows a stereo image of a scene rendered from a flat captured with an example artifact-reducing focused plenoptic camera implementation using an embodiment of an artifact reduction rendering method based on depth of the individual microimages in the flat.
Figure 41:
Figure 42:
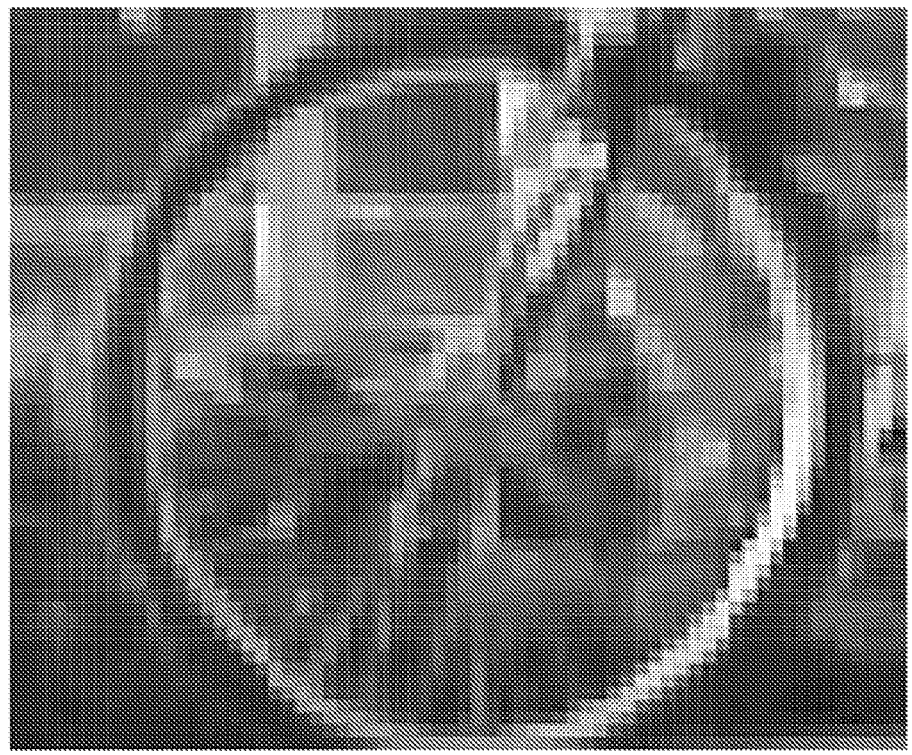
Figure 43:
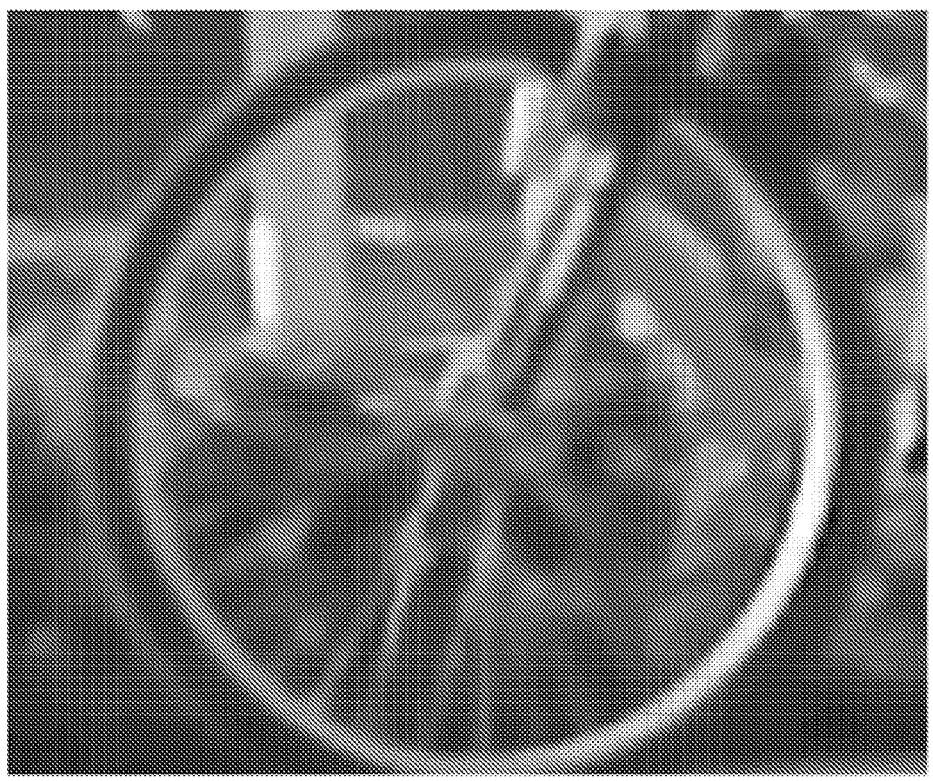
Figure 44:
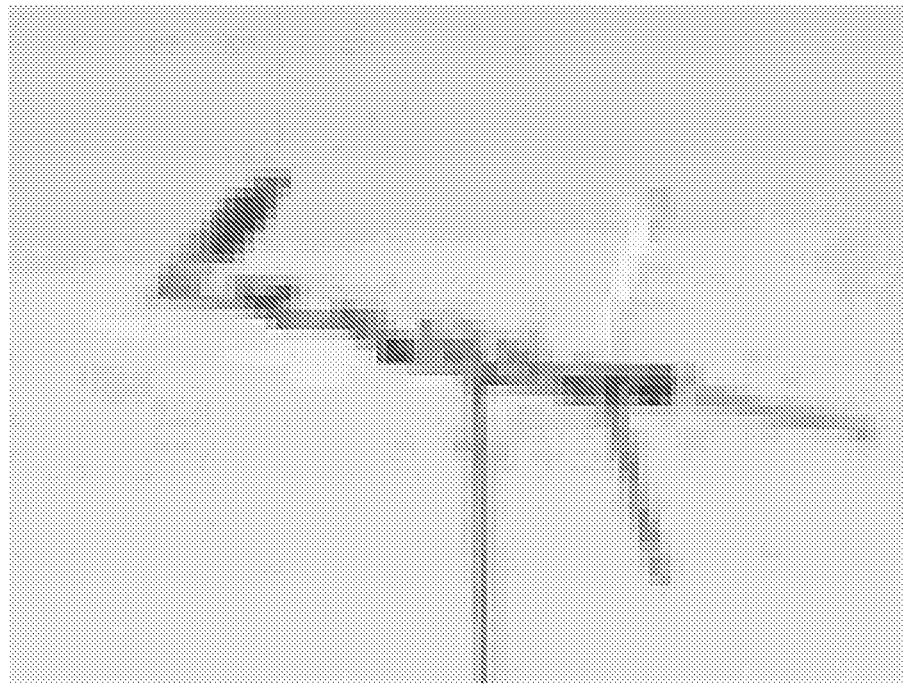
Figure 45:
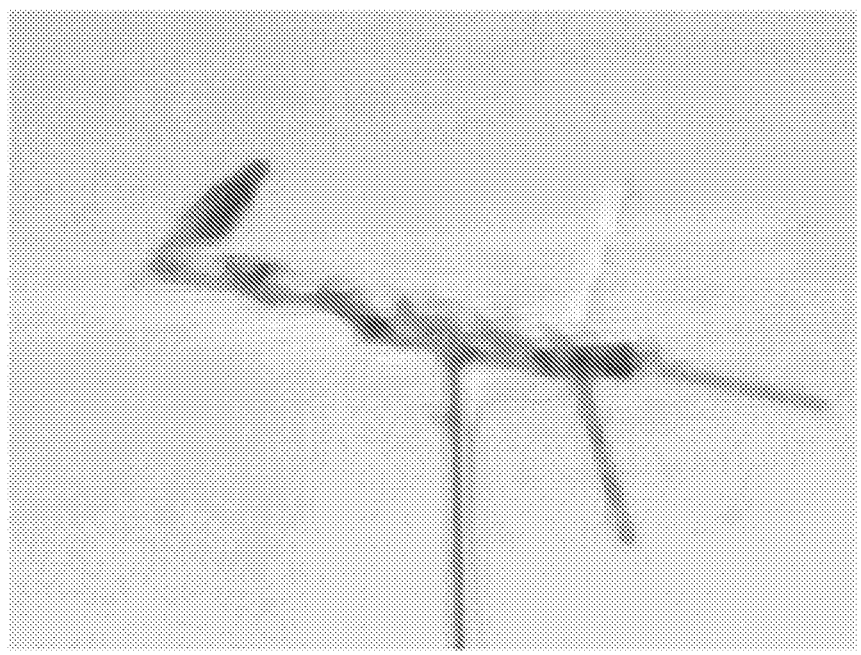

By capturing depth information as described above and then rendering the image with different magnification at each microlens, a final, high-resolution image may be rendered with few or no artifacts. FIGS. 33 and 40 show example final images generated according to this rendering method. Note that all depths of the images are rendered essentially artifact-free.

Example Results

The section Example focused plenoptic camera implementation introduced an example implementation of a focused plenoptic camera. For the example focused plenoptic camera implementation, a medium format camera, using an 80-mm lens and a 39-megapixel digital back, is used. Pixel size is 6.8 µm. The lens is mounted on the camera with a 13 mm extension tube, which provides the needed spacing to establish an appropriate distance from the focal plane to the microlens array and the sensor. The rationale for the extension as a way of reducing artifacts was described in the above-noted section. In the example focused plenoptic camera, the microlens array works with the sensor without removing the cover glass. For that purpose, the microlenses have focal length of 1.5 mm and the array is placed directly on the cover glass of the sensor, after removing the infrared filter. The microlenses are spaced 0.5 mm apart. With this configuration, the microlens array matches a main lens F-number as low as F/3. To achieve more efficient use of sensor space, we the circular F/2 aperture of the main camera lens is modified to a square aperture of approximately F/3, considering the extension tube. Adjustments were made to achieve a reasonably tight fit of the aperture squares (microimages) on the sensor. While a square aperture is used, a rectangular aperture, or an aperture of another geometric shape that allows the microimages to be packed more efficiently, may alternatively be used.

The microlens array is designed and implemented so that both microlens positions and apertures have micron precision. Apertures are circular with diameter 240 μm. As a result, the microlenses work at around F/6.25 to F/7.5 depending on their exact positioning. Note that the F-number matching condition requires the main lens F-number to match the ratio of b (distance from microlens to sensor) to the distance between microlens centers. It is not a condition of matching the microlens F-number, which remains a free parameter to optimize. This parameter may be used to achieve a good trade-off between speed and depth of field.

The microlens array is cut to a rectangle the size of the infrared (IR) filter and is positioned in place of the IR filter, directly on the sensor's cover glass, with some appropriate spacing. The IR filter was removed and placed in front of the main camera lens. An alternative design may be to put it inside the extension tube, which requires cutting and reshaping it so it fits the circle of the extension tube.

A method for providing variable additional spacing of up to 0.2 mm between the microlens array and the cover glass is provided for fine-tuning the microlens focus. This may be useful in fine-tuning the microlens focusing and producing sharper microimages.

A section of a raw image or flat captured directly from the sensor using the example implementation of an artifact-reducing focused plenoptic camera is shown in FIG. 28. Note the sharp in-focus image in each square. The quality of those microimages facilitates rendering of sharp final views of the scene.

A focused plenoptic camera rendering method of cropping and patching together small rectangles of just the right size (see FIG. 29) produces focused images like those in FIGS. 30, 31, 34, and 36. However, notice the artifacts in FIGS. 30 and 31. While one constant pitch represents a certain depth well, it is not appropriate for a different depth. If distances or camera parameters are not within the design range described in the section Reducing artifacts in focused plenoptic camera optics hardware, artifacts will generally show up.

If all parameters are in the appropriate range, artifacts, even if present, may be reduced as much as desired by positioning the image far from the microlenses. It is possible to design a camera completely free of artifacts, but the size of the final image or the parallax will be very poor. For this reason, a trade-off may be used that combines reasonably good parallax with (or at the cost of) some artifacts. See FIG. 34 for an example.

Because some images rendered from flats captured with some embodiments of the artifact-reducing focused plenoptic camera may include artifacts if rendered with the basic rendering algorithm (see, for example, FIGS. 22 and 29), an artifact-reducing focused plenoptic camera rendering algorithm may be used to render the images. See FIGS. 36 through 38 for an artifact-reducing focused plenoptic camera rendering algorithm that may be used in some embodiments. This algorithm makes the depth (or pitch) parameter variable throughout the flat during rendering. A depth parameter may be computed for each microimage according to the magnification-finding algorithm in the section Reducing artifacts in software. An example of a computed depth map is shown in FIG. 39. Notice that this is a per-microlens depth and thus is not precise. Rendering of the final image (see FIG. 40 for an example) is based on this depth map, and the quality of the final image is clearly better than in an image rendered with constant depth rendering (see, for example, FIG. 34). The same depth map is used to generate both of the stereo views in FIG. 40. Methods for rendering a more precise depth map are possible and contemplated.

Embodiments of the artifact-reducing focused plenoptic camera used with the artifact-reducing rendering method produce high-resolution views of a photographed scene, frozen in time. To convey some feeling of the 3D nature of the light-field results, FIG. 40 shows left and right "stereo" views, shown side by side, but switched. The crossed-eyes viewing technique may be used to directly experience stereo from the images in FIG. 40. However, note that the light-field approach is much more than stereo 3D because it represents any synthetic position of the camera, while stereo is based only on two positions.

Via experimentation where many images are produced from many flats, it can be seen that even an imprecise depth map largely eliminates the artifacts. This can be explained by the fact that locations where the depth map is least precise are exactly locations where a depth map is not needed for artifact reduction. There are few or no artifacts and few or no texture detail in such areas. When an area needs artifact reduction, the area generally has many details, and therefore much more precise depth is easy to compute. Note also that the depth map is not needed for the stereo 3D representation, but only for artifact correction. Even without the use of a depth map, the stereo effect is very good, as microlens images are naturally stereo views.

Most if not all final images rendered with the combined method that uses both the artifact-reducing focused plenoptic camera and the artifact-reducing rendering method exhibit very few if any visible artifacts. While the results are generally but not always very good and artifact-free, there is room for improvement. For example, improvements may be made through (1) more precise depth map calculation, (2) better microlenses fabrication, and (3) greater use of the data. First, the depth map calculation may be modified in some embodiments to improve accuracy and consistency among microlenses. For example, graph cut or other methods may be applied to improve the algorithm in some embodiments. Second, while the microlenses are very precise in terms of focal length, positioning, and aperture, there may be defects in some microlenses, or contamination of some microlenses that may result in incorrect matching and poorly computed depths. Thus, higher-quality microlenses may be used in some embodiments to improve overall quality of the captured flats and thus the images rendered from the flats. Finally, as can be seen from FIG. 29, much of the data remains unused. While the focused plenoptic camera may be approximately 100 times better than conventional plenoptic camera capture and rendering (which produces 1 pixel per microlens), focused plenoptic camera rendering as described herein may use only a fraction of the captured image data. Better results may be achieved in terms of smoothness and noise reduction in some embodiments by enlarging the areas that are cropped from each microlens image and performing appropriate blending between overlapping microlens images.

Implementations of Rendering Methods

Figure 23:
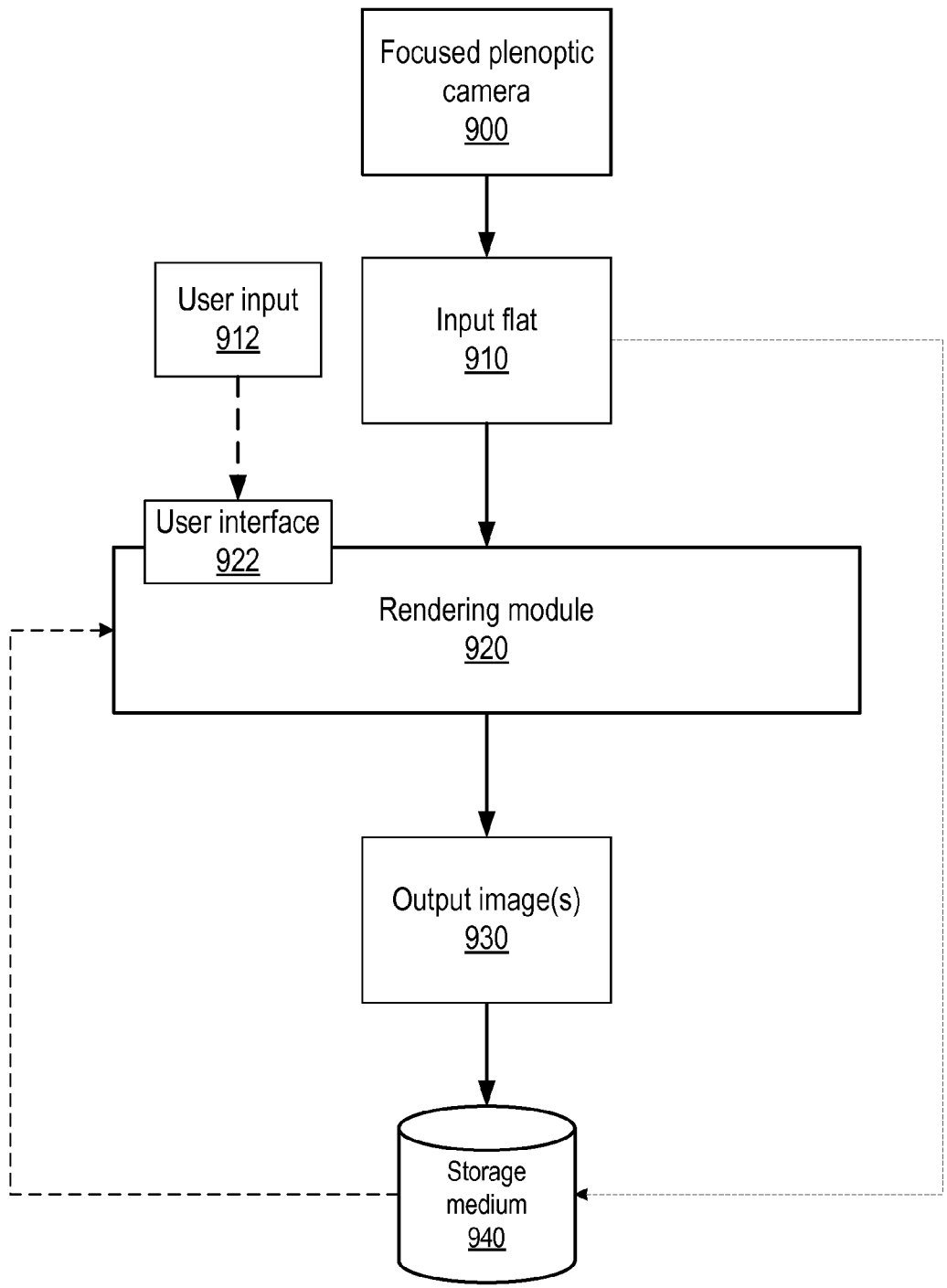
FIG. 23 illustrates a rendering module rendering a high-resolution image from a flat captured, for example, by a focused plenoptic camera, according to some embodiments.

FIG. 23 illustrates a rendering module rendering images from a flat captured, for example, by various embodiments of a focused plenoptic camera as described herein. Rendering module 920 may, for example, implement full-resolution light-field rendering methods as described in FIG. 22 and/or as described in FIG. 25. Rendering module 920 may instead, or may also, implement artifact-reducing methods for rendering images from flats captured with focused plenoptic cameras, such as the rendering method described in FIGS. 36 through 38. FIG. 24 illustrates an example computer system on which embodiments of rendering module 920 may be implemented. In some embodiments of a focused plenoptic camera, rendering module 920 may be implemented in the camera, e.g. in captured data processing module 260 of focused plenoptic camera 200 illustrated in FIG. 7. Referring to FIG. 23, rendering module 920 receives an input flat 910 captured by a focused plenoptic camera, such as one of the embodiments of focused plenoptic cameras described herein. Example portions of a flat as may be captured by various embodiments of a focused plenoptic camera are illustrated in FIGS. 9, 17, and 28. Rendering module 920 then processes the input image 910 according to an appropriate rendering method or methods as described herein, for example the artifact-reducing rendering method described in FIGS. 36 through 38. Rendering module 920 generates as output one or more images 930. FIGS. 19 and 20 illustrate example high-resolution images that may be rendered and output by rendering module 920 using a rendering method without artifact reduction. FIGS. 33 and 40 illustrate example high-resolution images that may be rendered and output by rendering module 920 using an artifact-reducing rendering method, for example the artifact-reducing rendering method described in FIGS. 36 through 38. Output image 930 may, for example, be stored to a storage medium 940, such as system memory, a disk drive, DVD, CD, etc. The dashed line from input image 910 to storage medium 940 indicates that the original (input) flat 910 may also be stored. The dashed line from storage medium 940 to rendering module 920 indicates that stored images may be retrieved and further processed by rendering module 920.

In some embodiments, rendering module 920 may provide a user interface 922 via which a user may interact with the module 920, for example to specify or otherwise manage input flats 910 and output images 930 as described herein. In some embodiments, examination of microimages to determine the direction of movement of edges may be performed by a user via the user interface 922. The user may mark or otherwise indicate areas that the user determines need be inverted via the user interface 922. In some embodiments, examination of the microimages to determine the direction of movement of edges may be performed automatically by rendering module 920. Some embodiments may allow either manual or automatic examination and detection, or a combination thereof, to be used. The user interface 922 may also provide tools whereby a user may specify areas of two or more rendered images that are to be combined to produce a higher-quality output image. The user interface 922 may also provide one or more user interface elements whereby the user may select parameters of or otherwise control the artifact-reducing rendering method Example System Embodiments of a rendering module and/or of the various rendering methods as described herein, for example the artifact-reducing rendering method described in FIGS. 36 through 38, may be executed on one or more computer systems, which may interact with various other devices. One such computer system is illustrated by FIG. 24. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, audio device 1090, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. In some embodiments, computer system 1000 may be a digital camera.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the various rendering methods disclosed herein may be implemented at least in part by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a rendering module are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 24, memory 1020 may include program instructions 1025, configured to implement embodiments of a rendering module as described herein, and data storage 1035, comprising various data accessible by program instructions 1025. In one embodiment, program instructions 1025 may include software elements of embodiments of a rendering module as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a rendering module as described herein. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:
1. A camera, comprising:
   a photosensor configured to capture light projected onto the photosensor;
   an objective lens, wherein the objective lens is configured to refract light from a scene located in front of the camera to form an image of the scene at a focal plane of the objective lens;
   a microlens array positioned between the objective lens and the photosensor, wherein the microlens array comprises a plurality of microlenses, wherein the plurality of microlenses are focused on the focal plane and not on the objective lens;

wherein each microlens of the microlens array is configured to project a separate portion of the image of the scene formed at the focal plane on which the microlens is focused onto a separate location on the photosensor; and wherein the camera is configured so that difference in magnification ΔM of the microlenses at different depths in the image of the scene is less than magnification M of the microlenses.

2. The camera as recited in claim 1, wherein ΔM is less than or equal to one half of M.

3. The camera as recited in claim 1, wherein ΔM is less than or equal to one tenth of M.

4. The camera as recited in claim 1, wherein magnification M of the microlenses is distance from the microlenses to the focal plane divided by distance from the microlenses to the photosensor.

5. The camera as recited in claim 4, where M is 10 or less.

6. The camera as recited in claim 4, where M is between 5 and 10, inclusive.

7. The camera as recited in claim 1, wherein the photosensor is configured to capture a flat comprising the separate portions of the image of the scene projected onto the photosensor by the microlens array, wherein each of the separate portions is in a separate region of the flat.

8. The camera as recited in claim 7, wherein the camera further comprises a rendering module configured to:
for each of the plurality of separate portions in the captured flat, determine a magnification value $M_i$ for the respective portion via registration with one or more neighbor portions;
render a final image of the scene from the flat according to the determined magnification values $M_i$ of the plurality of separate portions.

9. A method, comprising:
performing, by one or more computing devices:
obtaining a flat comprising a plurality of separate portions of an image of a scene, wherein each of the plurality of portions is in a separate region of the flat;
for each of the plurality of separate portions in the captured flat, determining a magnification value $M_i$ for the respective portion; and
rendering a final image of the scene from the flat according to the determined magnification values $M_i$ of the plurality of separate portions.

10. The method as recited in claim 9, wherein said rendering a final image of the scene from the flat according to the determined magnification values $M_i$ of the plurality of separate portions comprises:
magnifying each of the plurality of separate portions according to its respective magnification value $M_i$ to generate a plurality of magnified portions;
extracting a crop from each magnified portion; and
assembling the crops extracted from the magnified portions to produce the final image.

11. The method as recited in claim 9, wherein said determining a magnification value $M_i$ for the respective portion comprises:
performing registration of the respective portion with one or more neighbor portions to determine depth of the respective portion; and
determining the magnification value $M_i$ for the respective portion according to the determined depth for the respective portion.

12. The method as recited in claim 11, wherein the depth is determined according to an amount of shift needed to align the respective portion with each of the one or more neighbor portions during said registration.

13. The method as recited in claim 9, further comprising capturing the flat with a camera, wherein said capturing comprises:
receiving light from the scene at an objective lens of the camera;
refracting light from the objective lens to form an image of the scene at a focal plane of the objective lens;
receiving light from the focal plane at a microlens array positioned between the objective lens and a photosensor of the camera, wherein the microlens array comprises a plurality of microlenses, wherein the plurality of microlenses are focused on the focal plane and not on the objective lens, and wherein a is distance from the microlenses to the focal plane; and
receiving light from the microlens array at the photosensor, wherein the photosensor receives a separate portion of the image of the scene formed at the focal plane from each microlens of the microlens array at a separate location on the photosensor;
wherein the camera is configured so that difference in magnification ΔM of the microlenses at different depths in the image of the scene is less than or equal to one half of magnification M of the microlenses.

14. The method as recited in claim 13, wherein magnification M of the microlenses is distance from the microlenses to the focal plane divided by distance from the microlenses to the photosensor, where M is 10 or less.

15. A non-transitory computer-readable storage medium storing program instructions, wherein the program instructions are computer-executable to implement:
obtaining a flat comprising a plurality of separate portions of an image of a scene, wherein each of the plurality of portions is in a separate region of the flat;
for each of the plurality of separate portions in the captured flat, determining a magnification value $M_i$ for the respective portion; and
rendering a final image of the scene from the flat according to the determined magnification values $M_i$ of the plurality of separate portions.

16. The non-transitory computer-readable storage medium as recited in claim 15, wherein said rendering a final image of the scene from the flat according to the determined magnification values $M_i$ of the plurality of separate portions comprises:
magnifying each of the plurality of separate portions according to its respective magnification value $M_i$ to generate a plurality of magnified portions;
extracting a crop from each magnified portion; and
assembling the crops extracted from the magnified portions to produce the final image.

17. The non-transitory computer-readable storage medium as recited in claim 15, wherein said determining a magnification value $M_i$ for the respective portion comprises:
performing registration of the respective portion with one or more neighbor portions to determine depth of the respective portion; and
determining the magnification value $M_i$ for the respective portion according to the determined depth for the respective portion.

18. The non-transitory computer-readable storage medium as recited in claim 17, wherein the depth is determined according to an amount of shift needed to align the respective portion with each of the one or more neighbor portions during said registration.

19. The non-transitory computer-readable storage medium as recited in claim 15, wherein the flat is captured with a camera, wherein said capturing comprises:
- receiving light from the scene at an objective lens of the camera;
- refracting light from the objective lens to form an image of the scene at a focal plane of the objective lens;
- receiving light from the focal plane at a microlens array positioned between the objective lens and a photosensor of the camera, wherein the microlens array comprises a plurality of microlenses, wherein the plurality of microlenses are focused on the focal plane and not on the objective lens, and wherein a is distance from the microlenses to the focal plane; and
- receiving light from the microlens array at the photosensor, wherein the photosensor receives a separate portion of the image of the scene formed at the focal plane from each microlens of the microlens array at a separate location on the photosensor;
- wherein the camera is configured so that difference in magnification $\Delta M$ of the microlenses at different depths in the image of the scene is less than or equal to one half of magnification M of the microlenses.

20. The non-transitory computer-readable storage medium as recited in claim 19, wherein magnification M of the microlenses is distance from the microlenses to the focal plane divided by distance from the microlenses to the photosensor, where M is 10 or less.

\* \* \* \* \*